(12) United States Patent
Cohen et al.

(10) Patent No.: US 10,576,428 B2
(45) Date of Patent: Mar. 3, 2020

(54) SELF-ADAPTIVE CONTROL AND OPTIMIZATION OF MEMBRANE FILTRATION

(71) Applicant: THE REGENTS OF THE UNIVERSITY OF CALIFORNIA, Oakland, CA (US)

(72) Inventors: Yoram Cohen, Los Angeles, CA (US); Panagiotis D. Christofides, Los Angeles, CA (US); Han Gu, Simi Valley, CA (US); Larry Xingming Gao, Los Angeles, CA (US); Anditya Rahardianto, Panorama City, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 54 days.

(21) Appl. No.: 15/415,737

(22) Filed: Jan. 25, 2017

(65) Prior Publication Data
US 2017/0209834 A1    Jul. 27, 2017

Related U.S. Application Data

(60) Provisional application No. 62/286,735, filed on Jan. 25, 2016.

(51) Int. Cl.
*B01D 65/02* (2006.01)
*B01D 61/14* (2006.01)
(Continued)

(52) U.S. Cl.
CPC ........... *B01D 65/02* (2013.01); *B01D 61/025* (2013.01); *B01D 61/04* (2013.01); *B01D 61/145* (2013.01);
(Continued)

(58) Field of Classification Search
CPC ...... B01D 2311/263; B01D 2311/2642; B01D 2317/022; B01D 2317/04; B01D 2321/04;
(Continued)

(56) References Cited

U.S. PATENT DOCUMENTS

| 6,562,246 B2 | 5/2003 | McGowan |
| 9,550,152 B2 | 1/2017 | Schneidewend |

(Continued)

FOREIGN PATENT DOCUMENTS

WO    WO-2014/127313 A1    8/2014

OTHER PUBLICATIONS

Augustin, W., et al., "Pulsed flow for enhanced cleaning in food processing", Food and Bioproducts Processing, 2010, 88(4): pp. 384-391.
(Continued)

*Primary Examiner* — Terry K Cecil
(74) *Attorney, Agent, or Firm* — Foley & Lardner LLP; Cliff Z. Liu

(57) ABSTRACT

An apparatus includes 1) a filtration device including a filtration module to generate a filtrate from an input stream; 2) a desalination device fluidly connected to the filtration device; and 3) a controller configured to direct operation of the filtration device and the desalination device. In a first mode of operation, the filtration module is configured to perform filtration as part of generating the filtrate. In a second mode of operation, the filtration module is configured to receive an output from the desalination device such that the output backwashes the filtration module. The controller is configured to monitor a change in membrane resistance of the filtration module during the first mode of operation, and is configured to trigger the filtration module to enter the second mode of operation based on the change in membrane resistance.

17 Claims, 22 Drawing Sheets

(51) Int. Cl.
*B01D 61/22* (2006.01)
*B01D 61/02* (2006.01)
*B01D 61/04* (2006.01)
*C02F 1/44* (2006.01)
*C02F 1/00* (2006.01)
*B01D 61/16* (2006.01)
*B01D 65/08* (2006.01)
*C02F 1/52* (2006.01)
*C02F 103/08* (2006.01)

(52) U.S. Cl.
CPC ............. *B01D 61/16* (2013.01); *B01D 61/22* (2013.01); *B01D 65/08* (2013.01); *C02F 1/008* (2013.01); *C02F 1/441* (2013.01); *C02F 1/444* (2013.01); *C02F 1/5209* (2013.01); *B01D 2311/2642* (2013.01); *B01D 2321/04* (2013.01); *B01D 2321/14* (2013.01); *C02F 2103/08* (2013.01)

(58) Field of Classification Search
CPC ...... B01D 61/025; B01D 61/04; B01D 61/08; B01D 61/12; B01D 61/145; B01D 61/16; B01D 61/18; B01D 61/22; B01D 61/58; B01D 65/02; B01D 65/08; C02F 1/008; C02F 1/441; C02F 1/444; C02F 1/5209; C02F 1/5245; C02F 2103/08; C02F 2209/001; C02F 2209/005; C02F 2209/03; C02F 2209/40; C02F 2303/16; C02F 2303/20
See application file for complete search history.

(56) References Cited

U.S. PATENT DOCUMENTS

| | | | |
|---|---|---|---|
| 2001/0052494 A1* | 12/2001 | Cote | B01D 61/18 210/636 |
| 2010/0193435 A1* | 8/2010 | Blankert | B01D 61/22 210/636 |
| 2010/0282679 A1* | 11/2010 | Langlais | B01D 61/18 210/639 |
| 2014/0048462 A1 | 2/2014 | Cohen et al. | |
| 2016/0121269 A1* | 5/2016 | Noh | B01D 61/12 210/636 |

OTHER PUBLICATIONS

Gao et al., "Novel design and operational control of integrated ultrafiltration—Reverse osmosis system with RO concentrate backwash", Desalination, 382, 2016, pp. 43-52.

Gao et al., "Self-adaptive cycle-to-cycle control of in-line coagulant dosing in ultrafiltration for pre-treatment of reverse osmosis feed water", Desalination, 401, 2017, pp. 22-31.

Gu et al., "Ultrafiltration with self-generated RO concentrate pulse backwash in a novel integrated seawater desalination UF-RO system", Journal of Membrane Science, 520, (2016), pp. 111-119.

P.J. Smith et al., "A new approach to backwash initiation in membrane systems", Journal of Membrane Science, 278, (2006), pp. 381-389.

P.J. Smith et al., "Design of a generic control system for optimising back flush durations in a submerged membrane hybrid reactor", Journal of Membrane Science, 255, (2005), pp. 99-106.

R. Villarroel et al., "Physical cleaning initiation controlled by transmembrane pressure set-point in a submerged membrane bioreactor", Separation and Purification Technology, 104, (2013), pp. 55-63.

Redkar et al., Cross-Flow Microfiltration with High-Frequency Reverse Filtration. AIChE Journal, Mar. 1995, vol. 41, No. 3, pp. 501-508.

Redkar et al., "Modeling of concentration polarization and depolarization with high-frequency backpulsing", Journal of Membrane Science, 1996, 121(2), pp. 229-242.

Weidemann et al., "Cleaning of filter media by pulsed flow—Establishment of dimensionless operation numbers describing the cleaning result", Journal of Food Engineering, 2014, 132(0), pp. 29-38.

* cited by examiner

SELF-ADAPTIVE CONTROL AND OPTIMIZATION OF MEMBRANE FILTRATION

CROSS-REFERENCE TO RELATED APPLICATION

This application claims the benefit of U.S. Provisional Application No. 62/286,735, filed Jan. 25, 2016, the content of which is incorporated herein by reference in its entirety.

TECHNICAL FIELD

This disclosure generally relates to membrane filtration and, more particularly, self-adaptive control and optimization of membrane filtration.

BACKGROUND

Ultrafiltration (UF) is a filtration process utilized for treating water and other liquids in order to remove colloids, micron- and submicron-sized particles (e.g., >about 20-50 nanometers) and biological entities (e.g., bacteria) from water which can be used for multitude of purposes that include, for example, drinking water and industrial water (e.g., cooling tower water, water used in microelectronics manufacturing, food and beverage, pharmaceuticals, and so forth). Ultrafiltration is also being increasingly used to provide a pre-treated source water to be fed to reverse osmosis (RO) membrane systems for water treatment and desalination. In the latter application, the ultrafiltration process protects the downstream process of reverse osmosis from fouling by fine particulates, colloids and bacteria, as well as other contaminants that complex with coagulants that can be used to enhance the efficiency of UF filtration.

It is against this background that a need arose to develop the embodiments described herein.

SUMMARY

In some embodiments, an apparatus includes: 1) a filtration device including a filtration module, the filtration device being configured to generate a filtrate from an input stream; 2) a desalination device fluidly connected to the filtration device, the desalination device configured to perform reverse osmosis desalination on the filtrate to generate a permeate stream and a concentrate stream; and 3) a controller configured to direct operation of the filtration device and the desalination device. In a first mode of operation, the filtration module is configured to perform filtration as part of generating the filtrate. In a second mode of operation, the filtration module is configured to receive an output from the desalination device such that the output backwashes the filtration module. The controller is configured to monitor a change in membrane resistance of the filtration module during the first mode of operation, and is configured to trigger the filtration module to enter the second mode of operation based on the change in membrane resistance.

In some embodiments, an apparatus includes: 1) a filtration module configured to generate a filtrate from a feed stream; 2) a metering unit fluidly connected to a feed side of the filtration module, the metering unit configured to supply a coagulant into the feed stream; and 3) a controller configured to direct operation of the filtration module and the metering unit. In a first mode of operation, the filtration module is configured to perform filtration as part of generating the filtrate. In a second mode of operation, the filtration module is configured to receive a backwash stream to clean the filtration module. The filtration module is configured to perform multiple cycles each including the first mode of operation and the second mode of operation. The controller is configured to monitor a membrane resistance of the filtration module, and is configured to direct the metering unit to adjust a dosing of the coagulant based on changes in the membrane resistance between successive pairs of cycles of the multiple cycles.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Figure 1:
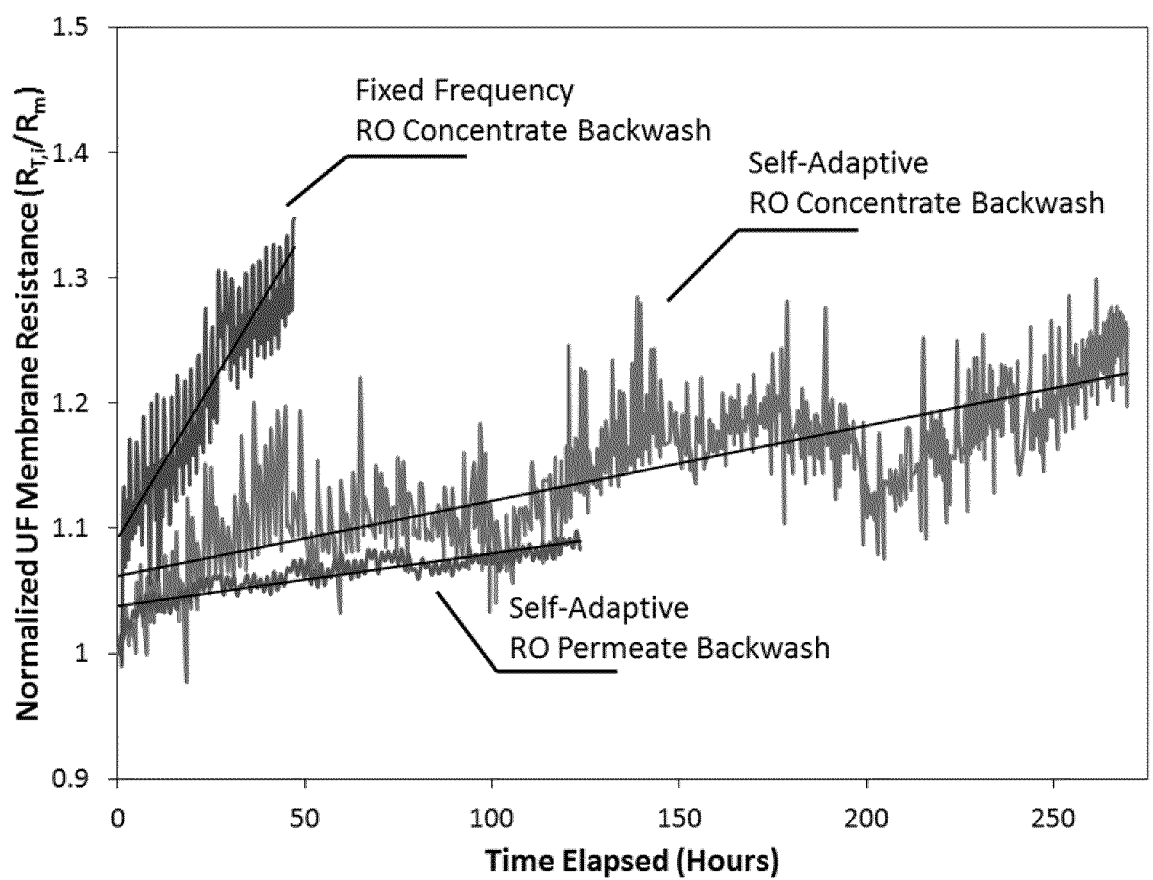
FIG. 1. Comparison of effects of three different UF backwash strategies on time profiles of UF resistance (normalized with respect to an initial membrane resistance). Use of RO permeate for backwash is more efficient than using RO concentrate; however, this is at the expense of reducing overall system recovery and increasing energy consumption per volume of permeate product.

In order to ensure robust long-term operation of an ultrafiltration (UF) process, UF membrane cleaning operations, which include membrane module backwash and cross-flow flushing, are periodically invoked. In some embodiments of the present disclosure, UF cleaning (via backwash) is triggered by an automated controller based on a threshold of UF membrane resistance which is determined by the controller online and in real-time based on various input from process sensors of pressure and flow rates. UF membrane resistance is monitored to determine a fouling state of a UF membrane and the controller is programmed to arrive at a proper decision regarding backwash triggering. Therefore, the frequency of UF backwash is self-adaptive since the controller utilizes real-time monitoring data to adjust to the fouling conditions of the source water. The present approach is suitable for stand-alone UF systems, UF systems that serve to pre-treat RO feed, and particularly for allowing and improving the integration of UF and RO, whereby an integrated system adapts to feed water quality. In the case of an integrated UF-RO system, a hydraulic accumulator can be utilized on a concentrate line and thus be charged without the need for a separate charging pump or high pressure gas to pressurize the accumulator to provide pulse backwash. In the above case, self-adaptive triggering of backwash is particularly advantageous since high frequency of backwash is feasible given the continuous supply of RO concentrate.

The objective of some embodiments of the present disclosure is to improve the process of UF backwash via a self-adaptive controller whereby UF backwash is triggered based on UF membrane resistance instead of UF transmembrane pressure (TMP). To achieve this objective, some embodiments make use of a UF controller and sensor network that allows real-time calculation of UF membrane resistance. The controller triggers UF backwash at a threshold UF membrane resistance. Subsequently, system configuration sequences automatically carry out backwash operation without operator input. Some embodiments of the disclosure are directed to a process that integrates some or all of the following components:

(a) A system of pressure, flow, and temperature sensors which measure pressure, flow rates, and temperature in real-time;

(b) Monitoring and control system software embedded by way of a programmable automation controller (PAC). An example of such PAC are NI cRIO modules (National Instruments, Austin, Tex.), which allows for embedded real-time control;

(c) A soft sensor integrating pressure, flow, and temperature data for real-time UF membrane resistance calculations;

(d) A controller that automatically triggers the charging of a hydraulic accumulator using the RO concentrate;

(e) A backwash triggering technique to determine when to trigger UF backwash based on UF membrane resistance;

(f) Integrated UF-RO membrane filtration plant in which variable backwash triggering technique is implemented;

(g) Automated switching of system flow configuration into backwash mode when backwash is triggered by the UF controller. Backwash includes both continuous backwash and pulse backwash via multiplicity of options including: (i) backwash from a backwash storage tank (of UF filtrate or concentrate), (ii) backwash stream that is diverted directly from RO concentrate to UF backwash (without the need for a pump or backwash tank), (iii) high pressure pulse backwash from hydraulic accumulator that is charged with RO concentrate, and (iv) combination of (i) and (iii) or (ii) and (iii); and (h) The self-adaptive UF controller is also suitable for use with coagulant dosing of a UF feed. Coagulants are used to enhance ultrafiltration and the self-adaptive operation also allows for real-time optimization of coagulant dose so as to maintain effective UF filtration and backwash, while reducing the amount of coagulant use and prolonging operation prior to membrane cleaning. Real-time optimization of coagulant dose is accomplished based on an improved controller and use of real-time fouling characterization metrics.

An example of improvements to UF operation due to a resistance-based, varying frequency UF backwash strategy is shown in FIG. 1. In this varying backwash frequency mode, filtration for any given cycle is allowed to proceed until an incremental total resistance increase for a given cycle, $\Delta R_T$, reached a set threshold $\varepsilon$ (maximum allowable UF resistance increase per cycle). Backwash is triggered when:

$$\Delta R_T = R_T(t_{0,i} + \Delta t) - R_T(t_{0,i}) > \varepsilon$$

where $R_T(t_{0,i}+\Delta t)$ is the UF membrane resistance at time $\Delta t$ after the beginning of a filtration cycle (including a filtration period and a backwash period), and $R_T(t_{0,i})$ (or $R_{T,i}$ for short) is the UF membrane resistance at the beginning of the filtration cycle. $R_T(t_{0,i})$ at i=1 (first filtration cycle) is specified as $R_m$, the resistance of the clean membrane. UF backwash effectiveness can be ascertained by the degree of cumulative increase in overall resistance with progressive filtration/backwash cycles. In this example, experiments were carried out indicating that a value of $\varepsilon$=about 1.36×

$10^{11}$ m$^{-1}$ resulted in the lowest rate of UF membrane resistance increase (slope of $R_{T,i}/R_m$ versus time curve).

In this example demonstration, the UF system was then operated under the following conditions: a) RO concentrate UF backwash at a fixed frequency of backwash triggering; b) RO concentrate UF backwash with variable backwash triggering as per the above equation; and c) RO permeate UF backwash with variable backwash triggering as per the above equation. Comparing runs (b) and (c), where UF backwash frequency was varied based on UF membrane resistance, to run (a), in which the backwash frequency was fixed, it can be seen from FIG. 1 that varying UF backwash frequency leads to a much slower rate of increase in UF membrane resistance, thus resulting in a longer UF operation period before chemical cleaning would be utilized.

Pulse backwash can improve UF backwash and in particular when operated via self-adaptive backwash triggering and in combination with continuous UF backwash using RO concentrate and one or more accumulators, as further described below in connection with FIG. 3. Unlike other pulse backwash approaches, this approach can omit a charging pump and a gas cylinder to recharge an accumulator. The accumulator will recharge itself directly with the backwash stream. The pulse backwash operation does not use water from the UF filtrate stream. The accumulator produces a rapid burst of backwash water through the filtrate side of an UF membrane module which enhances the removal of the fouling cake layer from lumens of the UF membrane module. The accumulator is charged directly with the high pressure RO concentrate stream aided by a valve downstream of the accumulator for regulating the hydraulic pressure in the concentrate line to facilitate charging of the accumulator. When the valve is fully open this allows discharging of a high intensity backwash pulse to enhance the UF backwash. The controller triggers both the charging and discharging of the accumulator as per the self-adaptive triggering described above. Through the use of pulse backwash, the backwash flux and backwash pressure can be increased by approximately 3 folds and 9 folds, respectively, and possibly higher. Control of the above system amounts to triggering the adjustment of a constrictor valve to charge and then discharge the accumulator. This approach enhances the overall backwash strategy and has a streamlined setup and involves low maintenance. The self-triggering of backwash that integrates pulse backwash can be utilized with UF systems that are used to provide pre-treatment for RO desalination systems as an add-on process to enhance the backwash effectiveness. It can also be used with directly integrated UF-RO systems as described further below in connection with FIG. 3. In some embodiments, a number of backwash pulses can be varied according to a UF membrane resistance. For example, once backwash is triggered, if the initial UF resistance at the beginning of the given filtration cycle is below a given threshold, namely $R_T(t_{0,i})/R_m < \alpha$, then a first number of backwash pulses are triggered, where the first number can be one or more. On the other hand, if at the beginning of the filtration cycle $R_T(t_{0,i})/R_m \geq \alpha$ then a second number of backwash pulses are triggered, where the second number can be two or more, and is greater than the first number.

Other approaches for UF backwash involve performing backwash at fixed intervals and duration, or varied based on UF transmembrane pressure (TMP). UF transmembrane pressure is used to measure UF fouling, since this value increases during UF operation as foulants accumulate on the UF membrane surface. When feed water quality worsens, this impacts the rate of increase of UF TMP during UF filtration operation and a controller can be used to adjust the backwash frequency (e.g., more frequent backwash to combat worse water quality). However, the UF TMP varies with the UF filtration flux and thus triggering of UF backwash on the basis of TMP can be constrained to essentially a single pre-determined UF filtration flux set-point. However, fouling rates and modes of fouling can change depending on the UF filtration flux. Therefore, backwash triggering on the basis of TMP cannot readily accommodate situations in which the UF flux has to vary (e.g., due to increased production or change in source water availability or change in water feed demand by a downstream operation such as RO desalination of a filtered UF stream).

In contrast with the above approach of using UF TMP for backwash triggering, embodiments of this disclosure control backwash triggering (and thus backwash frequency) based on real-time monitoring of UF fouling resistance, thereby allowing the UF system to adapt to changing quality of a feed water. This approach ensures smooth operation despite fluctuations in feed water fouling propensity. UF membrane resistance is an intrinsic property of the UF membrane which is indicative of the fouling condition of the membrane and not merely changes in operating conditions that may result in changes in TMP (e.g., increased or decreased capacity demand). This allows the implementation of a flexible controller that can handle a wide array of system operational states.

Real-Time Determination of UF Fouling Resistance for UF Operation Optimization and Self-Adaptive UF Backwash A UF membrane fouling behavior can be described based on a resistance-in-series model. The total membrane resistance $R_T$ can be expressed as the sum of membrane resistance ($R_m$), cake resistance ($R_{cake}$), and an irreversible resistance accumulated from previous filtration/backwash cycles ($R_{irr}$):

$$R_T = R_m + R_{cake} + R_{irr}$$

Figure 2:
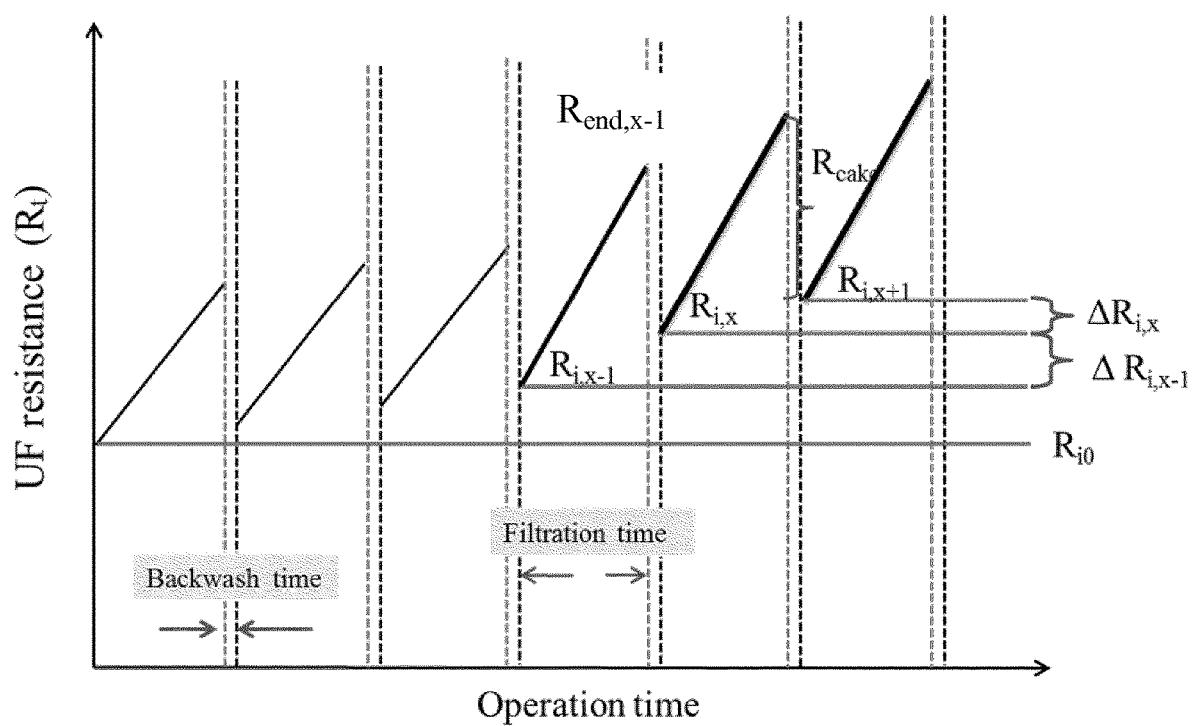
FIG. 2. Illustration of UF membrane fouling behavior.

In order to quantify the effectiveness of a given backwash strategy (with or without the use of pulse backwash and with or without the use of coagulants or other filtration aid chemicals or cleaning chemicals), the hydraulically irreversible (un-backwashable) resistance ($R_{irr}$) for every hydraulic backwash or after a number of backwash cycles is specified as the change in UF initial resistance ($R_{initial,x} - R_{initial,x-1}$, or $\Delta R$). This irreversible resistance represents the resistance that remains on the membrane surface from a previous backwash step (or cycle) as indicated by the change in initial resistance in every cycle ($R_{initial,x} - R_{initial,x-1}$) as shown in FIG. 2. Tracking the accumulated value of $R_{irr}$ provides real-time characterization of the UF fouling level. On the other hand, the effectiveness of the UF backwash cycle(s) ($BW_{eff}$) is specified as the initial filtration resistance at the start of the every filtration cycle ($R_{initial,x}$) as calculated from:

$$BW_{eff} = 1 - (R_{initial,x} - R_{initial,0})/R_{initial,0}$$

The fouling rate for every filtration period can be calculated from the slope of the fouling curve, estimated from the change in membrane resistance ($R_{end,x-1} - R_{initial,x-1}$) over the filtration period.

In FIG. 2, the diagonal lines represent the fouling curve (in terms of membrane resistance) during filtration periods of filtration/backwash cycles. The fouling curve for every filtration period is typically linear (which is indicative of a cake fouling regime). The vertical dashed lines represent the bounds of a backwash period. $R_{initial,0}$ is the initial UF membrane resistance at the start of the filtration run, $R_{end,x-1}$ is the final UF resistance at the end of the last filtration period. $R_{initial,x}$ represent the initial UF resistance ($R_T$) after a particular backwash period. $R_{initial,x+1}$ is the initial UF resistance after the next backwash period. The backwashable (or hydraulically reversible) portion of the resistance is represented by $R_{cake}$ which depends on the final resistance for the particular cycle.

Automated cycle-by-cycle analysis of fouling rate and initial UF membrane resistance is achieved using UF monitoring that is analyzed online via embedded computing technique of a controller. The controller continuously tracks and calculates the $\Delta R$'s and $BW_{eff}$ for every averaging window, which composed of several filtration/backwash cycles. Real-time utilization of $\Delta R$ allows controller action.

Using the above real-time fouling quantification indicators of the hydraulically irreversible (un-backwashable) resistance and the backwash effectiveness allows real-time optimization of UF operational parameters such as backwash flux, backwash duration, coagulant dose and other system operational states.

Implementation of Self-Adaptive UF Backwash and Coagulant Dosing

Figure 3:
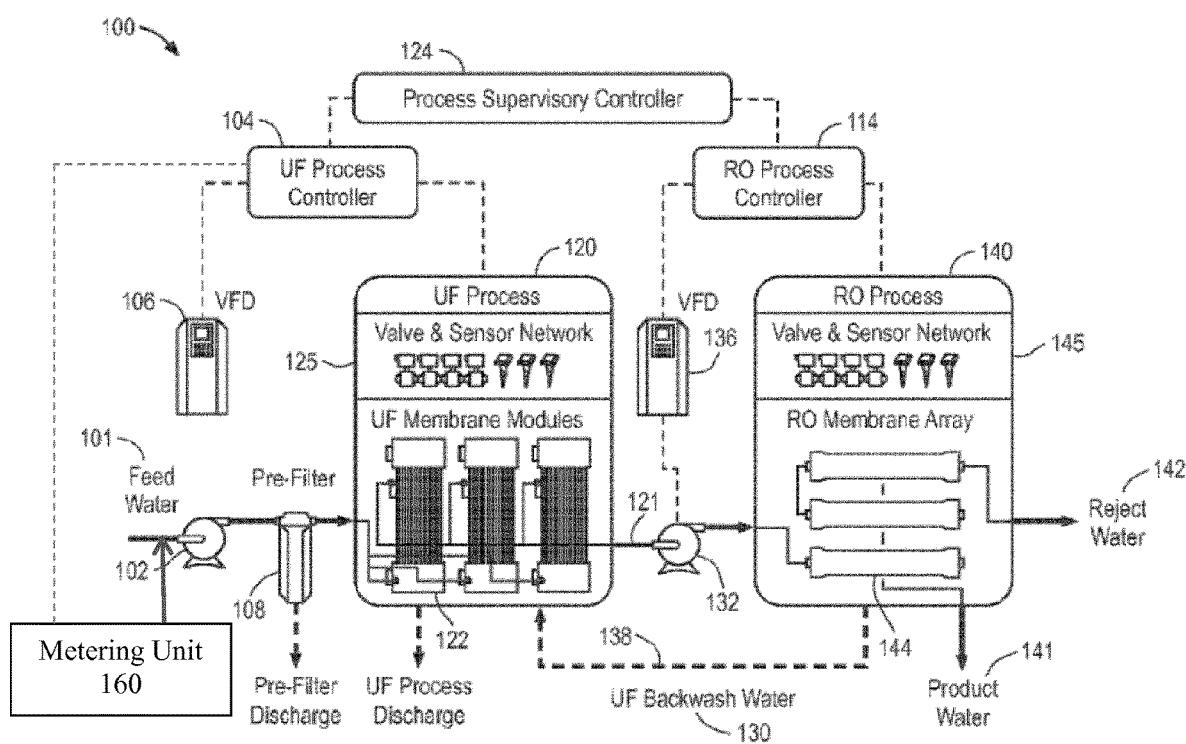
FIG. 3. Integrated filtration and reverse osmosis desalination system implementing self-adaptive backwash and coagulant dosing.

Attention next turns to FIG. 3, which illustrates an integrated filtration and reverse osmosis desalination system 100, in accordance with some embodiments. The system 100 includes a filtration skid (or device) 120 fluidly connected to a reverse osmosis desalination skid (or device) 140. The filtration skid 120 can remove particles, colloids, and bacteria from feed water 101, and can generate a filtrate 121 through at least one of microfiltration or ultrafiltration of the feed water 101 performed by filtration modules 122. In some embodiments, the reverse osmosis desalination skid 140 can perform both membrane desalination and filtration (such as nanofiltration), and may also be referred to as the reverse osmosis desalination skid (or device) 140. In FIG. 3, the filtration skid 120 is illustrated as an ultrafiltration (UF) skid, but is not limited to ultrafiltration. Similarly, other references to ultrafiltration in FIG. 3 are not limited to ultrafiltration, and can apply equally to microfiltration.

In some embodiments, the filtration skid 120 includes one or more of the filtration modules 122, and the reverse osmosis desalination skid 140 includes one or more reverse osmosis desalination modules 144. Each of the modules 122 and 144 may be a vessel that may contain one or more membrane elements.

The reverse osmosis desalination skid 140 is configured to perform reverse osmosis desalination on the filtrate 121 to generate permeate (or product water, or desalted water) 141 and concentrate (or retentate). Some or all of the concentrate may be ejected by the reverse osmosis desalination skid 140 as reject water 142. A portion of the concentrate can be utilized as backwash water 130 for backwashing the filtration modules 122 included in the filtration skid 120. The backwash water 130 may traverse a backwash line 138 to travel from the reverse osmosis desalination skid 140 to the filtration skid 120.

The production level at which the system 100 produces the permeate 141 can be dictated by system controllers including but not limited to controllers 104 and 114, and a supervisory controller 124. In some embodiments, the production level is determined subject to one or more of prescribed production capacity specifications, permeate quality, and energy consumption constraints.

The feed water 101 is provided to a pump 102. The pump 102 may be controlled by the controller 104. For example, a feed flow rate and a pressure of an output of the pump 102 may be controlled by the controller 104. In some embodiments, the pump 102 supports variable frequency drive (VFD) control of the pump 102 via a VFD module 106. As shown in FIG. 3, a metering unit 160 is fluidly connected to a feed side of the filtration skid 120 and, in particular, is fluidly connected to an input of the pump 102 to introduce or supply a coagulant (or a flocculating agent) into the feed water 101. A dose at which the coagulant is supplied may be controlled by the controller 104. Examples of suitable coagulants include aluminum-based coagulants, such as aluminium sulphate, polyaluminum chloride, sodium aluminate, and other aluminum-containing compounds, iron-based coagulants, such as ferric chloride and other iron-containing compounds, among others.

In some embodiments, the pump 102 may provide its output to a pre-filter 108. The pre-filter 108 can remove some particles, colloids, and bacteria from the feed water 101 so that the feed water 101 is cleaner upon entry to the filtration skid 120. This can help to reduce one or more of a frequency or a duration of backwashing of the filtration modules 122.

The filtration skid 120 may include a valve and sensor network 125. The sensors in the network 125 measure various system parameters, such as feed flow rate (of the feed water 101), filtrate flow rates through individual filtration modules 122, backwash flow rate (of the backwash water 130), pre-pump pressure (before the pump 102), feed stream pressure (post-pump 102), transmembrane pressure (pressure measurements on feed and filtrate sides of the filtration modules 122), backwash stream pressure (of the backwash water 130), temperature of the feed water 101, turbidity of the feed water 101, turbidity of the filtrate 121, pH and oxidation reduction potential (ORP) of the filtrate 121, speed of the pump 102, and energy usage of the pump 102. This list is not restrictive, and it is contemplated that other system parameters may be measured as well. The valves in the network 125 may serve various purposes, such as opening, closing, and varying flow rates through a network of paths among interconnecting components included in the filtration skid 120, such as filtration modules 122. The valves in the network 125 may include actuated two-way and three-way valves.

The filtrate 121 is provided to a pump 132. The pump 132 may be controlled by the controller 114. In some embodiments, the pump 132 supports variable frequency drive (VFD) control of the pump 132 via a VFD module 136. For example, a VFD setting of the pump 132 may be controlled by the controller 114 based on a desired feed flow rate to reverse osmosis desalination modules 144 included in the reverse osmosis desalination skid 140.

In some embodiments, a protective filter (not shown) may be placed between the filtration skid 120 and the pump 132. This protective filter can protect the pump 132 from particulate matter in the event of a breach in the integrity of the filtration modules 122.

In some embodiments, the pump 102 may be a centrifugal low-pressure pump with VFD control. The pump 132 may be a high-pressure axial positive displacement pump with VFD control. Alternatively, the pump 132 can be a high-pressure centrifugal pump with a sufficiently large impeller.

The reverse osmosis desalination skid 140 may include a valve and sensor network 145. The sensors in the network 145 measure various system parameters, such as retentate flow rate (of the reject stream 142), permeate flow rate (of the permeate 141), permeate flow rates through individual reverse osmosis desalination modules 144, pre-pump pressure (before the pump 132), post-pump pressure (after the pump 132), feed stream pressure and conductivity (feeding into the reverse osmosis desalination skid 140), retentate stream pressure, conductivity, and pH (of the reject stream 142), permeate stream pressure, temperature, and conductivity (of the permeate 141), retentate valve position, and speed and energy usage of the pump 132. This list is not restrictive, and it is contemplated that other system parameters may be measured as well. The valves in the network 145 may serve various purposes, such as opening, closing, and varying flow rates through a network of paths among interconnecting components included in the reverse osmosis desalination skid 140, such as the reverse osmosis desalination modules 144. The valves in the network 145 may include actuated two-way and three-way valves.

Advantageously, the filtrate 121 travels from the filtration skid 120 to the reverse osmosis desalination skid 140 without traversing a storage tank. In desalination systems where a storage tank separates filtration modules (such as ultrafiltration modules) from a reverse osmosis desalination skid, the filtration modules typically feed the storage tank a filtrate that is then provided from the storage tank to the reverse osmosis desalination skid. In these desalination systems, the size of the storage tank can be large to support high feed flow rates, and can result in a correspondingly large system footprint. For example, for a small desalination system providing a feed flow rate of approximately 35 gallons per minute, the size of the storage tank may be in the range from about 100 gallons to about 250 gallons, depending on a flow rate from the storage tank for backwash of the filtration modules and a safety factor designed to ensure that the storage tank does not become empty or full during normal operation. For a larger desalination system providing a feed flow rate of approximately 350 gallons per minute (ten times 35 gallons per minute), the size of the storage tank may be in the range from about 1000 gallons to about 2500 gallons (ten times the range corresponding to a feed flow rate of 35 gallons per minute).

In the system 100, removal of the storage tank for the filtrate is an advantageous factor that allows embodiments of the system 100 to have a footprint less than 350 cubic feet, such as about 340 cubic feet. The system 100 can therefore be suited for applications that can specify that the system 100 fits into small spaces, such as shipboard desalination of up to 18,000 gallons per day of seawater. Parameters of the system 100 such as pressure and flow rate at various points throughout the system 100 can be controlled to support integrated operation of the filtration skid 120 and the reverse osmosis desalination skid 140 for high feed flow rates, and without the storage tank.

Additionally, in some embodiments, the system 100 includes the single pump 132 between the filtration skid 120 and the reverse osmosis desalination skid 140. The pressure associated with the filtrate 121 produced by the filtration skid 120 can be maintained at or above a minimum pressure at an input to the pump 132 by appropriately controlling the pump 102, without a need for additional pumps between the filtration skid 120 and the pump 132. For example, in embodiments where the pump 132 is a high-pressure positive-displacement pump, the minimum pressure at the input to the pump 132 can be maintained above a minimum pressure value in the range from about 10 pounds per square inch (psi) to about 15 psi, such as about 14 psi. In contrast, desalination systems having the above-described storage tank can specify additional pumps to increase the pressure at the output of the storage tank to a minimum pressure value at an input to a high-pressure pump similar to the pump 132. These additional pumps can increase both the cost and the footprint size of the desalination systems having the above-described storage tank.

Moreover, in desalination systems having the above-described storage tank, additional monitoring of the water level in the storage tank is typically specified to ensure that the water in the tank is not overflowing and that the water level does not drop below a critical level (e.g., leading to pumps running dry or partially dry). Intermittent system operation may also complicate control strategy for these desalination systems due to reaching the constraints of the storage tank. For example, ultrafiltration may have to be shut down if the storage tank is full, or reverse osmosis desalination may have to be shut down if the storage tank is empty. These control and monitoring functions related to the storage tank are omitted in the system 100.

Advantageously, the system 100 can operate adaptively. In some embodiments, the filtration skid 120 and the reverse osmosis desalination skid 140 are integrated to provide self-adaptive operation of the filtration skid 120 and the desalination skid 140 in response to control by at least one of the controllers 104, 114, and 124. The controller 124 may be a supervisory controller that coordinates the local controllers 104 and 114. Alternatively, the controllers 104, 114, and 124 may be combined in a single controller. The control may respond to at least one of temporal variability of quality of the feed water 101, a production capacity target for the permeate 141, and a quality target for the permeate 141. For example, feed filtration by the filtration skid 120 can be operated as a self-adaptive process that responds to changes in feed water quality. For example, one or more of the controllers 104 and 124 can vary backwashing frequency and duration of the filtration modules 122 in response to variations in feed water quality. Also, in some embodiments, the system 100 determines its own optimal operating conditions with respect to feed pressure, flow rates and recovery in order to maintain operation at the minimum energy consumption level, while adhering to constraints imposed by water permeate quality.

In some embodiments, the backwash water 130 may be a portion of the concentrate generated by the reverse osmosis desalination skid 140. Alternatively, a portion of the permeate 141, or a mixture of the concentrate and the permeate 141, can be utilized as the backwash water 130. By reusing concentrate generated by the reverse osmosis desalination skid 140 for backwashing the filtration modules 122, the efficiency and permeate flow rate of the system 100 can increase compared to a desalination system that uses filtrate (similar to the filtrate 121) or permeate (similar to the permeate 141) for backwashing.

Referring to FIG. 3, in some embodiments, one or more accumulators can be located along the backwash line 138 through which the backwash water 130 flows from the reverse osmosis desalination skid 140 to the filtration skid 120. In some embodiments, there are multiple (e.g., two) accumulators (each with about 5 liter capacity) located along the backwash line 138. The accumulators allow high pressure pulsed backwash as an additional option for backwashing the UF membranes.

Figure 6:
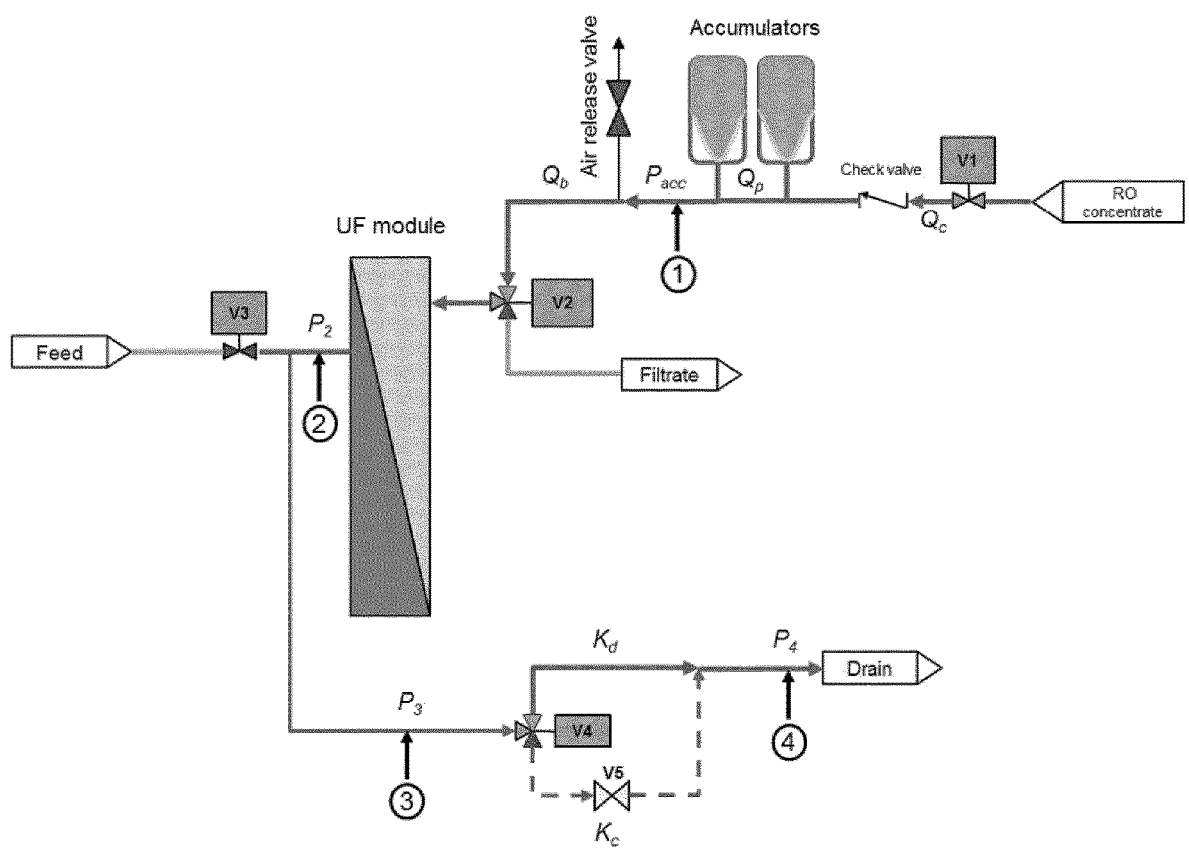
FIG. 6. Schematic diagram of a UF pulse backwash (PBW) system (shown for a single UF module). V1: backwash valve, V2: three-way filtrate valve, V3: feed valve, and V4: three-way drain valve. Valves 1-4 are electric actuated ball valves. An adjustable diaphragm valve (V5) serves as a flow regulator in the UF backwash drain line. $Q_c$: RO concentrate flow rate during backwash. $Q_b$: backwash flow rate through the UF module. $Q_p$: flow rate in/out of the accumulators. $K_c$ is the flow coefficient for flow segment between locations 3 and 4 (Valve V4 directs the flow via Valve 5 to drain) during accumulator charging; $K_d$ is the flow coefficient (for the discharge operation) for the same flow section (3→4) with valve V4 facilitating direct flow to the drain (bypassing the segment of Valve 5 indicated by the dashed line).

A piping diagram in FIG. 6 illustrates an integrated pulse backwash setup for a single UF module. Different types of hydraulic accumulators can be used that include a gas chamber that can allow pressurization by charging from a pressurized liquid source. During the charging period, at least one UF module is in a backwash mode, while other modules are in a filtration mode. A backwash valve is opened, a filtrate valve is opened to the backwash line direction, and RO concentrate flows from a RO module and is diverted to the UF backwash line at a pressure regulated by the RO concentrate valve. The backwash water enters the UF module from the filtrate side and exits from the UF drain port (these can be on either side of the UF module), depending on the backwash direction. A bleed valve is opened, and a three-way motorized drain valve is opened to the drain position. During the charging period, the three-way drain valve is opened to the flow regulator direction and the accumulators are filled with backwash water from RO concentrate line.

A hydraulic accumulator is composed of gas and liquid compartments separated by either a flexible bladder or a piston capable of movement so as to compress the gas chamber when the accumulator is filled and allowing expansion of the gas compartment when the accumulator is discharged. For a system that uses the RO concentrate, the accumulator is charged with liquid that is pressurized (from the RO concentrate line, FIG. 6) such that the pressure in the gas chamber ($P_g$) also increases as its volume ($V_g$) decreases. The size of the accumulator affects the discharge volume and thus is desirable to select the appropriate accumulator volume so as to allow for the desired flow rate to obtain a desired backwash flux and duration.

In the above approach, the pressure in the accumulator increases until pressure balance is reached. During the discharge period, as the three-way drain valve is diverted to the drain line, a rapid discharge of the accumulators filled with water is induced, resulting in a pulse of backwash whereby water traverses the UF module as a burst of high-flux flows to dislodge the foulants from the feed-side surface of the UF membrane. In some embodiments, accumulators that operate with a pressure in the range of about 20-60 psi were utilized allowing a pulse backwash over a period of about 5-20 s, where the maximum backwash flux is at least three times the filtration flux. The charging and discharging of the accumulators can be repeated multiple times. When utilizing concentrate from the RO system for continuous backwash, back pulse backwash can also be included multiple times without the constraints in systems that utilize a backwash tank. It is also noted that in directly integrated UF-RO systems such as of FIG. 3, pressurized accumulators also serve for pressure stabilization between UF module switching.

Self-Adaptive Coagulant Dosing

Figure 15:
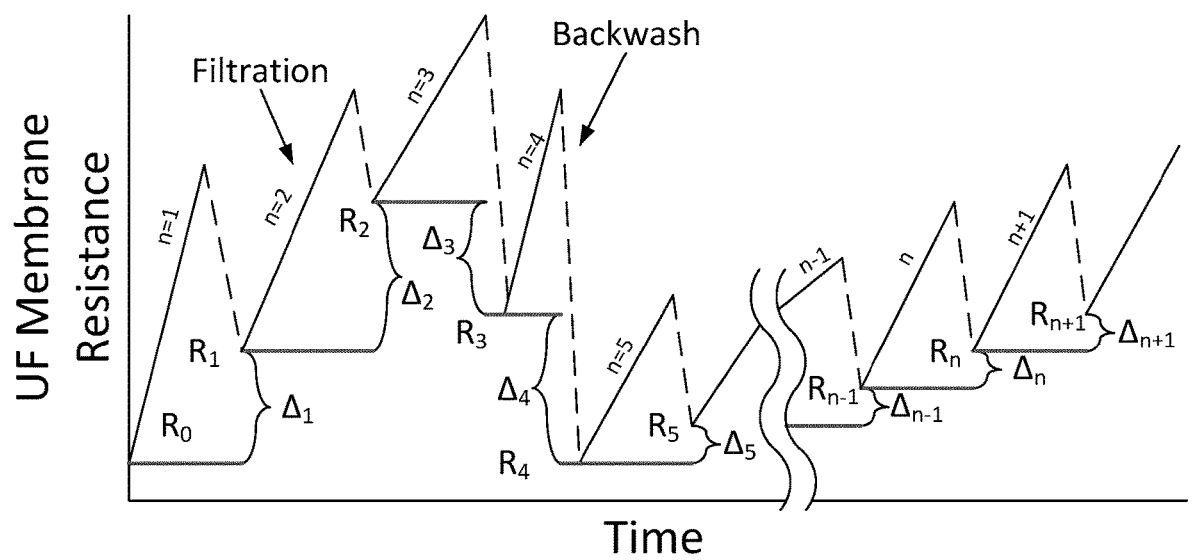
FIG. 15. Illustration of UF membrane resistance-time profiles for multiple filtration/backwash cycles. $R_n$ is the UF post-backwash (PB) resistance for filtration cycle (also same as the initial UF resistance for cycle n+1). The cycle-to-cycle change in UF PB resistance for cycle n relative to the previous cycle (n−1) is specified as $\Delta_n = R_n - R_{n-1}$. Cycles n=1-2 are examples of build-up of un-backwashed UF resistance, which resulted in positive values of $\Delta_n$. Cycles 3-4 illustrate situations where previously un-backwashed resistance is removed, resulting in negative values of $\Delta_n$.
Figure 16:
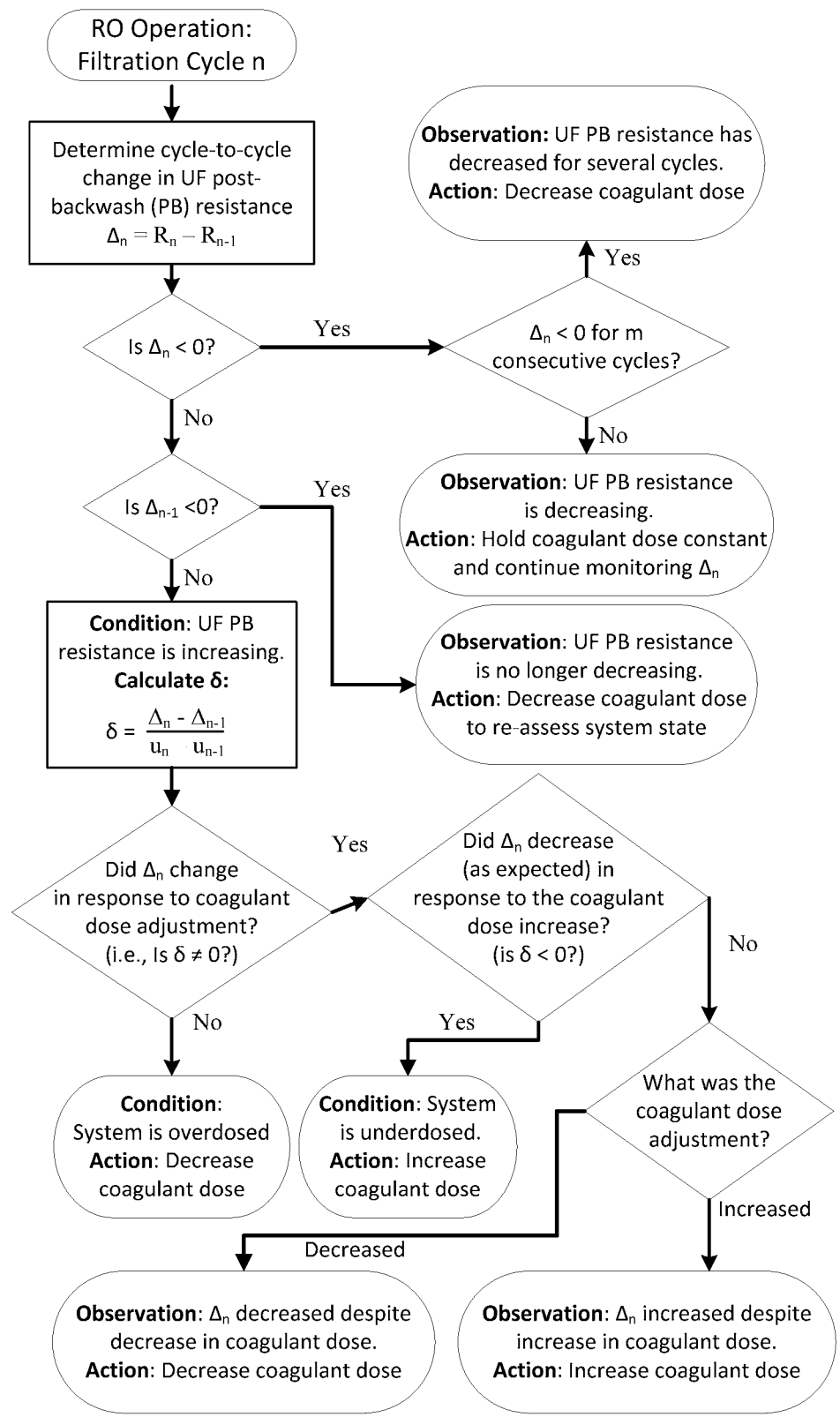
FIG. 16. A flow diagram of a self-adaptive coagulant control logic. Upon completion of a given filtration cycle n, the cycle-to-cycle change in UF resistance ($\Delta_n$) is determined to establish the appropriate control action.

Illustrations of UF membrane resistance during UF operation are shown schematically in FIG. 15, and a flowchart of a controller logic is shown in FIG. 16. A change in UF post-backwash (PB) resistance for cycle n relative to a previous cycle (n−1) is expressed as $\Delta_n = R_n - R_{n-1}$, and is a metric used to quantify effectiveness of backwash between two consecutive filtration cycles for self-adaptive coagulant dosing. The cycle-to-cycle change in UF PB resistance as quantified by $\Delta_n$ governs the rate of UF PB resistance trajectory during UF operation. A decrease in $\Delta_n$ signifies improved backwash effectiveness and reduction in the cycle-to-cycle buildup of membrane fouling resistance, while an increase in $\Delta_n$ indicates reduced backwash effectiveness and greater rate of foulant buildup on the membrane. When the overall system UF operation is such that $\Delta_n > 0$ is the dominant behavior then the un-backwashed UF resistance will gradually increase. Given the above, the overall coagulant control strategy is to reduce $\Delta_n$ in order to reduce the rate of increase of un-backwashed (or irreversible) UF fouling and reduce the frequency of chemical cleaning.

Given that increasing coagulant dose can improve backwash effectiveness, $\Delta_n$ should decrease with increasing coagulant dose (e.g., UF backwash effectiveness improves and UF fouling is reduced as coagulant dose increases) up to a critical threshold above which $\Delta_n$ is not appreciably affected. The latter regime is where coagulant dose is at a high level where it no longer impacts UF backwash effectiveness. Accordingly, two distinct regions can be present with respect to the dependence of $\Delta_n$ on coagulant dose: a) a region where an increase in coagulant dose leads to decreased $\Delta_n$ (hereinafter termed as the "underdosed region"), and b) a region in which the coagulant dose is at or above a certain critical threshold (e.g., no further improvement in $\Delta_n$ with increased dose) designated as "overdosed region." The quantitative functional behavior of the above trends can be specific for the UF system configuration and capacity and for the given source water quality. Accordingly, in the present approach, the objective is to adjust the coagulant dose such that there is proper reduction or increased coagulant dose in the underdosed region. Moreover, system drift to the overdosed region is detected and where the appropriate control action is to reduce the coagulant dose.

Figure 4:
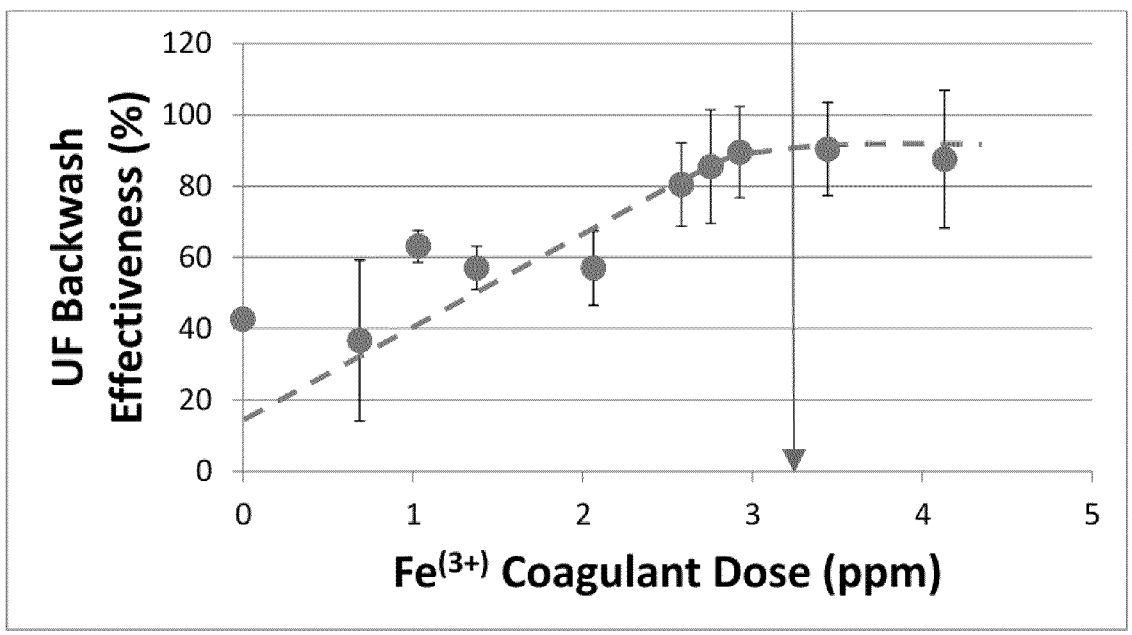
FIG. 4. Effect of ferric chloride coagulant dose (expressed in terms of $Fe^{3+}$ dose) for UF filtration of littoral seawater. The arrow indicates an "optimal dose".

As shown in FIG. 4, backwash effectiveness increases with coagulant dose up to a plateau region where additional coagulant dose increase does not lead to further improvements in UF backwash effectiveness. In other words, the highest dose at which the UF backwash effectiveness reaches the plateau value (or, for example, within about 99% of this value) can be considered to be the optimal dose for the specific water quality tested and coagulant type. In this regard, the objective of a self-adaptive coagulant controller of some embodiments is to determine the optimal dose by changing the dose and observing how the system reacts. Based on this information, the controller determines whether the current dose is on overdosed or underdosed state, and accordingly adjusts the dose. The controller monitors how the system responds to a change in coagulant dose and uses these observations to determine future actions.

In order to determine the desired coagulant dose adjustment, a controller monitors $\Delta_n$ for each filtration/backwash cycle as impacted by the coagulant dose. This information is then utilized to establish the appropriate coagulant dose change as per the logic flow chart of FIG. 16. The condition of $\Delta_n > 0$ signifies an incremental buildup of un-backwashed foulant that adds to the accumulated foulant layer. When the above condition is encountered for the current cycle (n) and the previous one (n−1) ($\Delta_n > 0$ and $\Delta_{n-1} > 0$), the control system first determines the difference in cycle-to-cycle change in UF PB resistance ($\Delta_n$ relative to $\Delta_{n-1}$) with respect to the coagulant dose quantified as $$\delta = \frac{\Delta_n - \Delta_{n-1}}{u_n - u_{n-1}},$$

where $u_n$ and $u_{n-1}$ are the coagulant doses that impact cycles n and n−1, respectively. The parameter δ, which is a measure of the slope of $\Delta_n$ vs $u_n$ and termed hereinafter the resistance-dose (RD) factor, is essentially a first order sensitivity of $\Delta_n$ with respect to $u_n$. If δ=0 this indicates that a cycle-to-cycle change in coagulant dose did not produce a measurable difference in the cycle-to-cycle change in UF PB resistance ($\Delta_n - \Delta_{n-1} = 0$). Therefore, the controller concludes that the system is in the overdose region (with respect to coagulant dose) and thus the coagulant dose is decreased. If, however, it is determined that δ<0 and where $\Delta_n - \Delta_{n-1} > 0$ (e.g., backwash effectiveness is declining due to the decrease in coagulant dose and/or increase in feedwater fouling potential) then UF operation is determined to be in the underdosed region (since $u_n<u_{n-1}$) with respect to the coagulant dose (see FIG. 16). The controller action is then to increase the coagulant dose in order to improve backwash effectiveness. For the same conditions of $\delta<0$ if $\Delta_n-\Delta_{n-1}<0$ (cycle-to-cycle decrease in the incremental buildup of un-backwashed resistance) given that the increasing coagulant ($u_n>u_{n-1}$) then the control action is continue increasing the coagulant dose so as to further improve backwash effectiveness. The condition of $\delta>0$ can also arise when: (a) $\Delta_n-\Delta_{n-1}<0$ (e.g., due to improvement in backwash effectiveness and/or improved feedwater quality) while the coagulant dose is decreased ($u_n<u_{n-1}$). Thus, the appropriate control action is to further reduce the coagulant dose; and (b) coagulant dose is increasing $u_n>u_{n-1}$ but the incremental buildup of un-backwashed UF is rising, ($\Delta_n-\Delta_{n-1}>0$) which indicates that the coagulant dose is too low and thus the control decision is to increase the coagulant dose.

The advantage of such a controller is that it omits dependence on a pre-determined set-point which would not be effective for feed water of varying quality or when operating conditions may change (e.g., flux) which would lead to different levels of fouling rates or even mechanisms. Thus, even if water quality changes and the optimal dose shifts to a different value, the controller will be able to detect this change and self-adapt accordingly.

Advantages and Features

Some embodiments of this disclosure can include one or more of the following features:

(a) Allows the operation and design of water filtration systems which use UF membranes for pre-treatment of water of high fouling propensity (e.g., agricultural drainage water, industrial water and littoral seawater).

(b) Self-adaptive filtration is applicable to a variety of membrane systems, including ultrafiltration, microfiltration as well as nanofiltration and reverse osmosis, that makes use of backwash to recover membrane permeability.

(c) Self-adaptive aspects can reduce the cost of membrane filtration operation whereby effective membrane operation would involve less frequent membrane chemical cleaning, longer membrane life (e.g., less frequent replacement of membranes) and protection of processes receiving the filtered water and thus reducing the cost of downstream processing.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Design and Operational Control of Integrated Ultrafiltration-Reverse Osmosis System with RO Concentrate Backwash Overview:

A design for a reverse osmosis (RO) desalination system directly integrated with an ultrafiltration (UF) pre-treatment unit was developed. The integration involves direct RO feed from the UF filtrate and UF backwash using the RO concentrate. This alignment reduces overall plant footprint, while the use of RO concentrate for UF backwash allows substantially 100% UF recovery and implementation of flexible backwash strategies. The example system design utilizes a control scheme, whereby RO productivity can be prescribed independently of the UF system which self-adjusts to provide the RO system with its specified feed flow rate at the specified RO pump inlet pressure. UF backwash, achieved via direct RO concentrate flow from the RO system, provided a continuous flow for sequential UF backwash which was additionally integrated with pulse backwash using a hydraulic accumulator. Seawater desalination field studies with a UF-RO pilot system of about 12,000 gallons/day permeate production capacity successfully demonstrated the advantage of RO concentrate UF backwash that was triggered based on a membrane resistance threshold. The self-adaptive UF backwash strategy extended the projected UF operation period to the threshold of specified chemical cleaning from about 16 to about 143 days.

Introduction:

Over the past two decades, reverse osmosis (RO) has emerged as a leading method for seawater and brackish water desalination, as well as for various water reuse and decontamination applications. However, membrane fouling remains a major challenge for robust operation of RO plants. Membrane fouling increases the overall resistance to water permeation across membranes and thus higher applied pressure for a given water production level, which leads to increased operational costs and, eventually, reduced membrane lifespan. Therefore, effective pre-treatment of RO feed water (for complete or partial removal of potential foulants such as particulates, colloids, and organic matter) is often specified to ensure robust long-term operation of RO plants. In this regard, ultrafiltration (UF) has been shown to produce consistently higher quality filtrate water compared to conventional feed pre-treatment options (e.g., sand filters or cartridge filters), leading to longer lifespan of downstream RO membranes. The use of UF for RO feed pre-treatment is particularly attractive since UF membrane water permeability, which declines due to fouling, can be recovered with effective periodic backwashing (reversing the flow direction) and chemical cleaning-in-place (CIP).

Given the scalability of membrane technology, UF-RO systems are suitable for medium- and large-scale municipal and industrial plants, as well as small-scale water treatment applications for remote communities, emergency response, and shipboard deployments. Integration of UF with RO is practiced in a variety of industrial and municipal applications. However, UF-RO systems typically utilize UF filtrate for periodic UF backwash, involving the use of intermediate tanks to store UF backwash water (during periods in between backwash cycles) and for assuring continuous delivery of UF filtered RO feed. A dedicated UF backwash pump is typically included to drive UF backwash, while a separate low-pressure RO booster pump may be included to re-pressurize UF filtrate to prevent cavitation in the downstream, high-pressure RO feed pump. In addition to added maintenance and cleaning constraints, intermediate UF filtrate tanks and the associated pumps present a system with design challenges when space is limited or portability is important. More importantly, operational flexibility of UF backwashing using UF filtrate may be constrained by the UF filtrate tank capacity, coupled with the condition to maintain continuous RO feed flow. As consequence, a fixed UF backwash strategy (whereby backwash frequency, duration, and intensity are fixed) is often practiced in typical UF operations. Such passive strategy may not be optimal for robust UF-RO plant operation as UF feed water quality and fouling propensity can vary significantly with time in the short term, as well as seasonally. When UF filtrate is utilized for UF backwash, implementation of a variable UF backwash strategy (e.g., varying one or more of backwash frequency, duration, and intensity to adapt to changing feed water quality) may dictate concurrent variation or reduction of UF productivity (e.g., for subsequent RO treatment) in order to achieve the specified backwash effectiveness while still meeting the constraint imposed by UF filtrate tank capacity. Frequent changes in RO feed flow is undesirable as it dictates RO process controllers to make frequent, significant operational adjustments (in order to maintain constant RO productivity), which may lead to chronic, excessive fluctuations of RO feed pressures that can potentially induce telescoping damage to RO membrane elements.

Instead of using UF filtrate, RO concentrate or permeate can be utilized for UF backwash. Demineralized water can enhance UF backwash effectiveness by reducing charge screening effects and thus natural organic matter (NOM) affinity to negatively charged UF membrane surfaces. Backwash using RO permeate is more effective than with UF filtrate. Utilization of RO permeate for backwash, however, does involve the use of permeate storage and additional backwash pump, with the disadvantage of loss of RO productivity. The alternative of direct use of RO concentrate for UF backwash is particularly beneficial since it allows UF operation at substantially 100% UF recovery (e.g., substantially no loss of UF permeate). A pilot study confirmed that UF backwash using RO concentrate (collected in a backwash tank and delivered via a backwash pump) can be as effective as using UF filtrate. In this regard, it is interesting to note that periodic hyperosmotic stress has been proposed to slow the maturation process of marine bacterial biofilm growing on filtration membranes, induced by cell mortality. Although the potential benefits of UF backwash with RO concentrate is proposed, direct UF-RO integration has not yet been evaluated to demonstrate its advantage of flexible backwashing strategy without loss of UF or RO productivity.

In this example, a directly integrated UF-RO system with UF backwash using RO concentrate was developed, eliminating the need for intermediate UF filtrate tank and backwash pump, enhancing operational flexibility, and allowing implementation of self-adaptive backwashing strategies. For the above system design, the hydrodynamics of the UF pre-treatment and RO desalination systems are coupled. Therefore, UF operational changes will directly impact the flow rate and inlet pressure to the high pressure RO feed pump, thereby involving an effective control strategy for regulating the above process variables. Typically, two to three times the filtration flux is specified for effective UF backwash. However, the RO concentrate flow rate, while continuously available for backwash, is insufficient to meet the above criterion. Therefore, continuous UF backwash with RO concentrate was enhanced via a high flow rate RO concentrate pulse. The above approaches, which also facilitated the implementation of self-adaptive triggering, was evaluated in a seawater desalination field study deploying a UF-RO system composed of multi-bore UF membranes and spiral-wound RO elements. The study was conducted to assess operational controls strategy of the integrated UF-RO plant, as well as the effectiveness of self-adaptive UF backwash (with RO concentrate) relative to both constant backwash frequency and freshwater backwash.

Direct Integration of UF-RO:

Direct UF-RO system integration, in contrast with other UF-RO systems, involves feeding UF filtrate directly to the RO high pressure feed pump and RO concentrate directly for UF backwash. A UF backwash pump can be omitted since the RO concentrate is pressurized but throttled to a level that is suitable for UF backwash. It is noted that for RO systems with an energy recovery device (ERD), energy recovery would be set to a level that provides sufficient residual RO concentrate pressure for backwash. Direct UF-RO integration provides continuous RO concentrate flow for reduced constraints on UF backwash period and frequency and thus allows for more flexible self-adaptive UF backwash strategies.

UF membranes are subjected to periodic backwash during which the membrane modules being backwashed are not producing UF filtrate. Moreover, since the systems are dynamically coupled, unsteady-state UF operation will impact RO operation. Changes to the UF filtrate flow rate, which is substantially equal to the RO feed flow rate, would specify the RO system to adjust its operating parameters (e.g., RO feed pressure, recovery). Typically, it is desired to operate RO systems at a set freshwater productivity target and avoid frequent (or unnecessary) RO feed pressure changes that can result in telescoping of RO elements. Thus, for the operation of an integrated UF-RO system, it is desirable to minimize fluctuations of RO operation (e.g., during UF filtration/backwash transitions).

Effective UF backwash involves backwash flux that is approximately two to three times the UF filtrate flux for typical UF elements. For a directly integrated UF-RO system, the UF filtrate flux ($J_{UF}$) is determined by the total UF filtrate flow rate ($Q_{UF}$), the total number (n) of UF membrane modules in filtration mode (not being backwashed), and the active UF membrane area per module ($A_m$):

$$J_{UF} = \frac{Q_{UF}}{n \cdot A_m}$$

The steady-state UF backwash flux depends on the available RO concentrate flow rate, which is governed by the RO feed flow rate (corresponding to $Q_{UF}$), the RO water recovery ($Y_{RO}$), and the number of UF membrane modules in backwash (k).

$$J_{BW,SS} = \frac{(1 - Y_{RO}) \cdot Q_{UF}}{k \cdot A_m}$$

The ratio of the steady-state UF backwash flux to the filtration flux can then be expressed as follows:

$$\frac{J_{BW,SS}}{J_{UF}} = (1 - Y_{RO}) \cdot \frac{n}{k}$$

For certain applications (e.g., high recovery operations), UF backwash with the RO concentrate stream is not achieved at or above the recommended $J_{BW,SS}/J_{UF}$ ratio of about 2-3 (e.g., for a system with $Y_{RO}$=60%, n=3, and k=1, $J_{BW,SS}/J_{UF}$ ratio is 1.2). Therefore, in order to maintain effective UF backwash during integrated UF-RO operation, it is desired to introduce a method of increasing the backwash flux.

UF Backwash

UF System Valve Configuration:

In order to maintain a substantially constant RO feed flow rate during UF membrane backwash, the UF system specifies membrane modules whose operation can be independently configured. In such a system, feed filtration can take place through all the UF modules simultaneously or through some of the modules. At all times at least one or more of the UF units are in operation, at the specified flux, in order to provide the RO system with its specified feed flow rate. When backwash is initiated for specific UF modules, their operational mode is transitioned from filtration to backwash while the filtration flux for the remaining modules is increased to accommodate the RO feed. The above transitions can be performed in any order and for any number of UF membrane modules as long as a reasonable number of UF membrane module remains in filtration mode to provide the specified RO feed.

Pulse Backwash:

In order to achieve a high RO concentrate backwash flux, a short high flux backwash pulse can be incorporated using a hydraulic accumulator on the RO concentrate backwash line. During a backwash operation, RO concentrate is partially diverted (by restricting backwash flow) and stored in the accumulator. The accumulated RO concentrate is released back into the backwash line to provide a short burst of high flow rate RO concentrate backwash. In the above approach, the total backwash flow rate, $Q_{BW}$, is given as follows:

$$Q_{BW} = Q_C + Q_A$$

where $Q_A$ is the flow rate out of the accumulator and $Q_C$ is RO concentrate flow rate. For RO operation at substantially constant productivity, recovery $Q_C$ is substantially constant (e.g., time invariant). Hence, $Q_A$ should be increased in order to achieve a significant increase of the UF backwash flow rate. The backwash flow rate provided by the accumulator can be determined from an operational accumulator model. The accumulator is composed of liquid and gas chambers whereby the released flow rate ($Q_A$), once the gas chamber is pressurized, can be expressed as:

$$Q_A = -\frac{dV_L}{dt} = \frac{dV_G}{dt} = -\frac{V_G}{P_A}\frac{dP_A}{dt}$$

where $V_L$ and $V_G$ are the volumes of the liquid and gas in the accumulator's liquid and gas chambers, respectively, and where the total accumulator volume remains substantially constant (e.g., $V_L + V_G$). In the above analysis the gas phase is taken to be ideal and the gas pressure, $P_A$, is also the pressure imparted to the liquid. It is noted that the backwash flow rate provided by the accumulator (representing the increase in the overall backwash flow rate) is proportional to the rate of accumulator pressure decrease. It is noted that the filling of the accumulator is also governed by the above equation but where the pressure in the gas chamber increases as liquid from the high pressure concentrate enters the liquid chamber. Rapid filling and then release of the accumulator is achieved using a fast-acting flow restrictor valve downstream of the UF backwash line to first increase (for filling) and then decrease (for increased backwash) of the accumulator pressure. When engaged, the flow restrictor valve increases the RO backwash line pressure, thereby forcing concentrate to flow into the accumulator (value of $Q_A$ is negative) and reducing $Q_{BW}$ (continuous portion of the backwash flow stream). Immediately after the accumulator is filled (indicated when the pressure $P_A$ is at steady state), the flow restrictor valve is disengaged, causing a rapid pressure decrease and correspondingly discharge of the accumulated RO concentrate. Throughout the above backwash pulse the RO concentrate at the exit from the RO unit is maintained via a feedback controller on the RO pressure regulator valve.

UF Self-Adaptive Backwash Triggering:

UF backwash that is triggered by a set level of UF transmembrane pressure (or TMP) can be more effective than fixed backwash frequency. However, implementation of such a strategy in a UF-RO system with an intermediate UF filtrate storage tank has to consider: (a) the level of acceptable backwash effectiveness versus the reduction in UF productivity (due to utilization of UF filtrate), (b) balancing the flows of the UF feed, RO feed, and UF backwash streams, and (c) constraints on flux and its duration that are imposed by the finite volume of the UF filtrate storage tank. In contrast, direct UF-RO integration with utilization of RO concentrate for UF backwash (without intermediate storage tanks) allows implementation of adaptive backwash with reduced constraints on backwash frequency and duration.

Reliance on variable backwashing strategy in which backwash is triggered when the UF membrane TMP exceeds a threshold level is impractical for an integrated UF-RO system. The reason for the above is readily apparent when considering the relationship between UF filtrate flux ($J_{UF}$) and UF membrane TMP ($\Delta P_m$) as expressed using Darcy's law:

$$J_{UF} = \frac{Q_{UF}}{n \cdot A_m} = \frac{\Delta P_m}{\mu \cdot R_T},\ R_T = \frac{n \cdot A_m \cdot \Delta P_m}{\mu \cdot Q_{UF}}$$

where $R_T$ is the total UF resistance (membrane and foulant layer) and $\mu$ is the water viscosity. As the membrane filtration flux changes (when membranes are taken off line for backwash, e.g., n in the above equation is reduced), the TMP has to be increased to accommodate the RO feed flow. Therefore, the impact of fouling is not properly reflected by the TMP change. Therefore, for an integrated UF-RO system, the UF resistance, $R_T$, is a better metric for triggering backwash since it is an intrinsic function of the membrane and fouling resistances.

Control of the UF System:

The UF system serves to pretreat the RO feed and thus the objective of its control system is to ensure that the UF filtrate flow rate specified by the RO system is provided at the specified RO pump inlet pressure. A control scheme for regulating the above two control variables (UF filtrate flow rate and pressure) is implemented. The RO control system regulates its own feed flow rate subject to operational targets (e.g., productivity, recovery), thus dictating the flow rate through the entire system, while the UF control system regulates the pressure at the UF-RO interface. This architecture allows the UF and RO control systems to be decoupled despite that the dynamics of UF and RO systems are coupled. For example, if the RO system mandates a RO feed flow rate adjustment (e.g., operator changes permeate productivity set-point), the flow rate through the entire system will change to match that value. The changes to UF filtrate flow rate will affect operating pressures such as the UF TMP, the difference between UF feed and UF filtrate pressures. Since the UF control system's set-point is at the RO pump inlet pressure, the UF controller will change the UF feed pressure such that irrespective of the UF TMP, the UF outlet pressure (RO pump inlet pressure) remains at the established set-point and the UF feed flow rate continues to provide the specified RO feed flow rate. Similarly, if any of the UF modules undergo backwash operation, the RO system will continue to draw the same flow rate through the UF system. However, during backwash (membrane modules are taken offline), less UF membrane area is available for filtration; therefore, a greater pressure drop is specified to increase the UF filtrate flux and maintain substantially constant UF filtrate flow rate. Here also, the UF control system will respond by increasing the UF feed pressure so that despite the increase in pressure drop across the UF system, the RO pump inlet pressure will remain substantially the same. Simultaneously, such control action also ensures that the UF filtrate flow rate remains unaltered despite the reduction in available membrane area (the filtration flux increases for membranes remaining in filtration mode). In both examples, when either the UF or RO is undergoing an operational change, the UF and RO control systems do not need to exchange processed sensor data. This architecture allows for a greatly streamlined and modular UF-RO integration that involves just physical connections of the two systems.

Integrated UF-RO Pilot Plant Description and Field Study
Pilot Plant:

An integrated UF-RO plant was designed having permeate production capacity of about 45.4 m$^3$/day (about 12,000 gallons/day). The UF pre-treatment system is composed of three hollow-fiber (inside-out) UF modules (Dizzer 5000+, Inge, Greifenberg, Germany) each containing about 50 m$^2$ UF membrane elements. An array of actuators allowed for independent operation of each UF membrane module in either filtration or backwash mode. A self-cleaning 200 μm screen filter (TAF-500, Amiad, Mooresville, N.C.) was installed upstream of the UF unit. A centrifugal low-pressure UF pump (XT100 SS, 5 hp, Price Pump, Sonoma, USA) with Variable Frequency Drive (VFD) control (VLT AQUA Drive FC 202, 4.0 kW, Danfoss, Nordborg, Denmark) served for both UF feed and directing the UF filtrate to the RO feed pump.

The RO feed pump was a high-pressure axial piston positive displacement pump (APP 10.2, Danfoss, Nordborg, Denmark) with a premium efficiency motor (CEM4103T, 25 hp, TEFC, Baldor, Fort Smith, Ark.) and VFD control (VLT AQUA Drive FC 202, 22 kW, Danfoss, Nordborg, Denmark). A minimum manufacturer recommended pump inlet pressure of about 137.9 kPa was specified in order to avoid cavitation. In addition, the RO feed pump is equipped with a sensor which cuts off power to the pump if the pump inlet pressure decreases below about 50 kPa in order to prevent pump damage. The RO pump efficiency was about 91.5% as determined in the present study and had a manufacturer-specified operational range of outlet flow and pressure of about 66-170 L/min and about 2-8 MPa, respectively. The above specified minimum pump feed flow rate and pressure were specified in order to ensure adequate pump self-lubrication.

The UF filtrate was fed to the high pressure RO pump which then delivered the RO feed to three spiral-wound elements in series (Dow FILMTEC SW30HRLE-400, Dow, Edina, Minn., USA). Each element was about 8 inch diameter and about 40 inch long housed in a fiberglass pressure vessel (8" End Ported, Protec Arisawa PRO-8-1000-EP-1, Vista, Calif.) with a manufacturer-specified maximum operating pressure of about 6.89 MPa (about 1000 psi). The manufacturer's reported RO element salt rejection was about 99.65% (at 32,000 ppm NaCl, 800 psi or 5.5 MPa) with a maximum water recovery per element of about 15% allowing up to about 38.6% total recovery with the three elements in series. An actuated needle valve (Mark 708LMO, Richard Industries, Cincinnati, Ohio), installed at the RO concentrate exit, along with the pump VFD, allowed control of both the feed pressure and flow rates. Two hydraulic bladder accumulators (C111ND, Blacoh Fluid Control, Riverside, Calif., USA) were installed on the RO concentrate line to allow high flux pulse backwash. The system was equipped with a network of various sensors (conductivity, pH, temperature, turbidity, and chlorophyll B), flow meters and pressure transducers interfaced with an embedded controller (cRIO-9022, National Instruments, Austin, Tex. USA) and data acquisition system.

Control of RO Pump Inlet Pressure:

A transition from UF operational mode (n membrane modules configured for filtration) to backwash mode (n-k membrane modules configured for filtration, where k is the number of UF modules undergoing backwash and where n>k) results in RO pump inlet pressure decrease. This pressure decline could fall below the manufacturer recommended limit and can result in cavitation. In order to avoid such a pressure decline, a proportional-integral (PI) feedback controller was implemented for the UF pump VFD. The RO pump inlet pressure was set as the controlled variable for the feedback controller as per the PI control relation:

$$VFD_{SP}^{UF} = K_P(P_{SP} - P(t)) + \frac{K_P}{\tau_i}\int_0^t (P_{SP} - P(\tau))d\tau$$

in which $VFD^{UF}_{SP}$ is the control action applied to the UF VFD in revolutions per minute (rpm), $P_{SP}$ is the pressure set-point for the RO pump inlet pressure, $K_p$ is the proportional gain, and $\tau_i$ is the integral time constant. Based on a series of system runs the optimal values of the PI control parameters were determined to be $K_p$=about 0.798 (Valve %/KPa) and $K_p/\tau_i$=about 0.1 s.

UF Self-Adaptive Backwash:

Self-adaptive backwash triggering using overall UF membrane resistance (e.g., average resistance of 3 membrane modules), $R_T$, was implemented in the pilot UF-RO plant. In self-adaptive mode, filtration for any given cycle is allowed to proceed until the incremental total resistance increase for a given cycle, $\Delta R_T$, reached a set threshold ε (maximum allowable UF resistance increase). Backwash was triggered when $$\Delta R_T = R_T(t_{0,i}+\Delta t) - R_T(t_{0,i}) > \varepsilon$$

where $R_T(t_{0,i}+\Delta t)$ is the UF membrane resistance at time $\Delta t$ after the beginning of a filtration cycle, and $R_T(t_{0,i})$ (or $R_{T,i}$ for short) is the UF membrane resistance at the beginning of a filtration cycle. $R_T(t_{0,i})$ at i=1 (first filtration cycle) is specified as $R_m$, the resistance of the clean membrane. UF backwash effectiveness can be ascertained by the degree of cumulative increase in overall resistance with progressive filtration/backwash cycles. Residual fouling, which cannot be removed by backwash (often termed irreversible fouling), typically occurs for desalination of most water sources (e.g., due to the strong adsorption of organic matter present in seawater including extracellular polymeric substances and possibly pore-plugging). When the overall resistance increases to the extent that the upper operating pressure limit for the UF membranes is reached, chemical cleaning in place (CIP) is typically specified. In this regard, the goal of effective self-adaptive backwash strategy is to lower the rate of increase of $R_{T,t}/R_m$ and increase the operational period before CIP is performed. More effective backwash will be indicated by a lower slope of $R_{T,t}/R_m$ versus time curve. In the current study, experiments were carried out, with UF backwash triggering at various resistance thresholds, revealing that $\varepsilon=1.36\times10^{11}$ m$^{-1}$ was desirable for the present UF system as it allowed operation at the lowest rate of normalized UF resistance ($R_{T,t}/R_m$) increase.

In this example implementation of self-adaptive backwash, upon backwash triggering, each of the three membrane modules are taken offline and backwashed in a sequential order. Accordingly, at any given time during the backwash period, two modules are in filtration mode. Upon backwash triggering the first membrane module is put into backwash mode; once backwash is concluded the module is transitioned back to filtration operation. The above process is then applied sequentially to the second and then third module. Once all three modules have been backwashed, a new filtration period begins and all three membrane modules remain in filtration mode until the next backwash period is triggered; a complete filtration and backwash sequence is considered a filtration cycle.

Field Study:

The directly integrated UF-RO pilot plant was deployed at the NAVFAC Seawater Desalination Test Facility in the Naval Base Ventura County (Port Hueneme, Calif., USA). Raw seawater feed was pumped from an open-sea intake through strainer to the UF-RO pilot plant. While the total dissolved solids (about 33,440-36,800 mg/L) and pH (about 7.5-8.2) of the feed varied within a relatively narrow range, variations in total suspended solids (about 0.1-5.2 ppm), turbidity (about 0.4-14 NTU), and temperature (about 11.2-19.7° C.) were significant. The feed pretreatment system (200 μm screen filter and UF) provided water of turbidity of ≤about 0.1 NTU which was well below the recommended maximum limit for RO desalting. Field tests included demonstration of the UF-RO control system, particularly the decoupled nature of the UF and RO control systems and its ability to maintain adequate RO pump inlet pressure during various UF transitions. Subsequently, the effectiveness of UF pulse backwash using RO concentrate delivered from the RO system to the UF unit was evaluated. Self-adaptive backwash that includes the above strategy was also implemented and its effectiveness was compared with the use of self-adaptive freshwater (RO permeate) backwash.

Results and Discussion

Performance of the Integrated UF-RO System Control Strategy:

The performance of the integrated UF-RO system control strategy, based on the control system architecture described above, was assessed from the observed dynamic system responses to various UF and RO controllers' set-point changes. First, the pilot plant was operated without control action to demonstrate why dynamic pressure control of the UF-RO interface is desirable for the operation of an integrated UF-RO system. Operational parameters were set at an RO feed flow rate of about 75.7 L/min and RO pump inlet pressure of about 137.9 kPa. The UF feed pump VFD was operated at a substantially constant rpm without control action. When the UF system was transitioned from filtration to backwash, the number of UF membrane modules in filtration decreases from 3 to 2 and an increase in UF TMP occurred due to the decrease of membrane area available for filtration. Without control action, the UF feed pressure remained substantially constant; thus when UF TMP was increased, the UF outlet pressure, or the RO pump inlet pressure, decreased. For this specific experiment, when the transition from filtration to backwash occurs, the pressure decreased rapidly within about 2 seconds from about 137.9 kPa to about 43.43 kPa, which caused a pump shut down (shut down threshold of below about 50 kPa) as evidenced by the RO pump rpm going to zero.

The above explanation of the integrated UF-RO operation indicates that control of the UF-RO interface pressure (RO pump inlet pressure) is desired and accordingly the proposed control scheme as described above was implemented and tested. Control system performance is evaluated, where the RO feed flow rate set-point was changed from about 90.7 L/min to about 77.29 L/min (change induced by the RO controller) for a set RO operation at about 35% recovery and RO pump inlet pressure, or UF filtrate pressure set-point of about 137.9 kPa. The RO recovery was maintained through control of RO feed flow rate and RO feed pressure. The RO inlet pressure increased somewhat (by up to about 5 kPa, for about 20 seconds) due to the decreased system flow rate leading to a decrease in UF TMP. However, the UF feedback controller effectively adjusted (via reduction of the UF feed pump motor speed) the pressure to the set-point RO pump inlet pressure.

In a subsequent experiment, the ability of the UF controller to handle filtration/backwash UF transitions that affect the RO pump inlet pressure was demonstrated. In this test self-adaptive backwash triggering was implemented based on the UF membrane resistance as described above. The operation of the RO unit was at a set feed flow rate of about 75.7 L/min and permeate recovery of about 35%. The RO pump inlet pressure set-point of about 137.9 kPa was maintained by the UF controller. During filtration mode, the flow rate through each membrane module was about 25.2 L/min (flux of about 10.1 L/m$^2$h), while during backwash (with two membranes modules in filtration mode), the flow rate through each module was about 37.9 L/min (flux of about 15.1 L/m$^2$h). A sharp rise in the TMP is apparent upon transition from filtration to backwash. In contrast, the progressive increase in UF membrane resistance is a clear indication of progressive fouling. Moreover, this metric is not altered by the flux change imposed when other membranes are being placed in backwash mode. In addition, the RO pump inlet pressure is effectively maintained at its set-point despite the repeated filtration/backwash transitions.

UF Pulse Backwash Using RO Concentrate:

An evaluation of the suitability of pulse backwash for enhancing the UF backwash flux was undertaken with the seawater desalination system operating at about 30% recovery for RO feed flow rate of about 167.5 L/min. For the above operation, UF filtrate flux during filtration with all three modules was about 67.0 L/m$^2$h. The maximum attainable backwash flux, via direct use of RO concentrate flow from the RO system was about 140.6 L/m$^2$h, which was significantly below the recommended UF backwash flux of about 230 L/m$^2$h. Backwash flux enhancement can be achieved with a hydraulic accumulator. As the accumulator is charged (typically over a period of about 40 seconds) the continuous concentrate backwash flux decreases initially, but then was restored as the accumulator was fully charged. Upon discharging the accumulator RO concentrate volume, the maximum attainable backwash flux increased above the recommended backwash flush for a short period (about 2 seconds) to a maximum value of about 287.6 L/m$^2$h (about 25% above the recommended backwash flux).

Although the high backwash flux was achieved for a short period it was effective for achieving effective UF backwash that restored membrane permeability and prevented progressive irreversible fouling. A demonstration of the benefit of using the pulsed backwash is made for operation over a period of about 8 days. Two separate tests (with and without pulse UF backwash) were conducted with the RO unit operating at the same condition as in the previous experiment. For UF backwash operation without a pulse the backwash period was set to about 3 minutes. UF backwash with a pulse was carried out with 2 pulses (each lasting about 40 seconds) followed about 2 minutes of direct RO concentrate backwash. In both cases the UF unit was operated in a self-adaptive mode for backwash triggering. Comparison of the normalized UF resistance ($R_{T,i}/R_m$) with and without pulse backwash indicates progressive fouling for the latter operation due to ineffective backwash. In contrast, after an initial stabilization period (within about 48 h), the normalized UF membrane resistance did not appreciably change, remaining at a value of 1.15±0.05. It is noted that by the end of the test period the normalized UF membrane resistance for operation without pulse backwash was about 26% higher than operation employing pulse backwash. The above test demonstrates that, even with self-adaptive operation, pulse backwash is desirable for effective UF backwash.

Effectiveness of Self-Adaptive Backwash Strategy:

The effectiveness of self-adaptive UF backwash with pulse backwash was evaluated in three comparative field test: (i) RO concentrate UF backwash at a fixed frequency of backwash triggering every 18 min (constant backwash), (ii) RO concentrate UF backwash with self-adaptive backwash triggering (self-adaptive backwash), and (iii) freshwater (RO permeate) UF backwash for a duration of about 30 seconds at a flux equal to the maximum attainable pulse backwash flux (about 287.6 L/m²h), also with self-adaptive backwash triggering (freshwater backwash). In tests (i) and (ii) UF backwash composed of two pulses (about 40 seconds each) followed by about 2 minutes of direct RO concentrate backwash. For experiment (i), a backwash triggering frequency of 18 min was selected to match the average backwash frequency for experiment (ii) with self-adaptive backwash. It is noted that test (i) was terminated earlier than the other two tests in order to protect the UF membranes given the significantly higher fouling rate in test (i). In test (iii), a backwash duration of about 30 seconds was chosen based on preliminary runs since this was the shortest duration that resulted in the lowest rate of UF resistance increase. For the above tests the UF feed flow rate was about 75.7 L/min and the RO operation was at about 35% recovery. Results for the above three tests showed that UF membrane resistance increased, essentially linearly with time. It is noted that the UF membrane modules have a maximum (manufacturer-specified) operating $\Delta P_m$ limit of about 20 psi, which, when just two modules are filtering (flux of about 45.42 L/m²h), the maximum allowable normalized UF resistance is about 3.1. For UF operation with self-adaptive RO concentrate pulse backwash, the UF system can operate for approximately 3,433 hours (about 143 days, or about 4.8 months) before reaching the above operational limit. Operation at a fixed UF backwash frequency with RO concentrate was estimated to allow operation of up to about 381 hours before reaching the above operational limit. For self-adaptive UF operation with freshwater backwash, UF operation up to about 4,919 hours (about 205 days, or about 6.8 months) would have been possible. Considering that chemical cleaning would be specified once the operational pressure limit (or maximum allowable resistance) has been reached, the projected operating duration (before chemical cleaning was specified) is about 901% longer with self-adaptive RO concentrate pulse backwash than with constant (fixed frequency) backwash. The projected operating duration was about 143% higher with self-adaptive freshwater backwash over the self-adaptive RO concentrate backwash. However, it is important to recognize that freshwater backwash effectively lowered the overall water recovery of the UF-RO system to about 24.5% (compared to about 35% when using RO concentrate for backwash) and thus increased the overall energy consumption per volume of produced permeate by about 40%.

Conclusions:

A RO desalination system was developed that directly integrates UF pre-treatment of RO feed whereby UF backwash is accomplished using the RO concentrate. This direct integration results in reduced overall system footprint (e.g., eliminates the need for intermediate storage tanks and UF backwash pump) and allows for flexible UF backwash strategies. Given the decoupling of the RO and UF systems control, RO productivity can be set independently of the UF system which is able to autonomously adjust and provide the RO system with the specified RO feed and the set inlet RO pump pressure. Self-adaptive backwash in the example system was implemented by integrating direct diversion of RO concentrate from the RO system for continuous and sequential backwash with pulse backwash using a hydraulic accumulator. Seawater desalination field studies demonstrated that triggering of UF backwash with RO concentrate, based on a membrane resistance threshold, was superior to fixed frequency backwash, extending the projected UF operation from about 16 to about 143 days. Further enhancement of UF filtration and backwash effectiveness can be achieved with the integration of coagulation with the example self-adaptive UF backwash. It is noted that while self-adaptive backwash with RO permeate was somewhat more effective than with RO concentrate, this approach resulted in reduced permeate production (by about 35%) and higher (by about 40%) overall energy cost per volume of permeate product.

Example 2

Ultrafiltration with Self-Generated RO Concentrate Pulse Backwash in an Integrated Seawater Desalination UF-RO System Overview:

Ultrafiltration as a pre-treatment for RO feedwater with enhanced UF backwash, which combines continuous with pulse backwash, was investigated in a UF-RO process integration. Direct supply of RO concentrate to the UF module served for UF backwash which was further enhanced with pulse backwash generated using bladder-type hydraulic accumulators. Model analysis of the hydraulic accumulator operation, which was validated via a series of field experiments, demonstrated a capability for accumulator charging directly from the RO concentrate stream within a period of about 30-40 s. Moreover, pulse backwash over a short period (about 5 s) which was added to the continuous UF backwash (directly from the RO brine stream), provided peak UF backwash flux that was up to a factor of about 4.2-4.6 higher than the normal filtration flux. The above mode of UF operation with multiple consecutive backwash pulses was found to be more effective than with a single pulse, while inline coagulation further increased the UF performance. Relatively long-term field operation (over eight days) of the UF-RO system with self-adaptive triggering of UF backwash, whereby the number of consecutive pulses increased when a higher membrane fouling resistance was encountered, was highly effective to provide stable UF operation over a wider range of water quality conditions and without the need for chemical cleaning. These results indicate that direct UF-RO integration with enhanced pulse UF backwash is an effective approach for UF filtration without sacrificing water productivity.

Introduction:

Reverse Osmosis (RO) desalination is the leading technology for production of potable water from seawater. However, RO seawater desalination specifies effective RO feed water pre-treatment in order to avoid fouling of the RO elements by suspended particulates, biological and organic materials. Fouling of RO elements leads to loss of membrane permeability, increased frequency of cleaning and ultimately reduced element longevity. In order to alleviate RO element fouling, microfiltration (MF) and ultrafiltration (UF) have been increasingly used for RO feed pre-treatment. However, both MF and UF should be optimized in order to reduce the level of irreversible fouling and reduce the frequency of costly MF/UF chemical cleaning and potential system shutdown. In order to mitigate UF/MF membrane fouling, backwashing or back-flushing (e.g., introduce backwash fluid from the filtrate side to the feed/retentate side of the membrane) can be used for cleaning MF/UF membranes. Backwashing disrupts and removes the foulant cake layer of MF/UF membranes via "lift-and-sweep" mechanism. Typically, MF/UF filtrate water is collected and used as the backwash fluid for backwash over a period of about 30 s to several minutes depending on the fouling condition. In order for backwash to be effective membrane manufacturers typically recommend backwash flux that is about 2-3 times the filtration flux.

In contrast with low frequency backwash, high frequency (about 1-300 backwash instances/min) and short duration (about 0.1 to 4 s) backwash pulses (or backpulsing) can be used to improve filterability of particulate and colloidal suspensions in either crossflow or dead-end filtration. It is noted that in high frequency backpulsing, filtrate recovery (or productivity) is generally in the range of about 50-93%. Backpulsing can rely on backwash fluid delivery from a pressurized reservoir, as well as with the use of gas-driven pistons to generate a backwash pulse. It is important to recognize that in large-scale RO feed pre-treatment, UF/MF operation is carried out primarily in dead-end filtration in order to maximize filtrate recovery. Therefore, high frequency backpulsing for high throughput RO feed pre-treatment for which a steady feed flow is specified would represent significant operational and equipment challenges.

Low frequency backwash is a desired approach in UF/MF pre-treatment of RO feedwater, and the addition of low frequency (about 2-5 backwash cycles/hr) pulse backwash using hydraulic accumulators can be used for improvement of backwash efficiency. A hydraulic accumulator typically is composed of gas and liquid chambers separated by a bladder, whereby the accumulator is typically charged via a pump that delivers the backwash water from the filtrate product stream. The operational characteristics of such hydraulic accumulators have been analyzed with respect to their application in automobile regenerative braking (energy storage). Such hydraulic accumulators can in principle be utilized to enhance backwash flux of UF and MF membranes used for RO feedwater pre-treatment. UF pre-treatment of RO feedwater can be improved with the use of pulsed UF backwash. The above was demonstrated in a UF-RO system in which the RO concentrate stream was used directly for UF backwash, thereby eliminating the need for both intermediate storage tanks (for both RO feed and backwash) and UF backwash pump.

The configuration of directly integrated UF-RO operation with RO concentrate use for UF backwash is particularly appealing given the ability to ensure substantially 100% recovery on the UF side while also reducing system footprint. Moreover, given the uninterrupted supply of pressurized RO concentrate, UF backwash operation can be enhanced with one or more consecutive backwash pulses using online hydraulic accumulators. However, the feasibility for self-generation of multiple backwash pulses (using the pressurized RO concentrate stream) and backwash effectiveness involves quantification of the hydraulic accumulator operation in the integrated UF-RO system. Accordingly, in this example, a systematic investigation is presented of the operability and effectiveness of UF pulse backwash for seawater desalination using an integrated UF-RO system. In the first phase of the study the operability of hydraulic accumulator was evaluated using an accumulator charging/discharging model, along with a series of field tests with a directly integrated seawater UF/RO desalination system. The above UF pulse backwash analysis served to fine-tune the pulse backwash strategy and assess the benefit of multiple consecutive backwash pulses, while also exploring the benefit of inline coagulation. Subsequently, the benefit of self-adaptive triggering of UF backwash that combines continuous and multiple UF backwash pulses was evaluated over an extended test period.

Experimental

Figure 5:
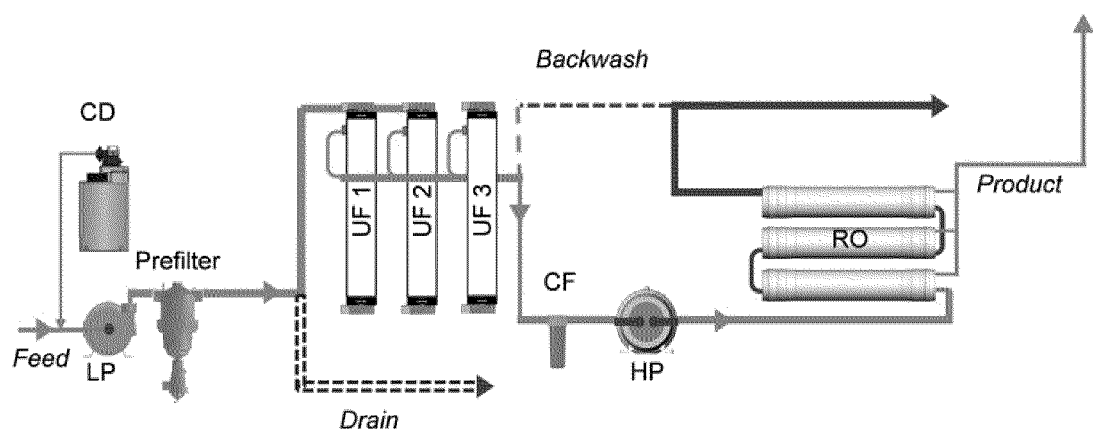
FIG. 5. Schematic of an integrated UF-RO system. A MF/UF skid includes a rotating disk microfilter (prefilter) and three hollow-fiber (inside-out) UF modules connected in parallel. Filtrate stream from the UF modules is fed directly to a RO system. The concentrate stream from the RO system (dashed line) is used directly for UF backwash. (CD: Chemical dosing pump, LP: low pressure pump, HP: high pressure pump, CF: cartridge filter)

Integrated UF-RO Pulse Backwash System:

Field studies of UF pulsed backwash were conducted using a seawater UF-RO desalination pilot plant including UF and RO skids integrated as shown schematically in FIG. 5. Briefly, the plant was designed with water feed capacity of up to about 129.1 m$^3$/day (e.g., about 34,116 gal/day) and permeate product water production of up to about 45.2 m$^3$/day at about 35% feed water recovery. The RO unit included three spiral-wound RO elements (Dow Filmtec SW30HRLE-400, The Dow Chemical Company, Midland, Mich.) each being about 8"×about 40" (about 20.3 cm×about 101.6 cm) in size, having a surface area of about 37 m$^2$ per element. The UF system included a skid of three hollow-fiber (inside-out) UF modules (Dizzer 5000+, Inge, Greifenberg, Germany) in parallel. The multi-bore PES (polyethersulfone) hollow fiber UF modules were about 182 cm in length and about 22 cm in diameter having active membrane area of about 50 m$^2$ per module and permeability of 7.0±0.2 L/m$^2$·h·kPa.

The UF unit receives its raw water feed via a centrifugal pump (XT100 SS, 5 hp, Price Pump, Sonoma, Calif.) equipped with a variable-frequency drive (VFD) (VLT AQUA Drive FC 202, Danfoss, Nordborg, Denmark). Prior to the UF unit, raw seawater feed is passed through a coarse screen and then is microfiltered via a self-cleaning screen filter (200 micron, TAF-500E, Amiad Filtration Systems, Mooresville, N.C.). A metering pump (DDA 7.5-16, Grundfos, Bjerringbro, Denmark) is utilized for coagulant dosing at the inlet of the UF feed pump (FIG. 5). Inline coagulation was accomplished using ferric chloride (Technical grade FeCl$_3$, 40.2 wt %, Gallade Chemical, Santa Ana, Calif.). The UF-RO system was equipped with a network of sensors (conductivity, pH, temperature, turbidity, and chlorophyll a), flow meters and pressure transducers interfaced with an embedded controller (cRIO-9022, National Instruments, Austin, Tex.) and data acquisition system.

In the example UF-RO system configuration, the UF module automatically responds to flow demand by the RO unit, whereby the pressure and flow rates are controlled. The concentrate from the RO unit is then used for direct sequential backwash of the UF modules either only through continuous backwash or in conjunction with a pulse backwash making use of two hydraulic accumulators (FIG. 6) each of about 3 liters capacity. The RO concentrate stream pressure is throttled down (using a throttle valve) to the level suitable for direct UF backwash and for charging of the hydraulic accumulators (for pulse backwash) with the RO concentrate.

A series of valves (banks of 2 and 3 ways electric actuated ball valves (Type 107, 2-ways, 1.5", Georg Fischer LLC, Irvine, Calif. and TEBVA6-1, 3-ways, Plast-O-Matic Valves, Inc. Cedar Grove, N.J.) on the UF skid serve for automated switching of UF operation between filtration and backwash modes while maintaining substantially constant productivity for the RO module. Backwash pressure (AST4000 Industrial P Sensor, 0.5% Acc. 0-517 kPa, American Sensor Technologies, Inc., NJ) and flow rate (Signet Magnetic FM Type 2551, 2", 0-151 L/m, George Fischer Signet, Inc. El Monte, Calif.) were monitored online during the backwash period.

In the integrated UF-RO system, sequential backwash of the UF modules is accomplished sequentially, whereby as a given UF module is backwashed the remaining two maintain (through filtration at increased flux) the specified feed flow to the RO unit. UF backwash is achieved by directing the RO concentrate from the RO modules to the UF backwash line at relatively low pressure (about 48-50 kPa) for continuous backwash (e.g., without a pulse backwash). It is noted that for the present example system, at its typical RO operational recovery of about 35%, continuous RO backwash flux would be about 1.90 times the normal UF operational filtration flux. The above is below the typical range of manufacturer recommended backwash flux of about 2-3 times the filtration flux. Therefore, the system was designed with a capability for pulse backwash in order to elevate the backwash flux and provide for effective UF operation. The above is accomplished in the present example system with self-generation of backwash pulse (e.g., charging of the hydraulic accumulators without the use of auxiliary pumps) and flexibility of triggering multiple pulses during a backwash cycle.

A pulse backwash cycle involves a charging period during which the three-ways drain valve (V4) is opened to the direction of flow regulator V5 (Type 514 diaphragm valve, ½" PVC, Georg Fischer LLC, Irvine, Calif.) and the accumulators (Sentry C111ND, Blacoh Fluid Control, INC., Riverside, Calif.) are filled with RO backwash water. During the discharge period, valve V4 is set to divert the RO concentrate flow to drain line (FIG. 6) leading to a rapid (pulse) discharge of the accumulators. The pressure-time profile of the accumulator during charging and discharge is governed by the pressure drop in the flow segment between locations 2 and 4 (FIG. 6). The pressure drop (kPa) for the above flow segment was expressed as $\Delta P = (Q^2/K_i^2) \cdot SG$, where Q (m$^3$/h) is the flow rate, SG is the water specific gravity, and where flow coefficients value during accumulator charging is given as $K_i = K_c$, and by $K_i = K_d$ during discharge. The above flow coefficients were determined experimentally from a series of pressure-flow rate measurements for the valve positions set for the above two conditions. These coefficients were essentially constant for the present example system and over the range of operating conditions in the study.

In the present example system configuration, accumulator charging and discharging can be repeated multiple times during each backwash period. In the present example system, the complete backwash cycle (combination of continuous and pulse backwash) was programmed to be autonomous with backwash triggered by a system controller that tracks the UF fouling resistance.

Field Study:

The effectiveness of direct UF backwash with RO concentrate and the effectiveness of pulse backwash were evaluated in an integrated UF-RO system at the seawater desalination test facility at the Naval Facilities Engineering and Expeditionary Warfare Center (NAVFAC EXWC) at Port Hueneme, Calif. Raw surface ocean water was pumped directly from the port channel through a pumping/distribution facility before delivery to the UF-RO system. The average intake seawater quality is shown in Table 1.

The influence of the charging flow coefficient, $K_c$, and RO concentrate flow rate (adjusted by changing the RO recovery at a substantially fixed RO feed flow rate) on charging and discharge fluxes and pressure-time profiles was first evaluated using the accumulator model (see below) in a series of short-term field tests. The minimum $K_c$ value was about 1.86 which assured that the charging pressure did not exceed the manufacturer recommended maximum pressure limit of about 480 kPa for the UF module backwash. During pulse backwash (e.g., rapid discharge of the accumulator volume) the flow coefficient $K_d$ for the drain flow section (FIG. 6) was about 7.80.

UF backwash performance was first evaluated in short-term tests with and without pulse backwash at a substantially fixed backwash frequency, as well as assessing the added improvement of inline coagulant dosing. Subsequently, the effectiveness of pulse backwash that is self-triggered, based on a UF fouling resistance threshold, was demonstrated in a continuous operation over an eight day period. In this latter test, a secondary UF resistance threshold was utilized for initiating a sequence of either 2 or 4 sequential backwash pulses during a given backwash cycle.

TABLE 1

UF feed water and filtrate quality at the field study location

| Water Property | UF feed | UF filtrate |
|---|---|---|
| Turbidity (NTU) | 1.7-14 | <0.02 |
| TDS (Total Dissolved Solids) (ppm) | 33,440-36,800 | 33,440-36,800 |
| Chlorophyll α (µg/L) | 12-400 | <0.7 |
| pH | 7.5-8.2 | 7.5-8.2 |
| Temperature ° C. | 11.2-19.7 | 11.2-19.7 |

Pulse Backwash Model:

The hydraulic accumulator used in the present example system includes gas and liquid compartments separated by a rubber type bladder. The hydraulic accumulator is charged with liquid that is pressurized (from the RO concentrate line, FIG. 6) such that the pressure in the gas chamber ($P_g$) also increases as its volume ($V_g$) decreases. The total accumulator volume, $V_{acc}$, is the sum of the gas ($V_g$) and liquid ($V_l$) compartment volumes:

$$V_{acc} = V_l + V_g$$

The gas volume ($V_g$) can be assumed to follow adiabatic compression/expansion of an ideal gas, namely:

$$PV_g^\gamma = C,$$

where C is a constant and $\gamma = C_p/C_v$ is the ratio of the constant pressure ($C_p$) and constant volume ($C_v$) heat capacities, respectively. For ideal gas $\gamma = 1$ and for rapid adiabatic expansion γ=1.4. The hydraulic accumulator's gas chamber is pre-charged with air and as the liquid compartment is filled with the backwash fluid (RO concentrate in the present case) $V_l$ increases while correspondingly $V_g$ decreases while gas chamber pressure increases.

The UF backwash flow rate $Q_b$ (L/min) in the integrated RO-UF system (FIG. 6) is given as:

$$Q_b = Q_c - Q_p$$

where $Q_c$ (L/min) and $Q_p$ (L/min) represent the flow rates of concentrate from the RO module and the liquid flowing into/out of the accumulators during the backwash operation, respectively. $Q_p$ can be obtained from the time rate of change of the accumulator liquid volume:

$$Q_p = \frac{dV_l}{dt} = \frac{C^{\frac{1}{\gamma}}}{\gamma \cdot P_{acc}^{\frac{1}{\gamma}+1}} \cdot \frac{dP_{acc}}{dt}$$

where t (s) is time and $P_{acc}$ (kPa) is the hydraulic pressure at the accumulator outlet (also designated as $P_1$ at location 1 in FIG. 6) that can be determined considering the pressure drop over the flow segment between locations 1-2 and 2-4 as indicated on FIG. 6. In the present example system the pressure drop between the accumulator and the UF module/valve plus piping segment (FIG. 6, between locations 1 and 4) can be expressed as:

$$P_{acc} - P_0 = (P_{acc} - P_2) + (P_2 - P_3) + (P_3 - P_4) \simeq \left(\frac{Q_b}{A \cdot L_p}\right) + \left(\frac{Q_b}{K_i}\right)^2$$

where $P_0$ (kPa) is the pressure at the UF backwash drain outlet (location 4, FIG. 6) which is considered at atmospheric pressure. The pressure drop in the piping section between location 2 and 3 (FIG. 6) was relatively small such that $(P_2-P_3)/(P_{acc}-P_2)<0.05$; therefore it is reasonable to approximate the pressure difference $(P_{acc}-P_0)$ as the sum of the UF module transmembrane pressure $(\Delta P_{UF})$ and across UF drain section (between locations 1-2 and 3-4, FIG. 6), respectively. $\Delta P_{UF}$, is related to the UF permeation flux, $J_{UF}=L_p \cdot \Delta P_{UF}$, where $L_p$ is the average UF membrane permeability during backwash (L/m²·h·kPa), and A is the UF module membrane area (m²). During accumulator charging, $K_i=K_c$ and during discharge, $K_i=K_d$ with these coefficients taken as constants when the flow is in the turbulent regime.

The discharge (or charge) flow rate, $Q_b$, can be determined as:

$$Q_b = \frac{\sqrt{1 + 4 \cdot \alpha \cdot \beta \cdot (P_{acc} - P_0)} - 1}{2 \cdot \alpha}$$

in which $\alpha = A \cdot L_p/K_i^2$ and $\beta = A \cdot L_p$, and where the pressure term, $P_{acc}$, can be determined from the differential equation obtained as follows:

$$\frac{dP_{acc}}{dt} = Q_c \cdot \frac{\gamma \cdot P_{acc}^{\frac{1}{\gamma}+1}}{C^{\frac{1}{\gamma}}} - \frac{\sqrt{1 + 4 \cdot \alpha \cdot \beta \cdot (P_{acc} - P_0)} - 1}{2 \cdot \alpha} \cdot \frac{\gamma \cdot P_{acc}^{\frac{1}{\gamma}+1}}{C^{\frac{1}{\gamma}}}$$

which can be solved numerically for the pulse backwash charging and discharging periods given the appropriate $K_i$ values and the initial condition for the pressure. The maximum attainable charging pressure $P_{max}$ as determined from the above equation (by setting $dP_{acc}/dt=0$) is:

$$P_{max} = [(2 \cdot Q_c \cdot \alpha + 1)^2 - 1]/[4\alpha \cdot \beta]$$

and the maximum discharge flow rate, $Q_{max}$, is determined by substituting $P_{max}$ into the above equation for the discharge (or charge) flow rate $Q_b$.

Results and Discussion

Figure 7:
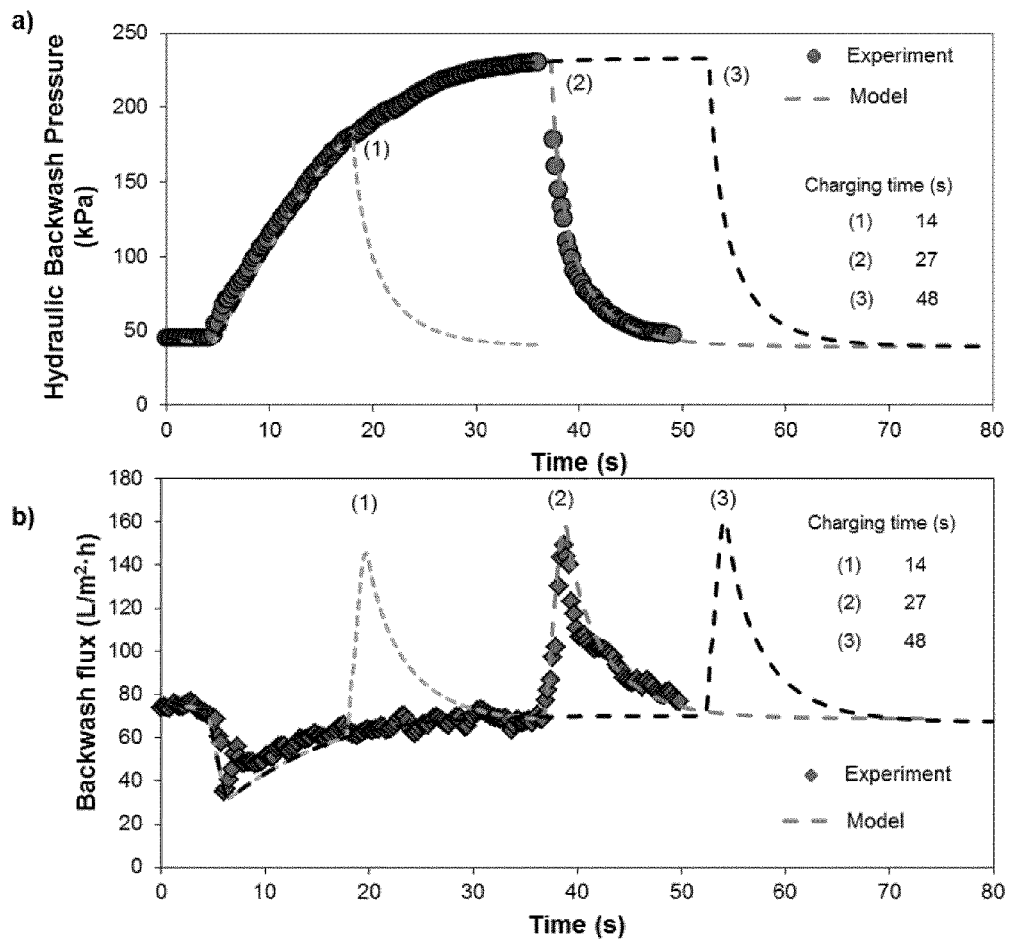
FIG. 7. Illustration of PBW model predictions compared with experimental total backwash flux (continuous and pulse backwash) and accumulator pressure profiles. a) Pressure profiles for the PBW charging and discharging cycle. b) Backwash flux profile for the PBW charging and discharging period. UF single module filtration flux: about 34.4 L/m²·h. PBW conditions: RO concentrate backwash flowrate: about 57 L/min, $K_c$: about 2.31, $K_d$: about 7.80. Note: The dashed line depicts the model predicted pressure and flux profiles for charging time of about 14, about 27 and about 48 seconds.

UF Pulse Backwash (PBW) Pressure and Flux Profiles:

The pressure and backwash flux profiles for the accumulator charging and discharge cycles are illustrated in FIG. 7 for RO concentrate flowrate of about 57 L/min and flow coefficients $K_c$ and $K_d$ values of about 2.31 and about 7.8, respectively. As the hydraulic accumulator is charged with the RO concentrate its pressure increases up to the maximum value that is reached within about 35 s. During the accumulator charging period, as the RO concentrate fills the accumulator, the continuous RO concentrate backwash flux decreases somewhat. In all cases the total pulse discharged volume is substantially equal to the water volume stored in the accumulator by the end of the charging period. However, the maximum attainable pulse backwash flux is higher when the accumulator discharge is carried out at a higher initial discharge pressure (attained for longer charging periods) as depicted in FIG. 7. Reaching a higher accumulator pressure (and thus higher peak pulse backwash flux) involves a longer charging time and thus there is a tradeoff between the desire to increase the backwash flux and the longest charging period for attaining the maximum pressure. For example, in order to increase the charging pressure from about 183 to about 233 kPa (about 27% increase), the charging time had to be raised from about 14 s to about 48 s; correspondingly, the maximum attainable pulse backwash flux increases by just about 10.8% upon increasing the maximum accumulator charging pressure by about 27%. For the illustration of FIG. 7, the backwash flux was (for a period of about 8-9 s) a factor of about 2.5-4.6 above the normal module filtration flux which is well within the recommended range. It is noted that in the above case the peak backwash flux was a factor of about 4.2-4.6 above the normal filtration flux.

Figure 8:
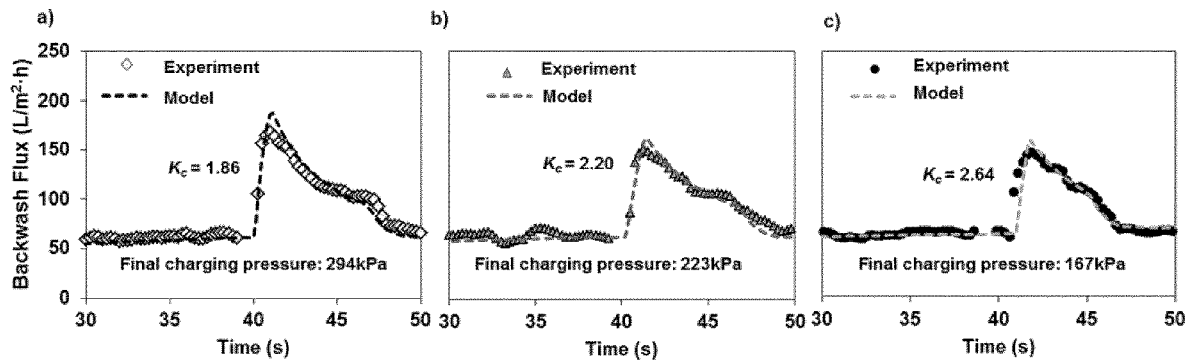
FIG. 8. Backwash flux profile attained as an outcome of different conditions of accumulator charging for different values of the flow coefficient $K_c$. Experimental conditions: UF single module filtration flux: about 35.0 L/m²·h. Pulse backwash condition: RO concentrate backwash flowrate: about 57 L/min, $K_d$: about 7.80, Charging time was about 33 s.

The rate of accumulator pressure increase can be controlled to some degree by adjusting the position of Valve V5 (FIG. 6). For example, restricting the valve opening lowers the flow coefficient $K_c$, which then increases the rate of pressure rise leading to a higher maximum attained accumulator pressure. As a consequence a higher pulse backwash flux can be reached. As shown in FIG. 8, as the flow coefficient, $K_c$, decreased from a value of about 2.64 to about 1.86 (an about 29.5% decrease), for the charging period of about 33 s, the attained accumulator pressure increased from about 167 kPa by about 76% (to about 294 kPa) with the peak backwash flux increasing by about 18% (from about 151 to about 177 L/m²·h). The accumulator model predictions closely matched the experimental data (FIG. 8) and where the predicted peak flux deviated by about 2.21-3.82% from the experimental values.

Figure 9:
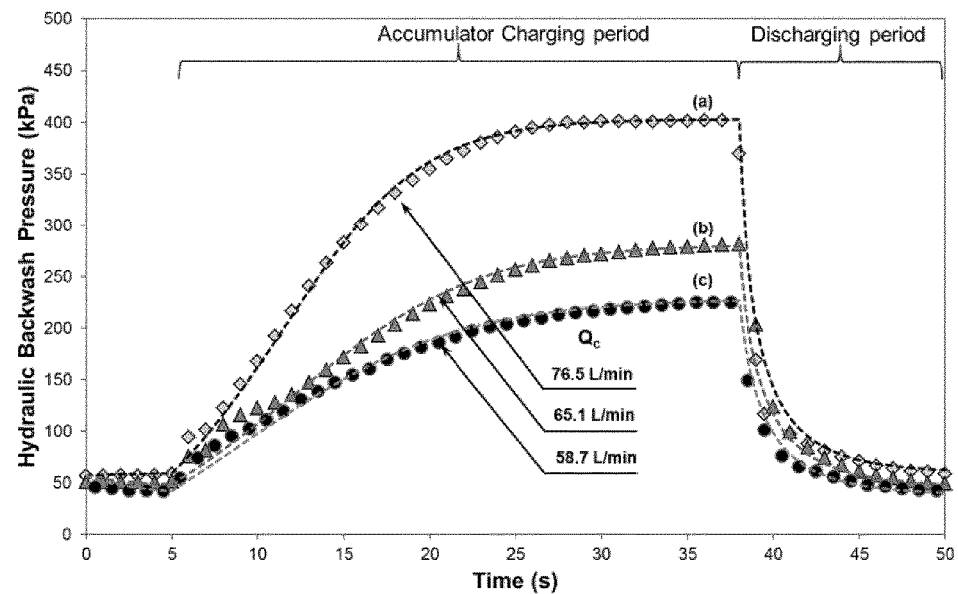
FIG. 9. Effect of RO concentrate flowrate on pulse backwash pressure profile. The experimental data and model predictions are represented by filled symbols and dashed lines, respectively. Experimental conditions: $K_c$: about 2.20, $K_d$: about 7.80, charging duration: about 30 s. Note: The accumulator charging pressure (gauge) prior to discharge were: a) about 409 kPa; b) about 327 kPa; and c) about 256 kPa.
Figure 10:
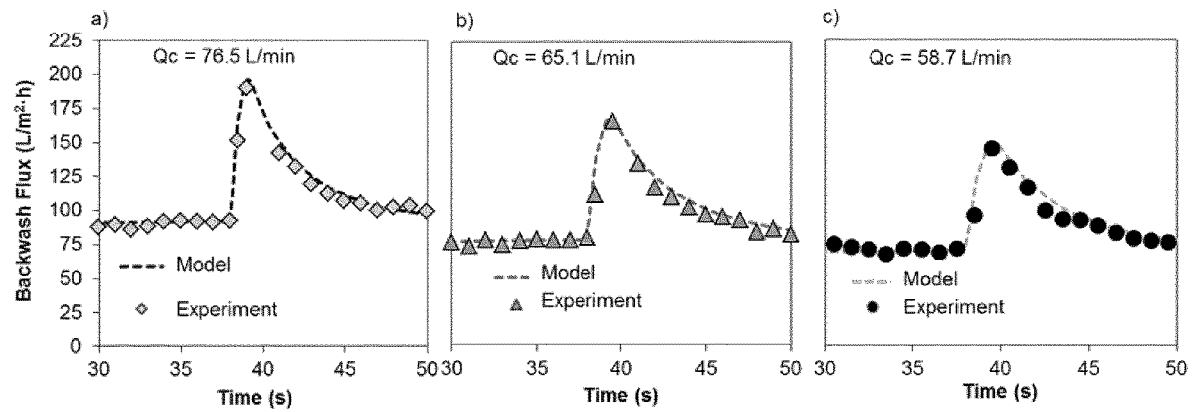
FIG. 10. Effect of RO concentrate flowrate on pulse backwash flux profile. Experimental conditions: $K_c$: about 2.20, $K_d$: about 7.80, charging duration: about 30 s. Note: The accumulator charging pressure (gauge) prior to discharge were: a) about 409 kPa; b) about 327 kPa; and c) about 256 kPa.

Higher RO concentrate flow rate ($Q_c$) would allow higher accumulator pressure and backwash flux to be attained as can be verified from predictions of the accumulator model (FIG. 9) which closely match the experimental data (FIG. 9, FIG. 10 and Table 2). As an example of the impact of RO concentrate flow, raising the concentrate flow rate from about 58.7 L/min by about 30% (to about 76.5 L/min; achieved by increasing UF filtration flux for the present example system) elevated the final charging pressure (Table 2) from about 225 kPa (attained in about 37 s) to about 402 kPa (attained in about 32 s), while the peak pulse backwash flux increased by about 31.3% (from about 144.6 to about 190.1 L/m²·h). Clearly, adjustment of $Q_c$ (e.g., diverting part of the RO concentrate to UF backwash) offers additional flexibility in controlling the desirable peak pressure (e.g., to avoid over-pressurizing the UF module during backwash). However, from a practical viewpoint it should be noted that $Q_c$ is more likely to be dictated by the target RO system productivity.

Figure 11:
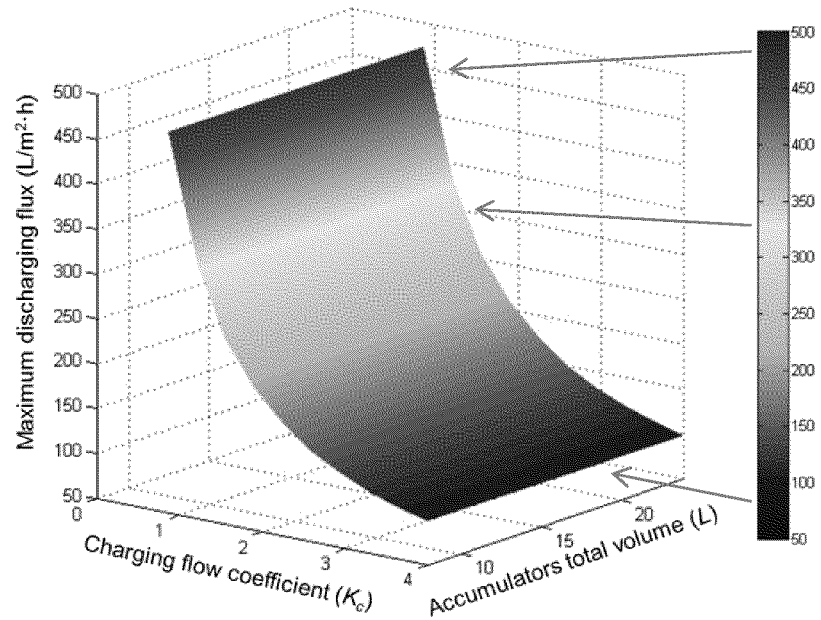
FIG. 11. Dependence of peak pulse backwash flux (L/m²·h) on pulse backwash flow coefficient ($K_c$) and accumulator volume (L). ($K_d$=about 7.80, RO concentrate backwash flowrate=about 58.3 L/min).
Figure 12:
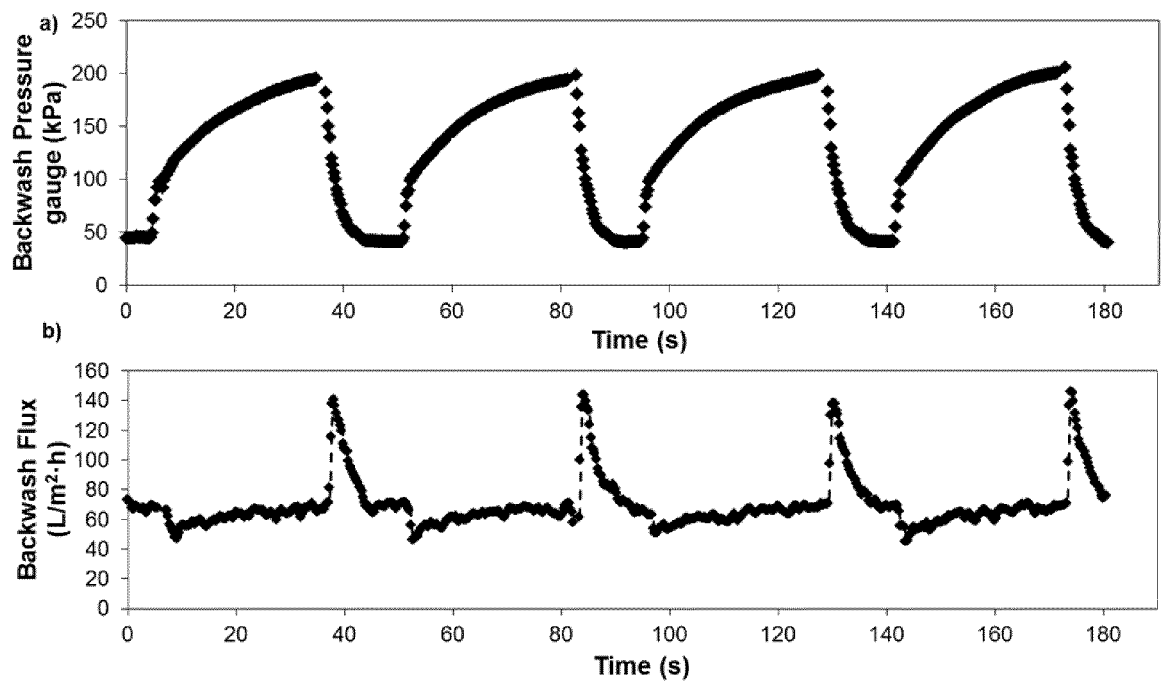
FIG. 12. Demonstration of consecutive pulses of UF backwash during a UF backwash period of about 180 s. a) Backwash accumulator pressure profiles, and b) backwash flux profile (continuous RO concentrate backwash+accumulator pulse backwash). Flow charging and discharge coefficients were set at $K_c$=about 2.21 and $K_d$=about 7.80 with accumulator charging period of about 35 s and discharge period of about 13 s for a total backwash period per cycle of about 48 s and where the continuous RO concentrate backwash flux was about 70 L/m²·h. UF system filtration flux per module: about 34.4 L/m²·h.
Figure 13:
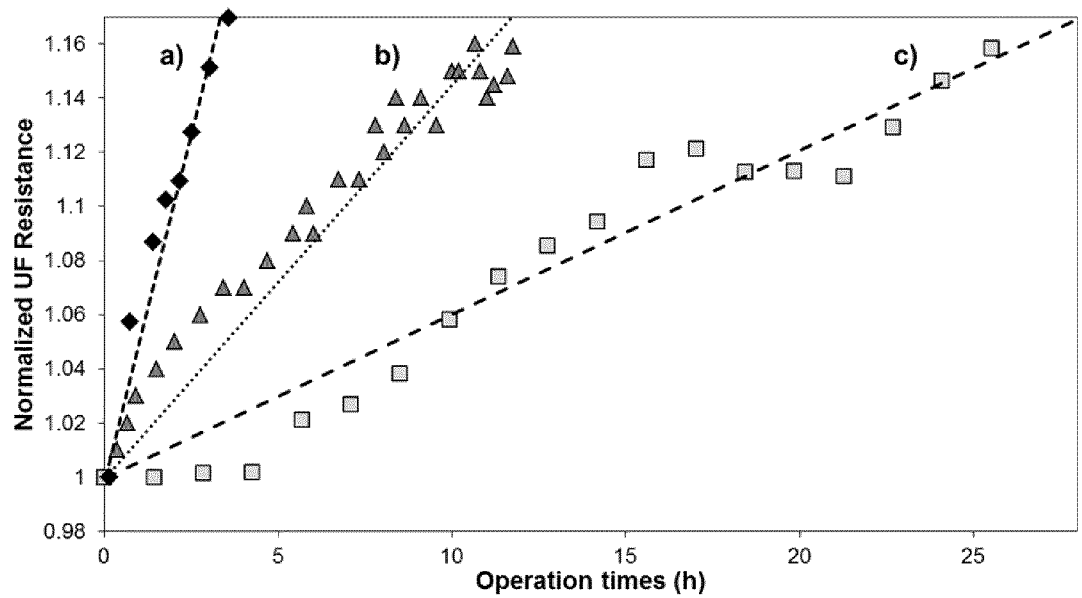
FIG. 13. Comparison of the progression of UF fouling resistance for the following UF operation and backwash strategies: (a) UF filtration without coagulation with backwash triggered every about 30 min with a continuous RO concentrate backwash (about 71 L/m²·h) for a period of about 45 s, followed by two backwash pulses each yielding a peak backwash flux of about 141 L/m²·h. Raw feed water turbidity=1.56±0.42 NTU; (b) UF with inline coagulation (dose: $Fe^{3+}$: about 4.01 mg/L) with backwash triggered as in (a) with continuous backwash followed by a single backwash pulse of peak flux of about 141 L/m²·h. UF feed water turbidity: 1.46±0.19 NTU; and (c) UF filtration as in (b) with a continuous backwash period that is followed by two consecutive backwash pulses each yielding a peak backwash flux of about 142 L/m²·h. UF feed water turbidity: 2.20±0.64 NTU. (Flow charging and discharge coefficients set at $K_c$=about 2.21 and $K_d$=about 7.80, RO feed flow rate=about 86.7 L/min, RO recovery: about 35.4%).

For the present integrated UF-RO system with its capability for direct UF backwash with the RO concentrate and its two hydraulic accumulators, the peak backwash flux (the sum of the pulse backwash and the continuous RO concentrate backwash flows) was in the range of about 4.2-4.4 times the normal filtration flux which was well within the recommended range. The use of larger volume accumulators can be useful in attaining a longer backwash pulse, although the peak pulse backwash flux would be unaltered (FIG. 11). Increasing the peak pulse backwash flux can be achieved via control of Valve 5 (FIG. 6), so as to increase the accumulator hydraulic pressure upon being filled with the RO concentrate. For example, in the present system, at the maximum allowable UF operational pressure of about 480 kPa, the maximum feasible peak backwash flux was about 252 L/m²·h for RO system operation at a feed flow rate of about 62.4 L/min and at recovery of about 35%. Finally, it is noted that operation with consecutive backwash pulses is feasible (FIG. 12) with a consistent charging period and peak pulse backwash flux.

coagulation and fixed backwash frequency (every 30 minutes) with continuous RO concentrate backwash flux of about 71 L/m²·h for about 45 s, followed by two backwash pulses yielding a peak backwash flux of about 141 L/m²·h; (b) UF operation with inline coagulation (about 4.01 mg/L $Fe^{3+}$) and backwash strategy as above, but with a single backwash pulse yielding a peak backwash flux of about 141 L/m²·h; and (c) UF operation and backwash scheme as in (b) but with two consecutive backwash pulses (each providing peak backwash flux of about 142 L/m²·h) in each backwash cycle. In these tests the normalized UF membrane resistance at the beginning of each filtration cycle was expressed as $R_{UF,i}=(R_i-R_o)/R_o$, where $R_i$ is the overall membrane resistance at the beginning of the ith filtration cycle (just after backwash), and $R_o$ is the membrane resistance at the beginning of the filtration test period. Results of the above three tests as depicted in FIG. 13, demonstrate that UF operation without coagulation is less effective even when using two backwash pulses relative to a single one. The rate of fouling in case (a) without coagulation is about a factor of 3.5 higher than for case (b) with coagulation and a single backwash pulse per backwash cycle. However, when using two consecutive pulses in case (c) instead of a single one as in operation (b), the rate of fouling was lowered by about a factor of about 2.4, even though the feed water turbidity was about 40% higher (2.20±0.64 NTU) than during the former two tests.

The short-term UF tests (FIG. 13) indicated that the backwash strategy as per test (c) would be beneficial. However, it was also of interest to assess if increasing the number of backwash pulses would increase backwash effec-

TABLE 2

Effect of varying flow coefficient setting of the UF backwash drain line ($K_c$) and RO concentrate flowrate on peak charging pressure and peak backwash flux Effect of varying flow coefficient setting ($K_c$)

| Flow coefficient during charging | UF filtration flux per module | Accumulator charging | Accumulator discharge | Final charging pressure[c] (kPa) | | Peak pulse backwash flux (L/m² · h) | |
|---|---|---|---|---|---|---|---|
| $K_c$ | (L/m² · h) | time ($\Delta t_c$) | time ($\Delta t_d$) | Theory | Exp. | Theory | Exp. |
| 1.86 | 35.0 | 33.0 | 10 | 295 | 294 | 181 | 177 |
| 2.20 | 35.0 | 33.0 | 9.5 | 224 | 223 | 162 | 156 |
| 2.64 | 35.0 | 33.5 | 9.8 | 167 | 167 | 157 | 151 |

Effect of varying RO concentrate flowrate (Qc)

| RO concentrate flowrate, $Q_c$ | UF filtration flux per module | Accumulator charging | Accumulator discharge | Final charging pressure[c] (kPa) | | Peak pulse backwash flux (L/m² · h) | |
|---|---|---|---|---|---|---|---|
| (L/min)[b] | (L/m² · h) | time ($\Delta t_c$) | time ($\Delta t_d$) | Theory | Exp. | Theory | Exp. |
| 57.0 | 32.6 | 32.8 | 12.5 | 227 | 225 | 147.5 | 144.6 |
| 66.0 | 36.2 | 33.0 | 12.5 | 280 | 281 | 168.5 | 165.6 |
| 76.0 | 42.9 | 33.5 | 12.7 | 403 | 402 | 194.9 | 190.1 |

(a) $K_c$ = about 2.2; RO concentrate backwash flowrate: about 57 L/min, $K_d$: about 7.8; RO recovery: about 34.4%,
[b] RO recovery: about 28.8%;
[c] gauge pressure.

Figure 14:
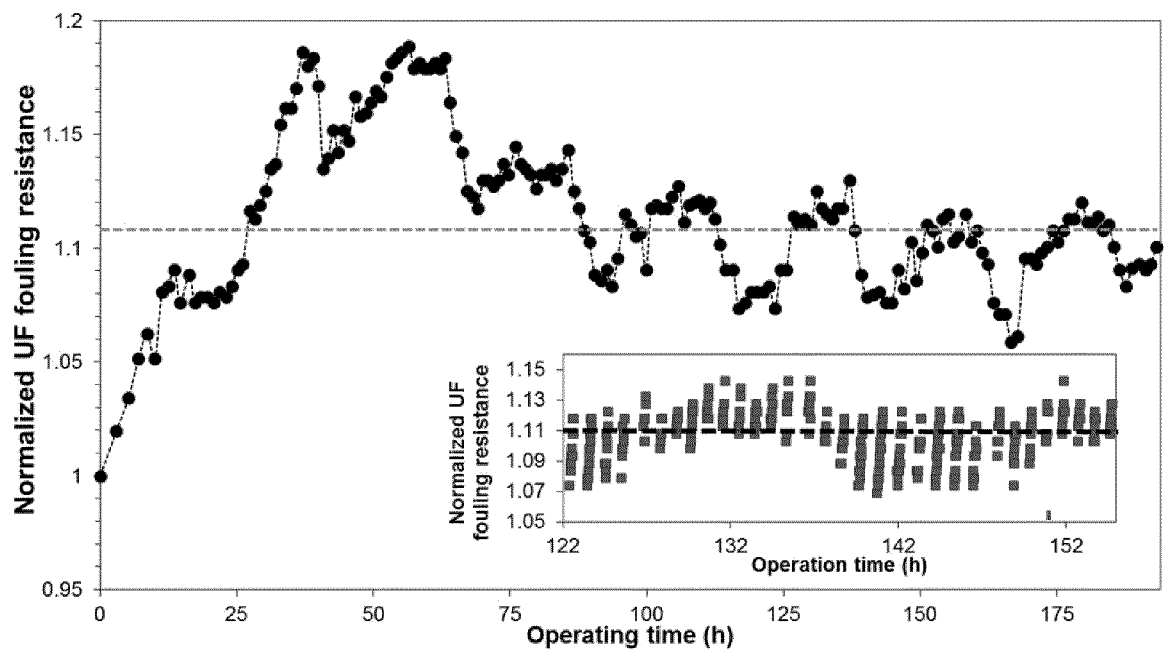
FIG. 14. Evolution of UF resistance (normalized with respect to initial UF resistance) during UF operation with coagulation (about 4.01 mg/L $Fe^{3+}$) and self-adaptive backwash triggering. Backwash with a continuous RO concentrate flow rate (about 56 L/min for RO operation at about 35.4%) was for a period of about 45 s, followed by either two or four consecutive backwash pulses as determined by a normalized UF resistance threshold (indicated by the dashed line in the main and inset Figures). The inset Figure illustrates a trace of filtration cycles. (UF system filtration flux per module=about 34.4 L/m²·h, $K_c$=about 2.21, $K_d$=about 7.80, charging duration=about 35 s).

Effectiveness of Pulse and Continuous RO Concentrate Backwash:

In order to assess the effectiveness of combining continuous RO concentrate backwash with pulse backwash, seawater desalting tests were conducted with the UF-RO pilot under the following conditions: (a) UF operation without tiveness. Accordingly, a self-adaptive UF backwash strategy was utilized whereby UF backwash was triggered when the UF resistance reached a level such that $\Delta R_{UF}/R_o \geq 2$, where $\Delta R_{UF}$ is the maximum allowable UF resistance increase per filtration period, and $R_o$ is the initial membrane resistance. Studies on self-adaptive UF backwash triggering indicated that a value of δ=0.034 was adequate for the present UF system. Although a higher δ value can be set as a threshold to allow a longer filtration time, such operation would in turn involve a longer backwash period for effective UF operation. Therefore, there is a tradeoff with respect to triggering backwash and in general setting a backwash trigger such that filtration periods are in the range of about 30 min to about 1 hr. Once backwash is triggered, if the UF resistance at the beginning of the given filtration cycle is below a given threshold, namely $R_{UF}/R_o < \alpha$, then two consecutive pulses are triggered post the continuous backwash period of about 45 s. On the other hand, if at the beginning of the filtration cycle $R_{UF}/R_o \geq \alpha$ then four consecutive backwash pulses are utilized post the continuous concentrate backwash period. The above filtration and backwash strategy, with α=about 1.11, was evaluated over a period of about 8 days (FIG. 14) during which the raw seawater turbidity and chlorophyll a were in the range of about 1.75-about 5.21 NTUs and about 31-about 121 μg/L, respectively. While there was no apparent correlation with the UF resistance-time profile, UF fouling is likely to be impacted by multiplicity of water quality parameters; hence, the challenge of establishing a UF operational strategy based on multiple water quality metrics. Therefore, in the present approach, UF backwash strategy was established based on real-time tracking of the UF resistance. As the field test results indicate (FIG. 14), the UF system fouling rate was high initially but fouling was brought under control despite significant variability of water quality over the course of the field test. Here it is important to note that no attempt was made to optimize the number of backwash pulses. Nonetheless, the results indicates that the combination of continuous backwash with variable backwash pulse frequency can be effective in significantly improving UF operation.

Conclusions:

The integration of continuous UF backwash with direct supply of RO concentrate along with pulse backwash using hydraulic accumulators was evaluated in an integrated UF-RO seawater desalination system. Model analysis of the hydraulic accumulator operability, along with experimental validation, demonstrated that direct accumulator charging, with the RO concentrate, to nearly the peak charging pressure can be achieved within a period of about 30-40 s. Using the hydraulic accumulators that were self-charged via the pressurized RO concentrate stream, along with continuous delivery of UF backwash of RO concentrate (from the RO unit), provided peak UF backwash flux that was up to a factor of about 4.2-about 4.6 higher than the normal filtration flux. UF operation that combines direct continuous RO concentrate backwash with multiple consecutive backwash pulses was found to be more effective than with a single pulse, while inline coagulation further increased the UF performance. Self-adaptive triggering of UF backwash, whereby the number of consecutive pulses increased when a higher membrane fouling resistance was reached, was shown to be highly effective and provide stable UF operation over significant period over a wider range of water quality conditions and without the need for chemical cleaning. The present results indicate that the present UF-RO integration with enhanced UF backwash can be achieved without sacrificing water productivity given the use of RO concentrate for backwash and the flexibility of triggering multiple consecutive backwash pulses.

Example 3

Self-Adaptive Cycle-to-Cycle Control of In-Line Coagulant Dosing in Ultrafiltration for Pre-Treatment of Reverse Osmosis Feed Water Overview:

Real-time self-adaptive approach to in-line UF coagulant dosing was developed and field demonstrated for integrated UF-RO seawater desalination. A coagulant dose controller was designed and successfully implemented in a pilot UF-RO seawater desalination plant. The coagulant controller, which tracks the UF resistance during filtration and backwash, adjusts coagulant dose to the UF feed with the objective of reducing the incremental cycle-to-cycle UF post-backwash (PB) resistance change ($\Delta_n$). Real-time tracking the above UF resistance metrics, as well as the rate of change of $\Delta_n$ with coagulant dose, allowed the controller to quantify the progression of both irreversible fouling and UF backwash effectiveness. The above information was then utilized by the controller to make the appropriate coagulant adjustment. Field tests of the proposed self-adaptive coagulant dosing approach demonstrated measurable coagulant dose reduction while maintaining robust UF operation even during periods of both mild and severe water quality degradation. The approach to real-time coagulant dose control developed in the present example should be suitable for both seawater and brackish water UF treatment and has the potential of providing both effective UF operation as well as reduction in coagulant use.

Introduction:

Over the past two decades, reverse osmosis (RO) desalination has emerged as the leading technology for seawater and brackish water desalination. However, membrane fouling remains a major challenge for robust operation of RO desalination plants. Hence, effective RO feed pre-treatment is desired for long-term operation of an RO desalination system. Among RO pre-treatment technologies, ultrafiltration (UF) membrane filtration has proven to be effective for providing high quality filtrate water compared to other feed pre-treatment options (e.g., sand filters, cartridge filters), leading to longer lifespan of RO membranes downstream. It is important to note that when relying on UF pre-treatment for RO, the burden of alleviating the adverse impact of membrane fouling (e.g., higher specified applied pressure for a given water production level), is assumed by the UF system.

Despite the above challenges, UF feed pre-treatment is attractive for RO operation since UF membrane resistance (inverse of UF membrane permeability), which increases during filtration due to fouling, can in principle be reduced by removing the foulant layer through effective backwashing (e.g., reversing the flow direction). However, physical UF backwash (e.g., without employing chemical cleaning) is typically insufficient for completely reducing UF membrane resistance to its original state. Consequently, UF foulants that are not removed during backwash result in UF irreversible fouling. When UF backwash is no longer sufficient for effective UF membrane cleaning, chemical cleaning-in-place (CIP) can be used to remove the irreversible fouling layer. However, due to the logistics (e.g., handling of chemicals) and added capital costs (e.g., plant shut-down and chemical costs), it is desirable that CIP be done as infrequently as possible. Due to this, it is desired to optimize UF backwash by reducing cycle-to-cycle build-up of irreversible fouling.

Backwash effectiveness can be impacted by various factors such as backwash water composition or membrane properties. Varying operational parameters such as backwash frequency can increase UF operational duration before the need for CIP. Use of coagulant for UF feed pre-treatment can yield improved UF product quality and reduced UF fouling. Coagulant dosing can promote the formation of flocs (e.g., aggregation of fine particles and colloidal matter)

which improves both UF and MF membrane filtration and hydraulic cleaning. Also, UF pore plugging and irreversible fouling can decrease with increasing coagulant dose up to an optimal maximum limit beyond which there is little added benefit. However, excessive coagulant dosing increases process cost and the potential for coagulant passage across the membrane to the permeate stream. Accordingly, an approach to UF operation is to search for the optimal coagulant dose via the combination of jar testing and preliminary pilot-plant runs. However, UF feed water quality and fouling propensity can vary significantly with time in the short term, as well as seasonally. Therefore, the optimal coagulant dose can change as feed water quality changes; hence, operating at a fixed coagulant dose can lead to suboptimal UF operation that can then increase membrane resistance. Thus, under conditions of variable feed water quality, determination of the optimal coagulant dose(s), which is dependent on source water quality, is infeasible by off-line methods (e.g., jar testing). Hence, real-time adjustment of coagulant dose is desired where variable source water quality is encountered.

Determination of an optimal coagulant dose in real-time for the wide range of water quality conditions that may occur in various locations is a daunting task. Therefore, it would be beneficial to develop and deploy a coagulation controller, capable of adjusting the coagulant dose, without the need for establishing specific pre-determined empirical relationships of coagulant dose with multiple measurements of water quality and/or UF resistance metrics. Accordingly, in the present example, an improved approach is presented of in-line UF coagulant dose control which relies on real-time tracking of cycle-to-cycle UF post-backwash (PB) resistance in response to coagulant dose adjustments. The controller increases or decreases the coagulant dose depending on improvements in the cycle-to-cycle change in UF PB resistance. The coagulant dose adjustment is self-adaptive and thus the coagulant dose controller is suitable for a wide variety of feed water conditions. The developed coagulant dose controller was implemented and field demonstrated on a pilot seawater desalination plant (capable of about 18,000 gallons per day (GPD) production of fresh water). A series of field experiments, for periods ranging from a few days to two weeks, were undertaken to assess UF operation and coagulant savings in addition to reducing UF fouling under real-time coagulant dose control. Moreover, the response of the UF system to coagulant controller dose adjustments was evaluated during a period of decreased water quality.

Self-Adaptive Cycle-to-Cycle Coagulant Dose Controller

UF and Backwash Performance Metrics:

UF operation involves successive filtration cycles, specified as the duration of a filtration period and of a subsequent UF backwash period. During a filtration period, particulate matter in the feed water remains on the surface of the UF membrane or within its pores, forming a foulant layer which gradually increases in thickness as a function of filtration time. The impact of the foulant layer is typically quantified by UF resistance to fluid permeation through the UF module:

$$R_T = \frac{\Delta P_m}{\mu \cdot J_{UF}}$$

where $R_T$ is the total UF resistance (membrane and foulant layer), $\Delta P_m$ is the UF transmembrane pressure, $\mu$ is the water viscosity, and $J_{UF}$ is the UF filtrate flux. As filtration proceeds, coagulant is typically added to the feed stream at a constant dose rate (e.g., parts per million (ppm)) and the overall UF membrane resistance increases. UF backwash is triggered once the resistance reaches a threshold level or after a prescribed time period. Upon the completion of a given UF module backwash, the module is reverted back to filtration mode. Illustrations of UF membrane resistance during UF operation are shown schematically in FIG. 15. The change in UF PB resistance for cycle n relative to the previous cycle (n−1) is expressed as $\Delta_n = R_n - R_{n-1}$.

The cycle-to-cycle change in UF PB resistance as quantified by $\Delta_n$ governs the rate of UF PB resistance trajectory during UF operation. An illustration of the implication of $\Delta_n$ tracking is provided in FIG. 15 for a hypothetical series of UF cycles. A decrease in $\Delta_n$ signifies improved backwash effectiveness and reduction in the cycle-to-cycle buildup of membrane fouling resistance, while an increase in $\Delta_n$ indicates reduced backwash effectiveness and greater rate of foulant buildup on the membrane. Values of $\Delta_n$ can be positive (e.g., the typical case as illustrated for $\Delta_n$, for cycles n=1-3 and n−1 through n+1 in FIG. 15) or negative (e.g., $\Delta_4$ and $\Delta_5$ in FIG. 15) indicating increased fouling (e.g., buildup of un-backwashed resistance) or effective backwash that results in removal of previously un-backwashed foulant buildup, respectively. When the overall system UF operation is such that $\Delta_n > 0$ is the dominant behavior then the un-backwashed UF resistance will gradually increase. The slower UF resistance increase is apparent for cycles n−1 through n+1 (e.g., lower $\Delta_n$) compared to operation during cycles 1-3. UF operation with such gradual resistance increase will typically be allowed to continue until chemical cleaning will be specified (e.g., when the prescribed resistance or transmembrane pressure threshold for the UF operation is reached) in order to restore the membrane to its original clean state. Given the above, the overall coagulant control strategy is to reduce $\Delta_n$ in order to reduce the rate of increase of un-backwashed (or irreversible) UF fouling and reduce the frequency of chemical cleaning.

Coagulant Dose Adjustment Strategy and Control Logic:

Given that increasing coagulant dose can improve backwash effectiveness, $\Delta_n$ should decrease with increasing coagulant dose (e.g., UF backwash effectiveness improves and UF fouling is reduced as coagulant dose increases) up to a critical threshold above which $\Delta_n$ is not appreciably affected. The latter regime is where coagulant dose is at a high level where it no longer impacts UF backwash effectiveness. Accordingly, two distinct regions can be present with respect to the dependence of $\Delta_n$ on coagulant dose: a) a region where an increase in coagulant dose leads to decreased $\Delta_n$ (hereinafter termed as the "underdosed region"), and b) a region in which the coagulant dose is at or above a certain critical threshold (e.g., no further improvement in $\Delta_n$ with increased dose) designated as "overdosed region." The quantitative functional behavior of the above trends (an example is explained below) can be specific for the UF system configuration and capacity and for the given source water quality. Accordingly, in the present approach, the objective is to adjust the coagulant dose such that there is proper reduction or increased coagulant dose in the underdosed region. Moreover, system drift to the overdosed region is detected and where the appropriate control action is to reduce the coagulant dose.

In order to determine the desired coagulant dose adjustment, the present control approach is to monitor $\Delta_n$ for each filtration/backwash cycle as impacted by the coagulant dose. This information is then utilized to establish the appropriate coagulant dose change as per the logic flow chart of FIG. 16. The condition of $\Delta_n > 0$ signifies an incremental buildup of un-backwashed foulant that adds to the accumulated foulant layer. When the above condition is encountered for the current cycle (n) and the previous one (n−1) ($\Delta_n>0$ and $\Delta_{n-1}>0$), the control system first determines the difference in cycle-to-cycle change in UF PB resistance ($\Delta_n$ relative to $\Delta_{n-1}$) with respect to the coagulant dose quantified as $$\delta = \frac{\Delta_n - \Delta_{n-1}}{u_n - u_{n-1}},$$

where $u_n$ and $u_{n-1}$ are the coagulant doses that impact cycles n and n−1, respectively. The parameter δ, which is a measure of the slope of $\Delta_n$ vs $u_n$ and termed hereinafter the resistance-dose (RD) factor, is essentially a first order sensitivity of $\Delta_n$ with respect to $u_n$. If δ=0 this indicates that a cycle-to-cycle change in coagulant dose did not produce a measurable difference in the cycle-to-cycle change in UF PB resistance ($\Delta_n - \Delta_{n-1} = 0$). Therefore, the controller concludes that the system is in the overdose region (with respect to coagulant dose) and thus the coagulant dose is decreased. If, however, it is determined that δ<0 and where $\Delta_n - \Delta_{n-1} > 0$ (e.g., backwash effectiveness is declining due to the decrease in coagulant dose and/or increase in feedwater fouling potential) then UF operation is determined to be in the underdosed region (since $u_n < u_{n-1}$) with respect to the coagulant dose (see FIG. 16). The controller action is then to increase the coagulant dose in order to improve backwash effectiveness. For the same conditions of δ<0 if $\Delta_n - \Delta_{n-1} < 0$ (cycle-to-cycle decrease in the incremental buildup of un-backwashed resistance) given that the increasing coagulant ($u_n > u_{n-1}$) then the control action is continue increasing the coagulant dose so as to further improve backwash effectiveness. The condition of δ>0 can also arise when: (a) $\Delta_n - A_{n-1} < 0$ (e.g., due to improvement in backwash effectiveness and/or improved feedwater quality) while the coagulant dose is decreased ($u_n < u_{n-1}$). Thus, the appropriate control action is to further reduce the coagulant dose; and (b) coagulant dose is increasing $u_n > u_{n-1}$ but the incremental buildup of un-backwashed UF is rising, ($\Delta_n - \Delta_{n-1} > 0$) which indicates that the coagulant dose is too low and thus the control decision is to increase the coagulant dose.

The accumulated un-backwashed fouling can generally increase over the period of UF operation ($\Delta_n>0$). However, it is also possible for the UF PB resistance to decrease ($\Delta_n<0$) under certain conditions (e.g., when previously un-backwashed foulant is removed). The logical control action is to keep the coagulant dose unchanged. Here it is noted that, in principle, one can employ a conservative control action by decreasing the coagulant dose once the trend of $\Delta_n<0$ persists for a prescribed number (m) of cycles. It is noted that in the situation where $\Delta_n>0$ and where the previous performance was such that $\Delta_{n-1}<0$, a control action to change the coagulant dose should be undertaken to avoid a situation where δ cannot be calculated (since potentially $u_n = u_{n-1}$); a conservative control action is to reduce (rather than increase) the coagulant dose so as to avoid inadvertent overdosing.

Figure 17:
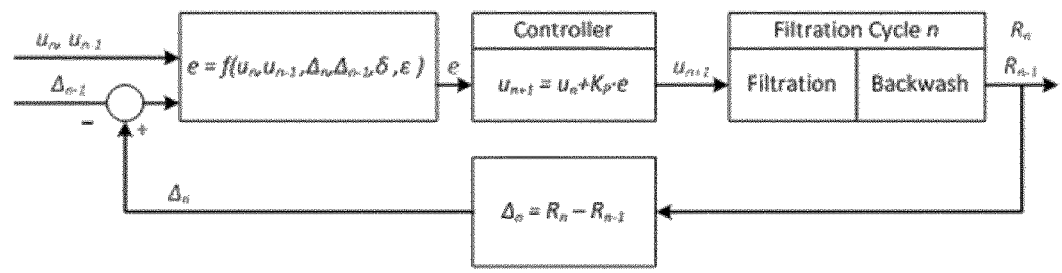
FIG. 17. Illustration of a control system for a self-adaptive coagulant dose controller.

Coagulant Dose Controller:

The control strategy as described above was implemented as a coagulant dose controller shown schematically in FIG. 17. In this control scheme, the coagulant dose change that may be specified for a new cycle (n+1) is determined based on information regarding the impact of the dose change on UF PB resistance as quantified by $\Delta_n$, $u_n$ and δ. It is noted that in a practical setting, process variability and sensor noise can be considered with respect to establishing the condition for δ being above, below or at zero. Accordingly, in the present coagulant controller implementation a threshold ε is introduced such that when δ<−ε, −ε<δ<−ε or δ>ε the RD factor is considered negative, vanishingly small (~0) or positive, respectively.

The control methodology is specified as per the following relation:

$$u_{n+1} = u_n + K_P \cdot e(u_n, u_{n-1}, \Delta_n, \Delta_{n-1}, \delta, \varepsilon)$$

in which $K_P$ is the proportional gain (e.g., $K_P>0$) and the function e takes on the values of +1, −1 or 0 corresponding to the control action of coagulant dose increase, decrease or no-action based on the categories described above: in which conditions 1 and 2 are for cases when the condition of $\Delta_n<0$ or $\Delta_{n-1}<0$, while conditions 3-5 apply when $\Delta_n>0$. The proportional gain, $K_P$, which is the incremental dose change set by the controller, can be tuned with initial UF field performance data with respect to coagulant dose. It is desirable for the proportional gain to provide sufficient incremental coagulant dose increase that will materialize in observed change in UF backwash performance. A reasonable value for $K_P$ can be established based on series of short-term UF filtration/backwash tests at different coagulant dose as detailed below. If desired, $K_P$ can be refined throughout the course of UF operation based on the history of variation of UF backwash effectiveness with coagulant dose, along with sensor input regarding feed water quality (e.g., turbidity, fluorescence).

Experimental

Figure 18:
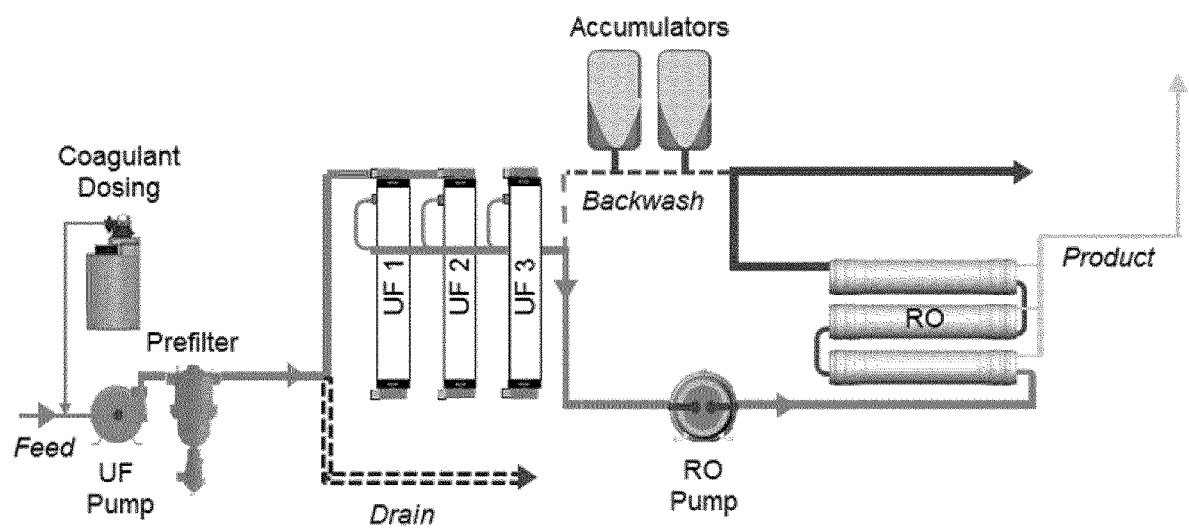
FIG. 18. Process diagram of an integrated UF-RO pilot plant. RO concentrate is used as the UF backwash water source.

UF-RO System:

The present approach to UF operation with real-time control of UF coagulant dosing was demonstrated in the operation of an integrated seawater UF-RO plant (FIG. 18) having permeate production capacity of about 45.4 m³/day (about 12,000 gallons/day). The UF pre-treatment unit included three multi-channel hollow-fiber (inside-out) UF elements (about 50 m² each; Dizzer 5000+, Inge, Greifenberg, Germany). Pertaining to the calculation of UF membrane resistance, a temperature correction factor (TCF=exp [0.019·(T−20)]) was utilized per the membrane manufacturer's specifications. Each element was housed in a module that allowed inlet for feed or backwash outlet at either the module bottom or top. The UF unit was directly integrated with the RO desalination unit and was backwashed using the RO concentrate. Raw feed water to the UF unit was first filtered using a self-cleaning 200 μm screen filter (TAF-500, Amiad, Mooresville, N.C.) installed upstream of the UF unit. In-line coagulant dosing into the UF feed line was achieved using a dosing pump (DDA, Grundfos, Downders Grove, Ill.). While the approach presented in the present example is not specific to the coagulant used, Ferric Chloride (FeCl₃; Gallade Chemical, Santa Ana, Calif.) was selected.

A centrifugal low-pressure UF pump (XT100 SS, 5 hp, Price Pump, Sonoma, USA) with VFD control (VLT AQUA Drive FC 202, 4.0 kW, Danfoss, Nordborg, Denmark) served for both delivering the water feed to the UF unit and for directing the UF filtrate to the RO feed pump. UF backwash was achieved with the RO concentrate delivered directly from the RO unit also making use of two hydraulic accumulators (C111ND, Blacoh Fluid Control, Riverside, Calif., USA). The above backwash strategy eliminates the need for both backwash storage tank and UF backwash pump. UF-RO system was equipped with a network of various sensors (conductivity, pH, temperature, turbidity, and fluorometer), flow meters, and pressure transducers interfaced with an embedded controller (cRIO-9022, National Instruments, Austin, Tex. USA) and data acquisition system. Real-time water quality data of the feed water was provided through sensors (chlorophyll a, turbidity) equipped in the feed line.

The pilot plant was deployed at the NAVFAC Seawater Desalination Test Facility in the Naval Base Ventura County (Port Hueneme, Calif., USA). Raw seawater feed was pumped from an open-sea intake through a strainer to the pilot plant. Feed salinity (about 33,440-36,800 mg/L total dissolved solids) and pH (about 7.5-8.2) varied within a relatively narrow range; however, variations of the feed total suspended solids (about 0.1-5.2 ppm), turbidity (about 0.4-14 NTU), and temperature (about 11.2-19.7° C.) were significant. The feed pretreatment system (200 μm screen filter and UF) provided water of turbidity ≤about 0.1 NTU which was sufficiently below the recommended maximum limit for RO desalting. Field tests included: (a) determination of the impact of step changes in coagulant dose on UF fouling and backwash effectiveness, (b) demonstration of the controller's ability to self-adjust the coagulant dose so as to maintain effective UF filtration and backwash during a period of changing feed water quality conditions, and (c) demonstration of the controller's ability to reduce coagulant consumption.

Field Studies and Demonstration of Coagulant Dose Control Strategy:

For the duration of this study, the UF system was operated in a self-adaptive mode whereby backwash was triggered based on a maximum allowable resistance of $1.36 \cdot 10^{11}$ m$^{-1}$ with a typical filtration cycle being about 16-22 minutes. The UF membrane modules were operated in dead-end filtration mode and operated at about 100% recovery for the duration of the field study (RO concentrate was used for UF backwash). The UF filtration resistance was recorded at a frequency of about 1 Hz. The UF PB resistance for a given cycle n (the initial UF resistance for cycle n+1) was taken as the average of the first 60 data points post-backwash. UF backwash was accomplished sequentially such that when one membrane module was being backwashed, the other two remained in filtration mode, but with increased operational flux in order to ensure that the RO system was provided with uninterrupted feed flow at the prescribed level. Filtration with the UF modules (positioned in the vertical configuration) was also alternated between top filtration (UF module fed from top) and bottom filtration (UF module fed from bottom). The UF PB resistance used by the controller was then averaged over eighteen complete filtration/backwash cycles (including three sets of sequential filtration/backwash for the three UF modules).

Pilot plant experiments were first carried out with the objective of arriving at a preliminary quantification of the impact of coagulant dose (0-4.9 mg/L Fe$^{3+}$) on the cycle-to-cycle change in UF PB resistance ($\Delta_n$). The pilot plant was operated at feed flow rate of about 75.7 L/min with the UF filtration flux being about 15.1 L/m$^2$h and with self-adaptive backwash triggering along with pulse backwash. These short-term (each of 5-6 hours duration) tests were conducted in order to establish the existence of the coagulant underdosed and overdosed regions and the control action thresholds for establishing whether a change in $\Delta_n$ can be considered to be significant. Subsequently, a series of field tests were conducted with UF operation at two different constant coagulant doses (about 1.9 and about 4.1 mg/L Fe$^{3+}$). These were followed by a series of field demonstrations (duration of about 70-about 140 hours) of the effectiveness of UF operation with real-time coagulant dose control.

Results and Discussion

Coagulant Dose Regimes and Coagulant Controller Tuning:

The impact of coagulant dose on the change in UF PB resistance ($\Delta_n$) was evaluated in a series of short-term experiments (FIG. 19) revealing the existence of: (a) an underdosed (low coagulant dose) region, where $\Delta_n$ decreases linearly with respect to coagulant dose, and (b) an overdosed (high coagulant dose) region where $\Delta_n$ is invariant with respect to coagulant dose.

Figure 19:
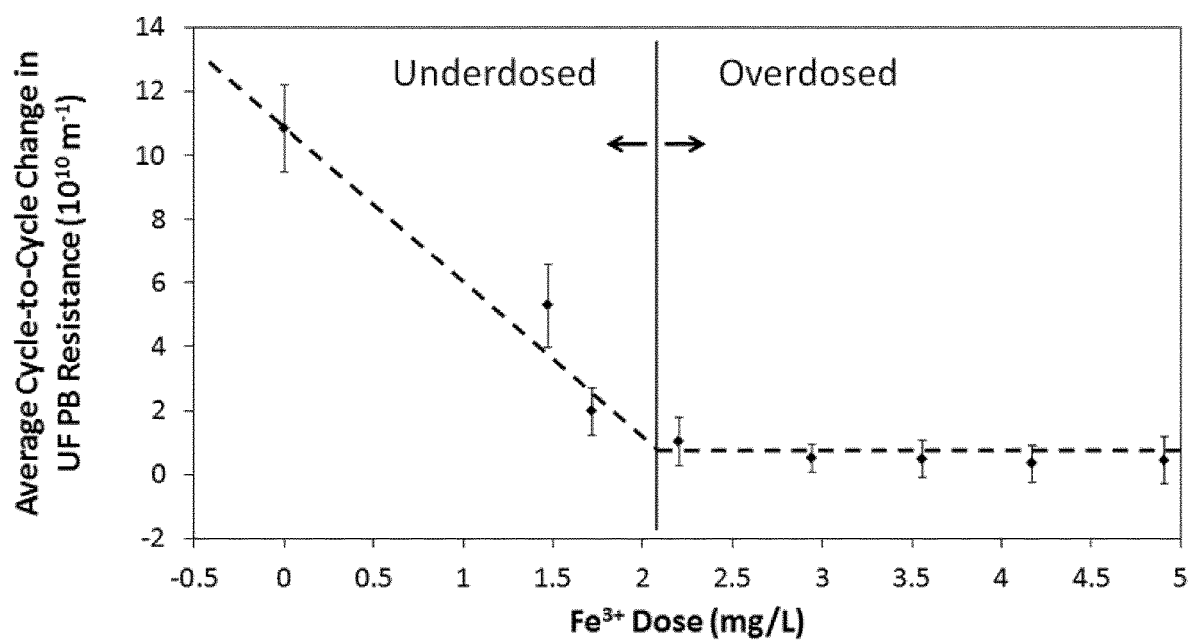
FIG. 19. Averaged cycle-to-cycle change in UF PB resistance ($\Delta_n$) with respect to coagulant ($FeCl_3$) dose. At low coagulant dose, $\Delta_n$ decreases with increasing coagulant dose. Above a threshold dose of about 2.1 mg/L $Fe^{3+}$, $\Delta_n$ is insensitive to further increase in coagulant dose.

Based on the filtration runs at different coagulant doses, the value of $\Delta_n$ at a given dose (obtained from multiple runs) was determined within a standard deviation of $\sigma=1.128 \cdot 10^{-10}$ m$^{-1}$. A change in $\Delta_n$ corresponding to $\sigma$ in the underdosed region (FIG. 19) can occur due to a coagulant dose change of about 0.241 ppm Fe$^{3+}$ (FIG. 19). Therefore, the controller proportional gain, $K_P$, was set to the above value. A significant change in backwash effectiveness is considered to have occurred if the change in $\Delta_n$ relative to $\Delta_{n-1}$ is such that $|\Delta_n - \Delta_{n-1}| > \sigma$ and where this change occurs due an incremental dose change of $K_p$. Accordingly, the RD factor threshold is set to $\varepsilon = \sigma/K_P$. In principle, one can establish a strategy of refining $K_p$ as feed water quality varies and long-term performance data are accumulated (e.g., gain scheduling). It is noted that such an approach, however, will not change the essence of the controller but can serve to increase or decrease the rate at which the coagulant dose adjustment responds to changes in UF backwash effectiveness. In the current study, a $K_p$ that is sufficiently low, but adequate for producing a measurable change in $\Delta_n$ (when in the underdosed region), was selected for a conservative UF coagulant dose adjustment in order to avoiding unintended overshoot of coagulant dose.

Figure 20:
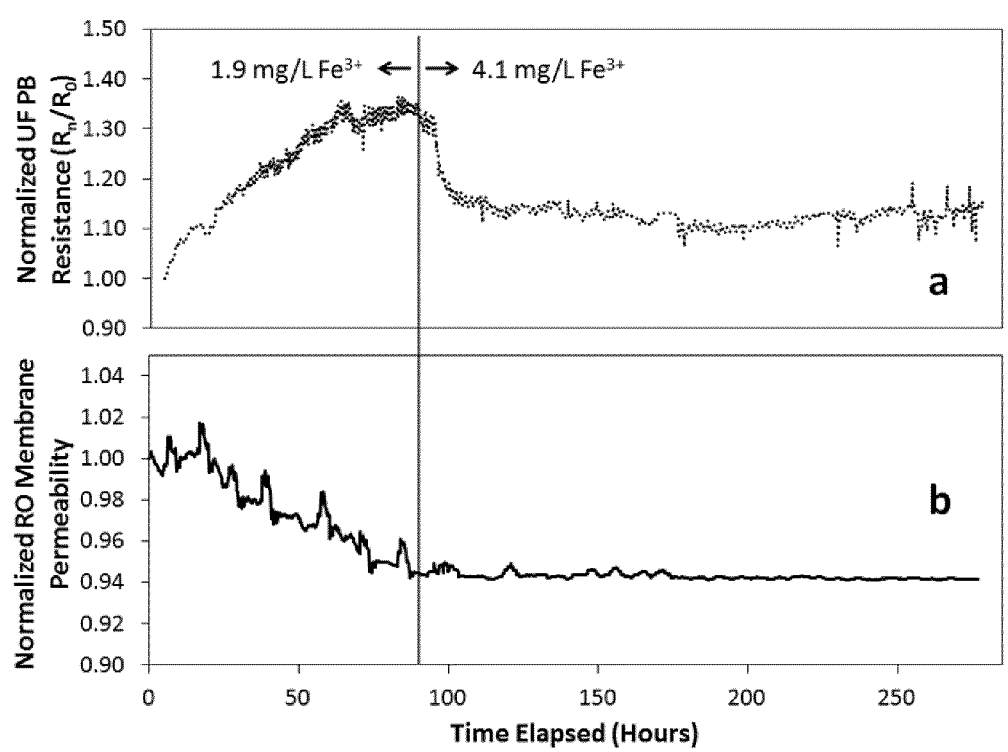
FIG. 20. (a) Normalized UF PB resistance with respect to initial UF resistance ($R_0$), and (b) normalized RO membrane permeability (normalized with respect to initial RO membrane permeability) during two operational periods: (i) UF filtration with coagulant dose of about 1.9 mg/L $Fe^{3+}$ demonstrating increased UF resistance and decline in RO membrane permeability, and (ii) at about 90 h, the coagulant dose was increased to about 4.1 mg/L $Fe^{3+}$ leading to improved UF performance (e.g., reduction in UF resistance) and stable RO membrane permeability. UF system operated at average flux of about 15.1 L/m²h.

Impact of Coagulant Dose on Continuous UF/RO Operation:

The impact of a coagulant dose on UF performance was initially evaluated over a 10 day field operation for which water turbidity and chlorophyll varied as shown in Table 3. The pilot plant was operated at UF average module filtration flux of about 15.1 L/m$^2$h (overall UF feed flow rate of about 76 L/min), with the RO unit operating rate at recovery of about 30%. Self-adaptive backwash triggering was implemented. During the first about 90 h, at constant coagulant dose of about 1.9 mg/L Fe$^{3+}$ to the UF feed, noticeable UF and RO performance deterioration was encountered (FIG. 20). UF membrane resistance increased by about 38% relative to the beginning of operation, while RO membrane permeability decreased by about 8%. At t=about 90 h the coagulant dose was increased to about 4.1 mg/L Fe$^{3+}$ and a dramatic performance improvement was observed for both the UF and RO units. Backwash effectiveness improved as indicated by UF resistance decreasing, within about 20 h, to a level of about 12% above the initial value; the above UF performance improvement is attributed to removal of some of the previously un-backwashed UF foulants. UF performance at the higher coagulant dose remained relatively stable for the remainder of about 8 days of the field test illustrating that proper coagulant dose can ensure robust UF and in turn RO operations. It is emphasized that at the above high (constant) coagulant dose, and with variability of field water source quality and absent coagulant dose control, UF operation was likely (and unnecessary) in the overdosed region (FIG. 19) over portions of the test period.

TABLE 3

Source water turbidity and chlorophyll α during the test period

| Water Quality | Average | Standard deviation | Range |
|---|---|---|---|
| Turbidity (NTU) | 2.98 | ±2.44 | 0.29-83.26 |
| Chlorophyll α (RFU) | 74.6 | ±15 | 9.7-269.1 |

Figure 23:
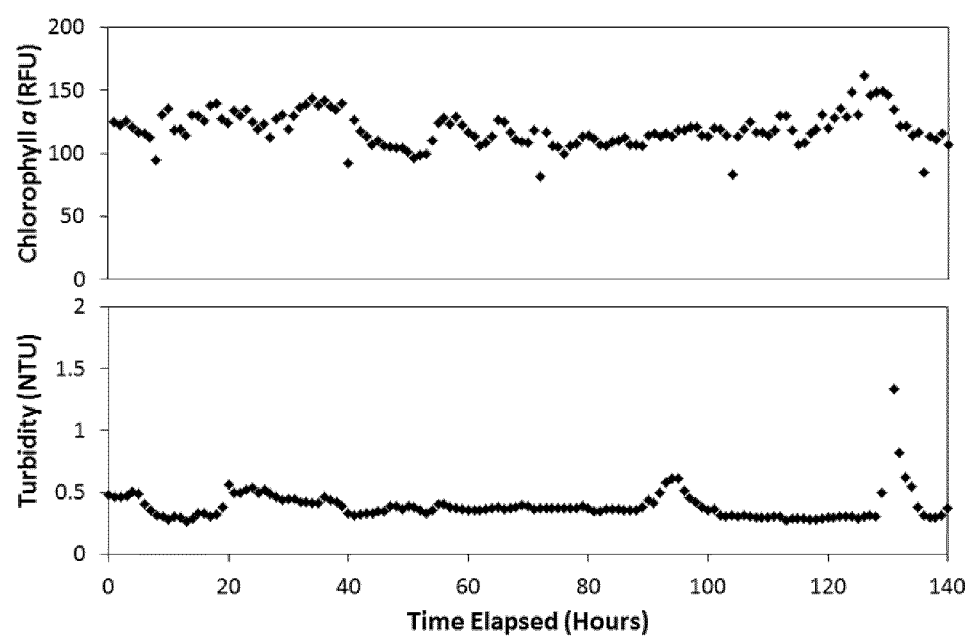
FIG. 23. UF feed water quality during UF Run #2 (Table 4) of self-adaptive coagulant dosing.

Effectiveness of Self-Adaptive Coagulant Dosing Strategy:

In order to demonstrate the self-adaptive coagulant dosing strategy via the coagulant dose controller, four consecutive field tests of about 70-about 140 h duration were carried out (Table 4) with the UF system operating at a flux of about 15.1 L/m²h and RO system seawater desalting at recovery of about 30%. The initial coagulant dose for three self-adaptive coagulation runs (2-4, Table 4) was in the range of about 2.9-about 4.4 mg/L $Fe^{3+}$ and these tests were compared to UF operation at constant coagulant dose of about 4.1 mg/L $Fe^{3+}$. The range of water quality in terms of chlorophyll a and turbidity during each of the four runs is provided in Table 4 with the detailed time-series given in FIG. 23.

TABLE 4

Field tests of UF operation at constant coagulant dose and self-adaptive coagulant dosing strategy.

| Test | Coagulant Dosing Strategy | Coagulant Dose, mg/L $Fe^{3+}$ | Field Test Duration (hours) | Water Quality Turbidity (NTU) | Water Quality Chlorophyll α (RFU) | Coagulant consumption rate relative to Run #1[b] |
|---|---|---|---|---|---|---|
| 1 | Constant dose | 4.1 | 70 | 1.05 ± 0.3 | 151.7 ± 45.3 | 1 |
| 2 | Self-adaptive | 2.2-4.4 (4.1[a]) | 140 | 1.53 ± 0.4 | 102.9 ± 39.2 | 0.83 |
| 3 | Self-adaptive | 2.5-3.6 (2.9[a]) | 123 | 1.08 ± 0.4 | 139.1 ± 48.4 | 0.71 |
| 4 | Self-adaptive | 1.7-5.1 (4.4[a]) | 124 | 0.42 ± 0.2 | 73.3 ± 26.1 | 0.88 |

[a]Initial coagulant dose for self-adaptive operation. The coagulant dose is subsequently adjusted as per the determination of the coagulant-dose controller.
[b]The rate of coagulant consumption in Test #1 was about 311.6 mg/min.

Note:
values expressed in the water quality columns are the averages given along with the standard deviations of sensor readings.

Figure 21:
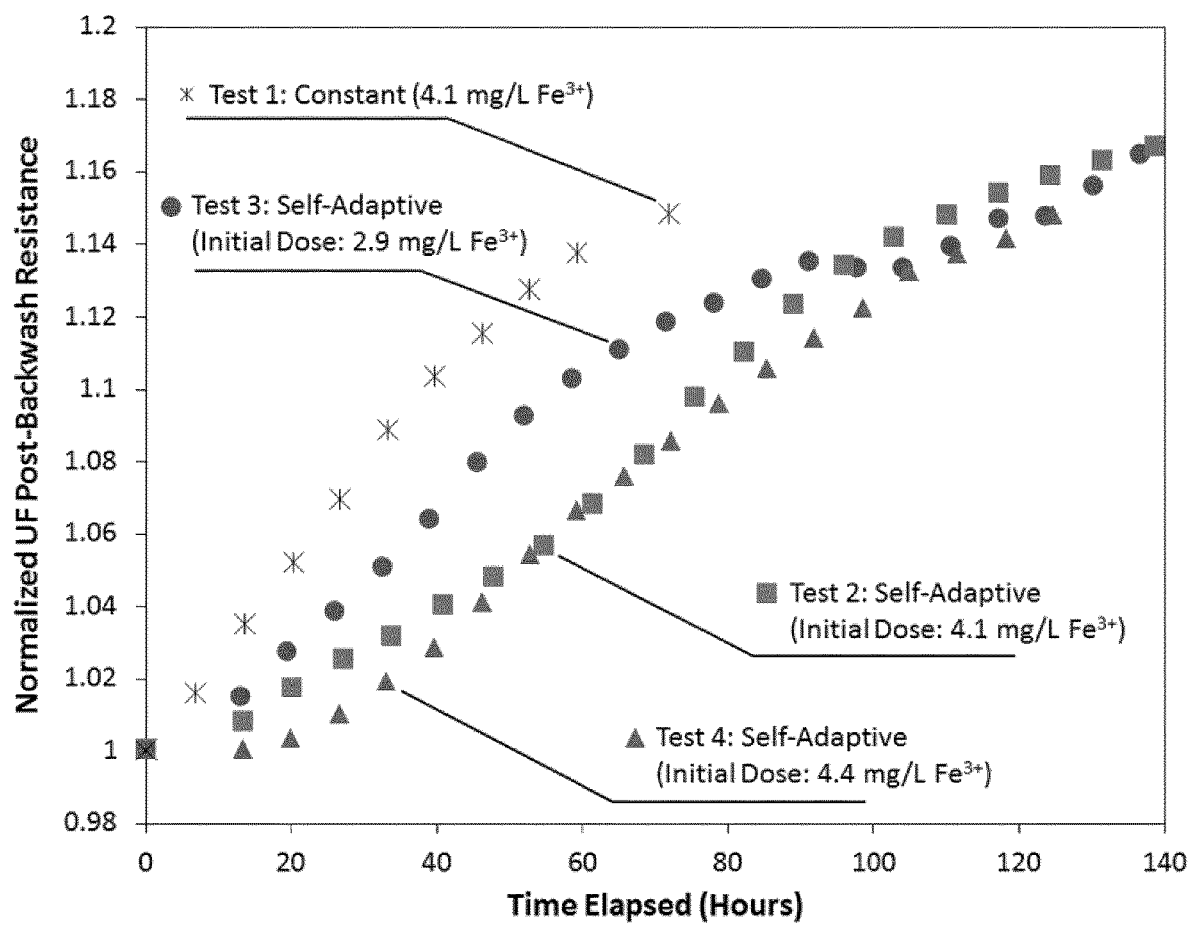
FIG. 21. Progression of UF post-backwash resistance (corresponding to initial UF cycle resistance) comparing self-adaptive (at different initial coagulant dose) and substantially constant coagulant dosing strategies. Post-backwash UF resistance is normalized with respect to the initial run value.

UF operation at substantially constant coagulant dose (Run 1) resulted in increased UF PB resistance that was measurably above that for the self-adaptive coagulant dosing (FIG. 21). For example, after about 60 h of operation the UF PB resistance increase for constant coagulant dose operation was about 13% above the initial UF resistance (constant dose operation at about 4.1 mg/L $Fe^{3+}$) compared to about 7% increase for self-adaptive dosing also at initial dose of about 4.1 mg/L $Fe^{3+}$. While the above improvement, it is important to note that the ranges of coagulant dose for the self-adaptive Runs 2-4 were about 2.2-about 4.4, about 2.5-about 3.6, and about 1.7-about 5.1 mg/L $Fe^{3+}$, respectively and resulted in significant reduction in coagulant consumption rate (by about 12%-about 29%, shown in Table 4). The coagulant dose was varied by the controller as water quality varied over the course of the different field tests (FIG. 23) which in turn impacted the rate of UF fouling and backwash effectiveness. UF operation with self-adaptive coagulant dosing led to superior UF performance, relative to constant coagulant dosing, and reduced rate of coagulant consumption relative to constant dose operation.

Figure 22:
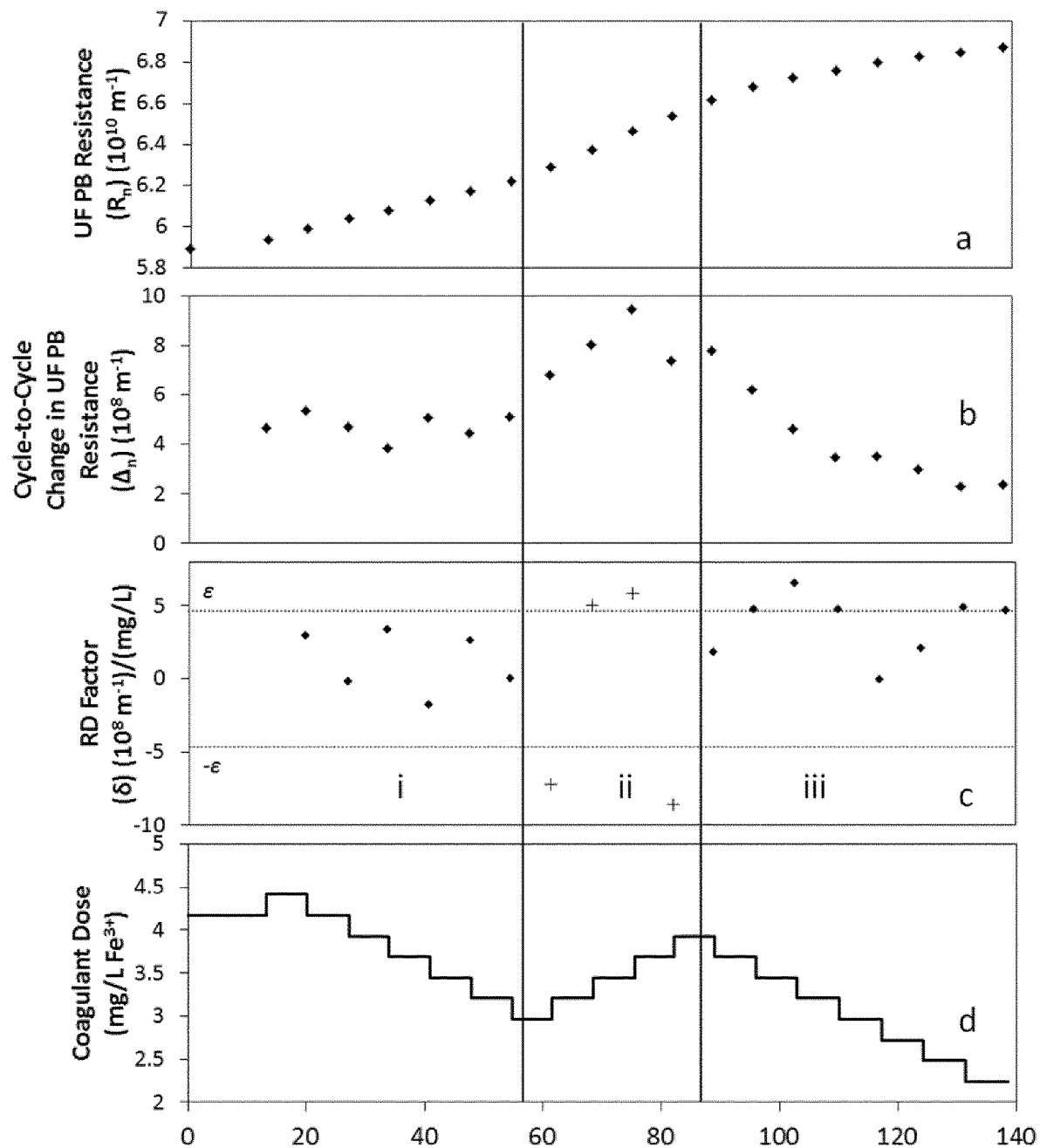
FIG. 22. UF performance and coagulant impact for Run 2 (Table 4) demonstrating the time-profiles for (a) UF PB resistance ($R_n$), (b) cycle-to-cycle change in PB UF resistance ($\Delta_n$), (c) Resistance Dose (RD) factor ($\delta$) and (d) coagulant dose, in mg/L of $Fe^{3+}$. A controller gradually decreased the coagulant dose in period (i) since the un-backwashed UF resistance did not significantly change over the test duration. In period (ii) the coagulant dose was increased in response to the rise of the change in initial UF cycle resistance. Toward the end of period (ii) and through period (iii) backwash effectiveness increased (un-backwashed UF resistance buildup decreased) and correspondingly the controller decreased the coagulant dose.

The coagulant controller action is illustrated in FIG. 22 for Run #2 (Table 4) showing incrementally increasing UF PB resistance for the first about 55 h (Segment (i) in FIG. 22). For segment (i) the coagulant dose was incrementally decreased as condition |δ|≤ε was met (Condition 4). Although chlorophyll a was relatively high (FIG. 23) during the above period, there was no appreciable change in $\Delta_n$ and the progressive reduction in coagulant dose did not adversely impact UF performance. In the subsequent operational period (ii) (t=about 55-about 85 h) the cycle-to-cycle change in UF PB resistance increased despite the fact that the source water turbidity and chlorophyll a readings did not seem to change with time (FIG. 23) and resulted in a faster rate of increase of UF PB resistance. In period (ii), the conditions δ<−ε and δ>ε (where $u_n > u_{n-1}$) were encountered and thus the coagulant controller action (Conditions 3 and 5) was to incrementally increase the coagulant dose; this action ultimately (toward the end of period (ii)) led to a decline in the rate of cycle-to-cycle change in UF PB resistance (FIG. 22b) which continued essentially throughout period (iii). In period (iii) the conditions |δ|≤∈ and δ>ε (where $u_n < u_{n-1}$) were met and thus the coagulant dose was decreased (Conditions 4 and 5). The control action for Runs #3 and #4 also demonstrated that the coagulant controller action was to reduce or elevate the coagulant dose in response to the progression of UF backwash effectiveness. The trend in water quality was complex (FIG. 23) and while a clear correlation with the coagulant controller actions could not be ascertained, the controller provided stable UF performance. Overall, the series of field tests demonstrated that relying on the cycle-to-cycle change in UF PB resistance ($\Delta_n$) and the RD factor (δ) as a metric of UF backwash effectiveness, as an alternative to using traditional feed water quality sensors (e.g., turbidity, chlorophyll a measurements), is a reliable metric for establishing real-time adjustment of coagulant dose and for reducing coagulant use.

Figure 24:
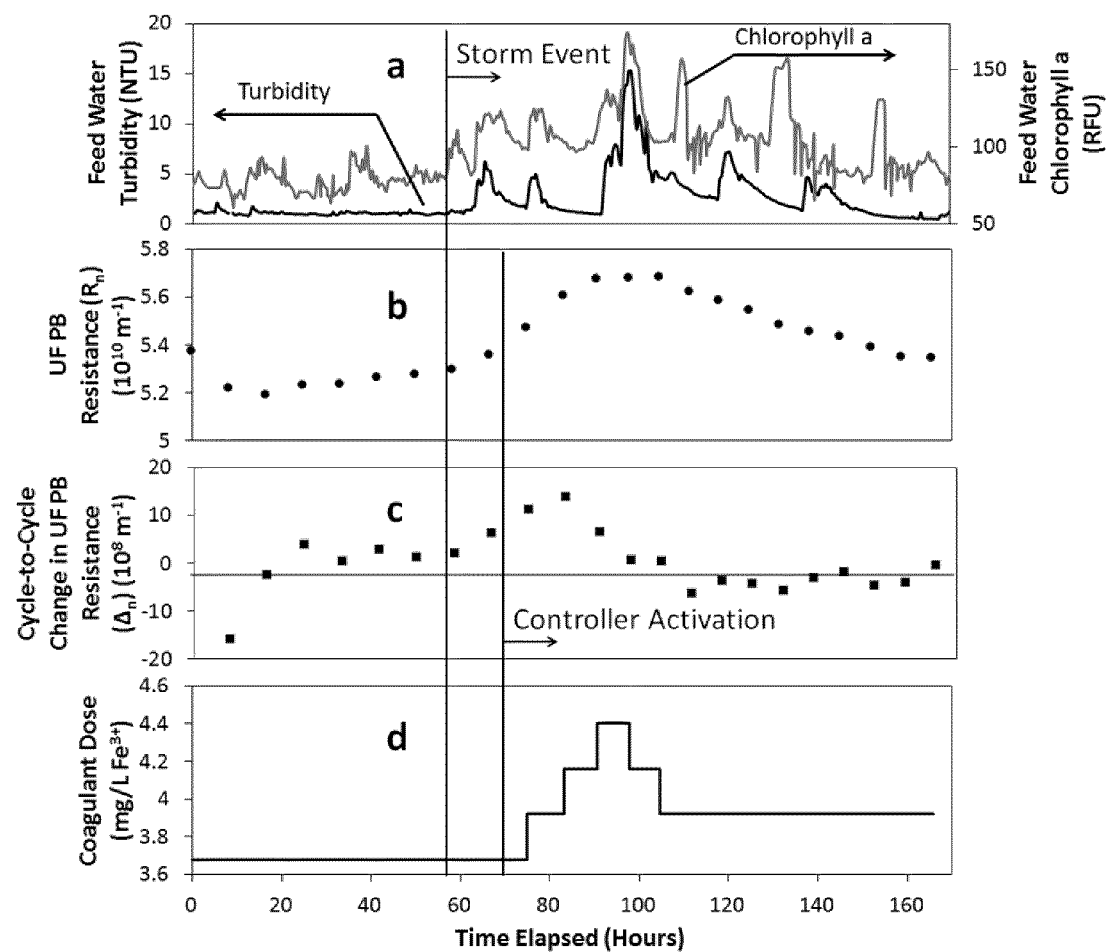
FIG. 24. UF Coagulant dose controller performance for UF operation during a storm event: (a) Feed water turbidity and chlorophyll a, (b) UF PB resistance ($R_n$), (c) cycle-to-cycle change in PB UF resistance ($\Delta_n$), and (d) coagulant dose before and past storm event. UF system was operated at a substantially constant coagulant dose of about 3.7 mg/L $Fe^{3+}$ for about 55 h prior to the storm event with the coagulant dose controller activated at t=about 70 h.

Performance of Coagulant Dosing Controller During a Storm Event:

During the field study, a looming storm event provided an opportunity for a stress test of the UF coagulant dose controller. The integrated UF-RO system was operated for a period of about 7 days at the same total flow rate and UF flux as in the previous short-term tests. For a period of about 55 h, prior to the storm event, the plant operated with UF coagulant dosing of about 3.7 mg/L $Fe^{3+}$. The UF performance was such that the cycle-to-cycle change in UF PB resistance was reasonably maintained. The storm event led to a significant increase in water source turbidity (about 1500%) and chlorophyll a (about 220%) relative to the pre-storm conditions. Deterioration of feed water quality led to increased UF PB resistance (FIG. 24b), as well as increased $\Delta_n$ (FIG. 24c). At about 15 h past the storm onset (t=about 70 h), the coagulant controller was activated and reacted to the increase in $\Delta_n$ by increasing the coagulant dose for three consecutive filtration cycles (FIG. 24d). This action improved UF performance, despite the ongoing storm event, resulting in decreased cycle-to-cycle change in PB UF resistance. As the UF backwash efficiency improved and the storm subsided, previously un-backwashed UF resistance was removed through UF backwash, leading to the condition $\Delta_n<0$. The above condition of $\Delta_n<0$ persisted for the remaining period after t=about 105 h, (Condition 1) and thus the coagulant dose was maintained at about 3.9 mg/L $Fe^{3+}$. The above field test demonstrated that: a) change in $\Delta_n$ is indeed a relevant and strong indicator of the impact of varying feed water quality, b) UF performance is sensitive to the coagulant dose, and c) self-adaptive coagulant dosing provided robust UF performance even under conditions of deteriorating feed water quality.

Conclusions:

An improved approach for self-adaptive control of in-line UF coagulant dosing was developed and field demonstrated for integrated UF-RO seawater desalination. A coagulant dose, controller was developed whereby UF filtration resistance is tracked in real-time, in addition to evaluating the change in post-backwash (PB) UF resistance in response to coagulant dose adjustments. The objective of the coagulant controller was to adjust the in-line coagulant dose to the UF feed so as to reduce the incremental cycle-to-cycle PB resistance change ($\Delta_n$). Tracking both $\Delta_n$ and the rate of change with respect to coagulant dose (or RD Factor) allowed the coagulant controller to quantify UF backwash effectiveness and accordingly establish the appropriate coagulant adjustment. The coagulant controller was successfully demonstrated in a UF-RO seawater desalination pilot plant with field tests ranging up to about eight days and over a period of about 1 year. Field testing demonstrated that the proposed approach to self-adaptive coagulant dosing, in addition to self-adaptive backwash triggering, provided measurable reduction in coagulant use while ensuring effective UF operation during periods of varying water quality including a severe storm event. While the present coagulant controller was demonstrated for seawater UF-RO desalination, it is envisioned that the approach can be adapted to inland water UF treatment to provide both stable UF operation and significant savings in coagulant use.

Example 4

Self-Adaptive Control of In-Line Coagulant Dosing

Figure 25:
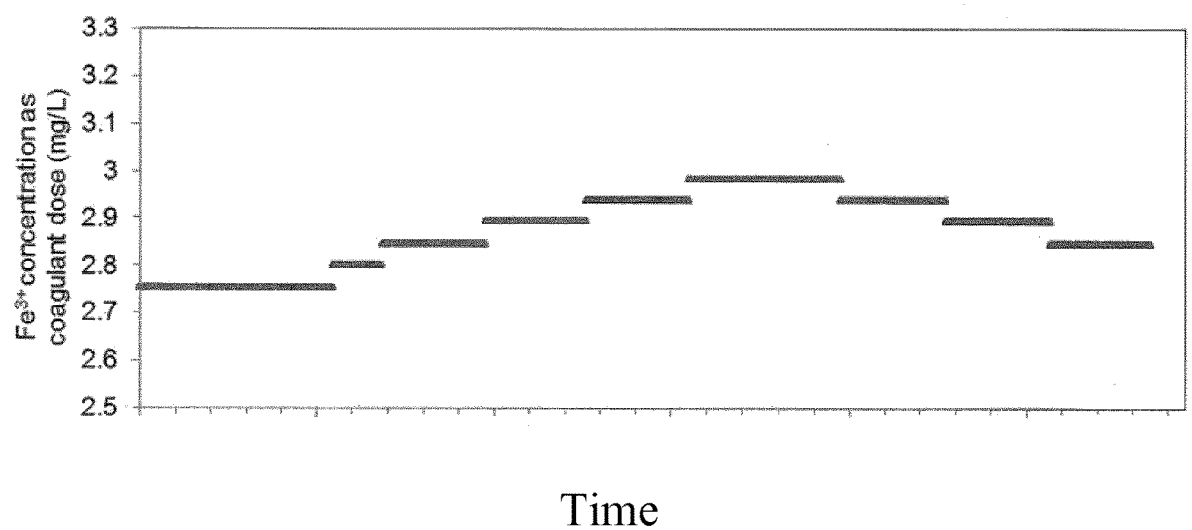
FIG. 25. Successful implementation of self-adaptive coagulant dosing based on online UF fouling monitoring and self-adaptive UF backwash triggering. The plot of coagulant dose (as $Fe^{3+}$ mg/L) versus operation time illustrates the dose adjusted based on changes in UF hydraulic un-backwashable (irreversible) fouling resistance (FIG. 26 and FIG. 27). Each of the indicated operational bars is for a series of filtration/backwash cycles. Filtration flux: about 45.5 liters/$m^2$/hr (LMH), Backwash frequency (variable): about 26-42 min, Backwash Flux: about 161 LMH, Backwash duration: about 60 s. Source water: Littoral seawater at Oxnard, Calif.
Figure 26:
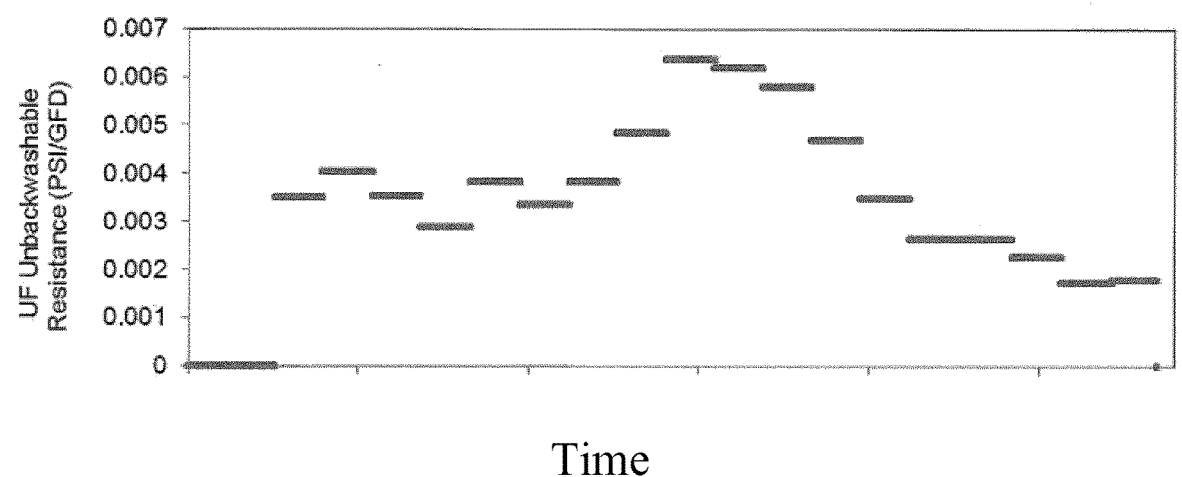
FIG. 26. Successful implementation of self-adaptive coagulation dosing based on a coagulant dosing controller using UF fouling monitoring with self-adaptive backwash triggering. UF hydraulic un-backwashable (irreversible) fouling resistance is shown after backwash between two consecutive filtration cycles. Each of the indicated operational bars is for a series of filtration/backwash cycles. Filtration flux: about 45.5 LMH, Backwash frequency (variable): about 26-42 min, Backwash Flux: about 161 LMH, Backwash duration: about 60 s. Source water: Littoral seawater (Oxnard Calif.). The above operational behavior is in response to controller adjustment of coagulation dose as water quality and water feed fouling conditions change.
Figure 27:
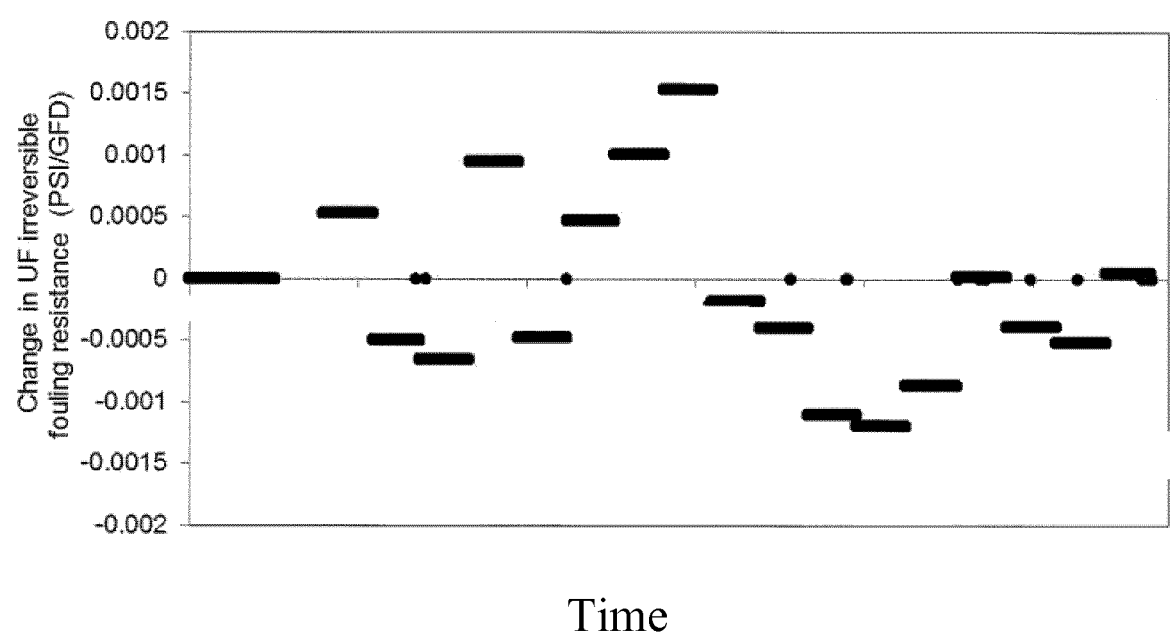
FIG. 27. Successful implementation of self-adaptive coagulation dosing based on a coagulant dosing controller using UF fouling monitoring with self-adaptive backwash triggering. Change in initial resistance after backwash between two consecutive filtration cycles. Each of the indicated operational bars is for a series of filtration/backwash cycles. Filtration flux: about 45.5 LMH, Backwash frequency (variable): about 26-42 min, Backwash Flux: about 161 LMH, Backwash duration: about 60 s. Source water: Littoral seawater at Oxnard, Calif.

FIG. 25 shows results of a successful implementation of self-adaptive coagulant dosing based on online UF fouling monitoring and self-adaptive UF backwash triggering. The plot of coagulant dose (as $Fe^{3+}$ mg/L) versus operation time illustrates the dose adjusted based on changes in UF hydraulic un-backwashable (irreversible) fouling resistance (FIG. 26 and FIG. 27). Each of the indicated operational bars is for a series of filtration/backwash cycles.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a value being "substantially" uniform can refer to a standard deviation of less than or equal to 10% of an average value, such as less than or equal to 5%, less than or equal to 4%, less than or equal to 3%, less than or equal to 2%, less than or equal to 1%, less than or equal to 0.5%, less than or equal to 0.1%, or less than or equal to 0.05%.

As used herein, the terms "connect," "connected," and "connection" refer to an operational coupling or linking. Connected objects can be directly coupled to one another or can be indirectly coupled to one another, such as via another set of objects.

Some embodiments of the disclosure relate to a non-transitory computer-readable storage medium having computer code thereon for performing various computer-implemented operations. The term "computer-readable storage medium" is used herein to include any medium that is capable of storing or encoding a sequence of executable instructions or computer codes for performing the operations, methodologies, and techniques described herein. The media and computer code may be those specially designed and constructed for the purposes of the invention, or they may be of the kind available to those having skill in the computer software arts. Examples of computer-readable storage media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs), and ROM and RAM devices. Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hard-wired circuitry in place of, or in combination with, machine-executable software instructions.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. An apparatus comprising:
a filtration device including a filtration module, the filtration device being configured to generate a filtrate from an input stream;
a metering unit fluidly connected to the filtration device, the metering unit configured to supply a coagulant into the input stream;
a desalination device fluidly connected to the filtration device, the desalination device configured to perform reverse osmosis desalination on the filtrate to generate a permeate stream and a concentrate stream; and
a controller configured to direct operation of the filtration device, the metering unit, and the desalination device,
wherein in a first mode of operation, the filtration module is configured to perform filtration as part of generating the filtrate,
wherein in a second mode of operation, the filtration module is configured to receive an output from the desalination device such that the output backwashes the filtration module,
wherein the controller is configured to monitor a change in membrane resistance of the filtration module during the first mode of operation, and is configured to trigger the filtration module to enter the second mode of operation based on the change in membrane resistance, and
wherein the filtration module is configured to perform multiple cycles each including the first mode of operation and the second mode of operation, and the controller is configured to direct the metering unit to adjust a dosing of the coagulant based on changes in membrane resistance between successive pairs of cycles of the multiple cycles.

2. The apparatus of claim 1, wherein the controller is configured to trigger the filtration module to enter the second mode of operation based on a comparison of the change in membrane resistance with a threshold value.

3. The apparatus of claim 1, wherein the controller is configured to adjust at least one of a frequency or a duration of the second mode of operation based on the change in membrane resistance.

4. The apparatus of claim 1, further comprising at least one accumulator fluidly connected between the filtration device and the desalination device,
wherein in the second mode of operation, the filtration module is configured to receive at least one pulsed output from the accumulator, wherein the pulsed output includes the output from the desalination device.

5. The apparatus of claim 4, wherein the controller is configured to adjust a number of pulsed outputs based on an initial membrane resistance of the filtration module at a beginning of a particular cycle in the first mode of operation.

6. The apparatus of claim 5, wherein the controller is configured to adjust the number of pulsed outputs based on a comparison of the initial membrane resistance with a threshold value.

7. The apparatus of claim 1, wherein:
the filtration device includes a plurality of filtration modules including the filtration module, and
each of the plurality of filtration modules is independently configurable into the first mode of operation or the second mode of operation such that when a subset of the plurality of filtration modules is in the second mode of operation, the filtration device is configured to generate the filtrate using a remaining subset of the plurality of filtration modules in the first mode of operation.

8. The apparatus of claim 1, wherein the output from the desalination device includes the concentrate stream from the desalination device such that the concentrate stream backwashes the filtration module.

9. The apparatus of claim 1, wherein the desalination device is fluidly connected to the filtration device such that the filtrate is conveyed from the filtration device to the desalination device without traversing a storage tank.

10. The apparatus of claim 1, wherein the filtration device is configured to generate the filtrate through at least one of microfiltration or ultrafiltration.

11. The apparatus of claim 1, wherein:
for a first cycle of the multiple cycles, the controller is configured to derive a first post-backwash membrane resistance of the filtration module subsequent to the second mode of operation,
for a second, successive cycle of the multiple cycles, the controller is configured to derive a second post-backwash membrane resistance of the filtration module subsequent to the second mode of operation, and
the controller is configured to direct the metering unit to adjust a dosing of the coagulant for a third, successive cycle of the multiple cycles, based on a difference between the second post-backwash membrane resistance and the first post-backwash membrane resistance.

12. The apparatus of claim 1, wherein the controller is configured to direct the metering unit to adjust the dosing of the coagulant based on the changes in membrane resistance between successive pairs of cycles of the multiple cycles with respect to a coagulant dose.

13. An apparatus comprising:
a filtration module configured to generate a filtrate from a feed stream;
a metering unit fluidly connected to a feed side of the filtration module, the metering unit configured to supply a coagulant into the feed stream; and a controller configured to direct operation of the filtration module and the metering unit, wherein in a first mode of operation, the filtration module is configured to perform filtration as part of generating the filtrate, wherein in a second mode of operation, the filtration module is configured to receive a backwash stream to clean the filtration module, wherein the filtration module is configured to perform multiple cycles each including the first mode of operation and the second mode of operation, and wherein the controller is configured to monitor a membrane resistance of the filtration module, and is configured to direct the metering unit to adjust a dosing of the coagulant based on changes in the membrane resistance between successive pairs of cycles of the multiple cycles.

14. The apparatus of claim 13, wherein:

for a first cycle of the multiple cycles, the controller is configured to derive a first post-backwash membrane resistance of the filtration module subsequent to the second mode of operation, for a second, successive cycle of the multiple cycles, the controller is configured to derive a second post-backwash membrane resistance of the filtration module subsequent to the second mode of operation, and the controller is configured to direct the metering unit to adjust a dosing of the coagulant for a third, successive cycle of the multiple cycles, based on a difference between the second post-backwash membrane resistance and the first post-backwash membrane resistance.

15. The apparatus of claim 13, wherein the filtration module is configured to generate the filtrate through at least one of microfiltration or ultrafiltration.

16. The apparatus of claim 13, further comprising:

a desalination device fluidly connected to the filtration module, the desalination device configured to perform reverse osmosis desalination on the filtrate, wherein the backwash stream includes an output from the desalination device.

17. The apparatus of claim 13, wherein the controller is configured to direct the metering unit to adjust the dosing of the coagulant based on the changes in the membrane resistance between successive pairs of cycles of the multiple cycles with respect to a coagulant dose.

* * * * *